United States Patent
Kikuchi

(10) Patent No.: US 8,284,458 B2
(45) Date of Patent: Oct. 9, 2012

(54) IMAGE PROCESSING APPARATUS AND METHOD FOR MANAGING DOCUMENTS WITH OUTPUT-PROHIBIT AREA

(75) Inventor: Taro Kikuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 816 days.

(21) Appl. No.: 12/382,234

(22) Filed: Mar. 11, 2009

(65) Prior Publication Data

US 2009/0231632 A1    Sep. 17, 2009

(30) Foreign Application Priority Data

Mar. 12, 2008  (JP) ................. 2008-063206

(51) Int. Cl.
*H04N 1/32* (2006.01)
*G03G 21/00* (2006.01)
*G06K 7/00* (2006.01)

(52) U.S. Cl. ........ 358/448; 358/401; 358/437; 358/443; 358/451; 358/468; 358/471; 358/498; 358/1.15; 358/1.13; 358/1.14; 358/3.24; 358/3.28; 358/3.13; 358/3.19; 358/52; 358/296; 399/13; 399/66; 399/82; 399/110; 399/111; 399/167; 399/221; 399/223; 399/258; 399/266; 399/297; 399/276; 399/279; 399/298; 399/299; 399/302; 399/315; 399/327; 399/366; 382/115; 382/135; 382/100; 382/103; 382/255; 382/276; 382/312; 382/318

(58) Field of Classification Search ............... None
See application file for complete search history.

(56) References Cited

U.S. PATENT DOCUMENTS

| | | | |
|---|---|---|---|
| 2006/0285160 A1* | 12/2006 | Tomita | 358/1.16 |
| 2007/0268522 A1* | 11/2007 | Miyamoto | 358/1.18 |
| 2008/0104715 A1* | 5/2008 | Saka et al. | 726/31 |

FOREIGN PATENT DOCUMENTS

| | | |
|---|---|---|
| JP | 2003-032487 | 1/2003 |
| JP | 2005-079628 | 3/2005 |
| JP | 2005-159499 | 6/2005 |
| JP | 2006-094346 | 4/2006 |
| JP | 2006-128821 | 5/2006 |
| JP | 2006-173909 | 6/2006 |
| JP | 2006-279886 | 10/2006 |
| JP | 2006-324857 | 11/2006 |

(Continued)

OTHER PUBLICATIONS

Japanese Office Action dated Oct. 18, 2011 for Application No. 2007-07866.

(Continued)

*Primary Examiner* — Steven Kau
(74) *Attorney, Agent, or Firm* — Harness, Dickey & Pierce, P.L.C.

(57) ABSTRACT

A detecting unit detects output-prohibit area information indicating an output-prohibit area from image data. An identifying unit identifies the output-prohibit area in the image data based on the output-prohibit area information detected by the detecting unit. A masking unit performs a masking on the output-prohibit area identified by the identifying unit. A rearranging unit rearranges an image of an area other than the output-prohibit area over the output-prohibit area on which the masking is performed by the masking unit. An outputting unit outputs image data obtained by rearranging the image by the rearranging unit.

22 Claims, 35 Drawing Sheets

FOREIGN PATENT DOCUMENTS

| | | |
|---|---|---|
| JP | 2007-011800 | 1/2007 |
| JP | 2007-174102 | 7/2007 |
| JP | 2007-307744 | 11/2007 |
| JP | 2007-310432 | 11/2007 |
| JP | 2007-312100 | 11/2007 |
| JP | 2008-028449 | 2/2008 |
| JP | 2008-154106 | 7/2008 |

OTHER PUBLICATIONS

Japanese Office Action dated Oct. 18, 2011 for Application No. 2008-063206.

\* cited by examiner

| TABLE REGISTRATION 1 | |
|---|---|
| LAYOUT AREA | CENTROID |
| 1 | ((Xb+Xa)/2, (Yb+Ya)/2) |
| 2 | ((Xd+Xc)/2, (Yd+Yc)/2) |
| 3 | ((Xf+Xe)/2, (Yf+Ye)/2) |
| 4 | ((Xh+Xg)/2, (Yh+Yg)/2) |

| BIT | 7 | 6 | 5 | 4 | 3 | 2 | 1 | 0 |
|---|---|---|---|---|---|---|---|---|
| | 0 | 1 | 0 | 1 | 0 | 1 | 0 | 0 |

TABLE REGISTRATION: 1
OUTPUT-PROHIBIT AREA HAVING LAYOUT AREA 2
OUTPUT-PROHIBIT AREA HAVING LAYOUT AREA 4

FIG. 18

| TABLE REGISTRATION 1 | | |
|---|---|---|
| LAYOUT AREA | POSITION COORDINATE | |
| | TOP LEFT COORDINATE | BOTTOM RIGHT COORDINATE |
| 1 | (Xa, Ya) | (Xb, Yb) |
| 2 | (Xc, Yc) | (Xd, Yd) |
| 3 | (Xe, Ye) | (Xf, Yf) |
| 4 | (Xg, Yg) | (Xh, Yh) |

FIG. 19

| BIT | 7 | 6 | 5 | 4 | 3 | 2 | 1 | 0 |
|---|---|---|---|---|---|---|---|---|
| | 0 | 1 | 0 | 1 | 0 | 1 | 0 | 0 |

- Bits 7–6: TABLE REGISTRATION: 1
- Bits 5–3: OUTPUT-PROHIBIT AREA HAVING LAYOUT AREA 2
- Bits 2–0: OUTPUT-PROHIBIT AREA HAVING LAYOUT AREA 4

DIRECTION FOR REARRANGING LAYOUT AREAS
OTHER THAN OUTPUT-PROHIBIT AREAS

00: NO SHIFT
01: UPWARD SHIFT
02: DOWNWARD SHIFT

DIRECTION FOR REARRANGING LAYOUT AREAS
OTHER THAN OUTPUT-PROHIBIT AREAS

00: NO SHIFT
01: UPWARD SHIFT
02: DOWNWARD SHIFT

FIG. 25

| LAYOUT AREA | TABLE REGISTRATION 1 | |
|---|---|---|
| | REARRANGED POSITION COORDINATE | |
| | REARRANGED TOP LEFT COORDINATE | REARRANGED BOTTOM RIGHT COORDINATE |
| 1 | (Xa, Ya) | (Xb, Yb) |
| 2 | (Xc, Yc) | (Xd, Yd) |
| 3 | – | – |
| 4 | (Xg, Yg) | (Xh, Yh) |

FIG. 26

| BIT | 7 | 6 | 5 | 4 | 3 | 2 | 1 | 0 |
|---|---|---|---|---|---|---|---|---|
| | 0 | 1 | 0 | 1 | 1 | 0 | 0 | 0 |

- Bits 7–6: TABLE REGISTRATION: 1
- Bits 5–3: OUTPUT-PROHIBIT AREA HAVING LAYOUT AREA 3
- Bits 2–0: RESERVE BIT GROUP FOR OUTPUT-PROHIBIT AREA

| TABLE REGISTRATION 1 | | |
|---|---|---|
| PAGE | LAYOUT AREA | ORDER OF PRIORITY |
| 1 | 1 | 0 |
| 1 | 2 | 1 |
| 1 | 3 | – |
| 1 | 4 | 2 |
| 2 | 5 | 0 |
| 2 | 6 | 1 |
| 2 | 7 | 2 |

FIG. 37A

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 1 | 0 | 0 | 0 | 1 | 1 | 0 | 0 | 0 | 1 | 1 | 0 | 1 | 0 |

- CURRENT PAGE: 1
- TOTAL OF PAGES IN ORIGINAL: 2
- OUTPUT-PROHIBIT AREA HAVING LAYOUT AREA 3
- LAYOUT AREA 1: PRIORITY 0
- LAYOUT AREA 2: PRIORITY 1
- LAYOUT AREA 4: PRIORITY 2
- MINIMUM ZOOM RATIO 80%

FIG. 37B

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 1 | 0 | 0 | 0 | 0 | 0 | 0 | 0 | 0 | 1 | 1 | 0 | 1 | 0 |

- CURRENT PAGE: 2
- TOTAL OF PAGES IN ORIGINAL: 2
- OUTPUT-PROHIBIT AREA NOT SPECIFIED
- LAYOUT AREA 5: PRIORITY 0
- LAYOUT AREA 6: PRIORITY 1
- LAYOUT AREA 7: PRIORITY 2
- MINIMUM ZOOM RATIO 80%

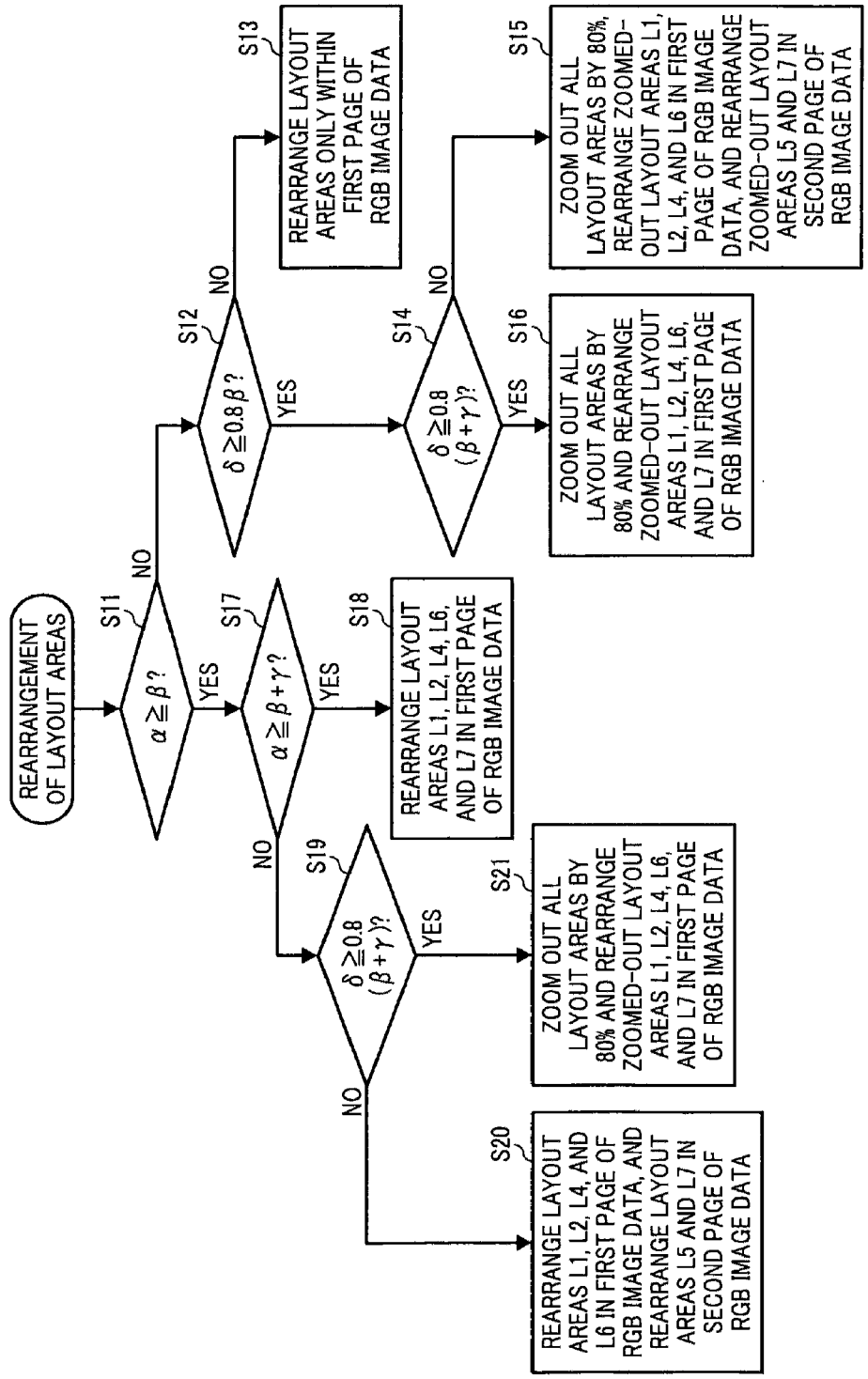

FIRST PAGE          SECOND PAGE

FIRST PAGE          SECOND PAGE

IMAGE PROCESSING APPARATUS AND METHOD FOR MANAGING DOCUMENTS WITH OUTPUT-PROHIBIT AREA

CROSS-REFERENCE TO RELATED APPLICATIONS

The present application claims priority to and incorporates by reference the entire contents of Japanese priority document 2008-063206 filed in Japan on Mar. 12, 2008.

BACKGROUND OF THE INVENTION

1. Field of the Invention

The present invention relates to a technology for outputting image data from an image processing apparatus.

2. Description of the Related Art

Nowadays, various types of image processing apparatuses have become popular for their capability to efficiently produce a copy of image data (an electronic document or an image) by outputting the image data on a recording medium such as recording paper. During the copying operation, however, there is a risk that images not allowed to be copied or highly-confidential documents in the image data are inadvertently output. To guard against such a problem, various technologies have been disclosed that protect areas not allowed to be output (hereinafter, "output-prohibit areas") from being inadvertently output during the copying operation.

For example, Japanese Patent Application Laid-open No. 2003-032487 discloses a technique that allows the user to set arbitrary areas on an image as output-prohibit areas not to be output at the time of copying, creates image information by appending certain patterns to the output-prohibit areas, and displays an image containing the output-prohibit areas to the user for confirmation. Moreover, Japanese Patent Application Laid-open No. 2006-094346 discloses a technique for embedding information regarding output-prohibit areas and information regarding particular patterns used to prevent copying of the output-prohibit areas in an integrated circuit (IC) tag that is attached to a printed publication such as a book and masking the patterns to protect the output-prohibit areas from being output. Furthermore, Japanese Patent Application Laid-open No. 2005-079628 discloses a technique for synthesizing tiled patterns on output-prohibit areas to protect the output-prohibit areas from being output at the time of copying. Moreover, Japanese Patent Application Laid-open No. 2007-174102 discloses a technique for printing multi-bit dot patterns (pattern codes) on an original and setting output-prohibit areas according to an information disclosure level.

In each of the abovementioned conventional techniques, when the user specifies output-prohibit areas in advance to flexibly set the security level for copying, the user-specified output-prohibit areas are subjected to masking to hide the details mentioned therein. However, by only performing masking of the output-prohibit areas, there remains a possibility that the hidden details in the output-prohibit areas are inferred to a certain extent by analogy. The situation in which such a problem may arise is when a person who has not seen data in its original form refers to the data containing masked output-prohibit areas. For example, when a person outputs data of an original stored earlier by another person or when data containing masked output-prohibit areas is distributed in a meeting, then there is a risk that the person referring to the data containing masked output-prohibit areas can infer the hidden details in the masked output-prohibit areas by analogy.

Consider a case shown in FIG. 43 in which an area of 'new product "YYY"' in a document 'proposal for new products' is specified as an output-prohibit area and therefore is masked (blacked out) to hide the details mentioned therein. As a result, a person referring to the document 'proposal for new products' is not able to learn about the hidden details. However, it is possible for that person to infer that there must be a new product having higher level of confidentiality than a 'new product "XXX"' or a 'new product "ZZZ"' mentioned in the document. Similarly, consider a case shown in FIG. 44 in which events that occurred on August 3 are blacked out in a document 'weekly report'. In that case, it is possible to infer by analogy that highly-confidential events must have occurred on either one or both of August 2 and August 3. Thus, as is evident from these examples, masking of output-prohibit areas is not necessarily sufficient to prevent the hidden details from being inferred by analogy.

SUMMARY OF THE INVENTION

It is an object of the present invention to at least partially solve the problems in the conventional technology.

According to one aspect of the present invention, there is provided an image processing apparatus including a receiving unit that receives image data; a detecting unit that detects output-prohibit area information indicating an output-prohibit area from the image data; an identifying unit that identifies the output-prohibit area in the image data based on the output-prohibit area information detected by the detecting unit; a masking unit that performs a masking on the output-prohibit area identified by the identifying unit; a rearranging unit that rearranges an image of an area other than the output-prohibit area over the output-prohibit area on which the masking is performed by the masking unit; and an outputting unit that outputs image data obtained by rearranging the image by the rearranging unit.

Furthermore, according to another aspect of the present invention, there is provided an image processing method including inputting image data; detecting output-prohibit area information indicating an output-prohibit area from the image data; identifying the output-prohibit area in the image data based on the output-prohibit area information detected at the detecting; performing a masking on the output-prohibit area identified at the identifying; rearranging an image of an area other than the output-prohibit area over the output-prohibit area on which the masking is performed at the performing; and outputting image data obtained by rearranging the image at the rearranging.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 18 is an exemplary layout table generated by a CPU shown in FIG. 17;

FIG. 19 is a schematic diagram of an exemplary security code generated by the CPU shown in FIG. 17;

FIG. 25 is an exemplary layout table of the layout areas shown in FIG. 21 and their rearranged positions;

FIG. 26 is a schematic diagram of an exemplary security code generated by the CPU shown in FIG. 20;

FIG. 37A is a schematic diagram of an exemplary security code generated by a CPU shown in FIG. 36 with respect to the first page of RGB image data shown in FIG. 32;

FIG. 37B is a schematic diagram of an exemplary security code generated by the CPU shown in FIG. 36 with respect to the second page of RGB image data shown in FIG. 32;

FIG. 38 is a flowchart for explaining the sequence of operations when the CPU shown in FIG. 36 rearranges layout areas in the RGB image data shown in FIG. 32 by using the security codes shown in FIGS. 37A and 37B;

DETAILED DESCRIPTION OF THE PREFERRED EMBODIMENTS

Exemplary embodiments of the present invention are described in detail below with reference to the accompanying drawings. The present invention is not limited to these exemplary embodiments. The exemplary embodiments are described with reference to a digital color multifunction product (MFP) having various functions such as copying, facsimileing (FAX), printing, and image distribution (distribution of a scanned image or an image input by printing or facsimileing). However, the exemplary embodiments are also applicable to an information processing device such as a copier, a printer, or a personal computer (PC) that outputs information to a display device.

Figure 1:
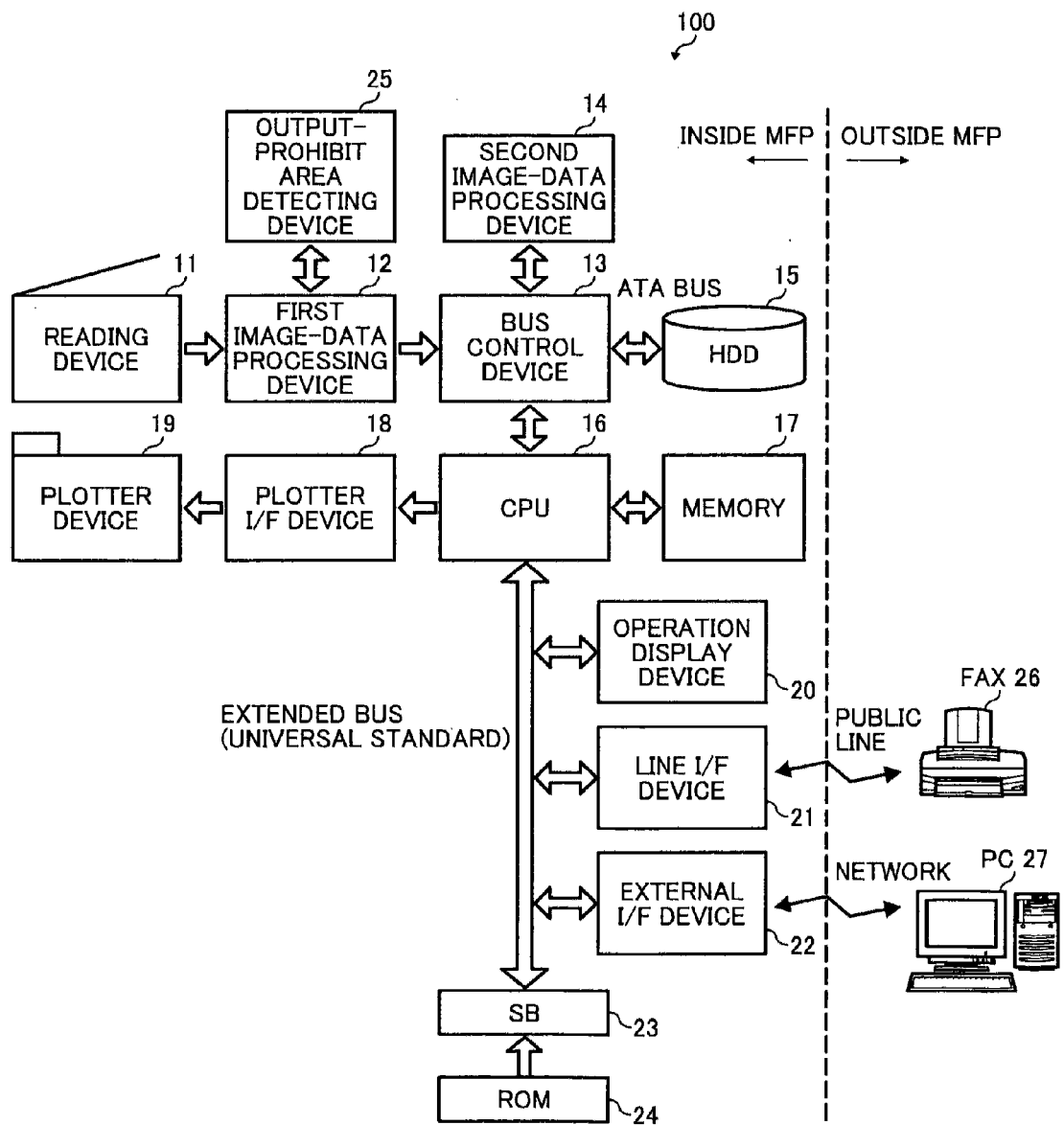
FIG. 1 is a block diagram for explaining an exemplary configuration of a digital color multifunction product (MFP) according to a first embodiment of the present invention.

FIG. 1 is a block diagram for explaining an exemplary configuration of a digital color MFP 100 according to a first embodiment of the present invention. The MFP 100 includes a reading unit 11, a first image-data processing unit 12, a bus control unit 13, a second image-data processing unit 14, a hard disk drive (HDD) 15, a CPU 16, a memory 17, a plotter interface (I/F) unit 18, a plotter unit 19, an operation display unit 20, a line I/F unit 21, an external I/F unit 22, a south bridge (SB) 23, a read only memory (ROM) 24, and an output-prohibit area detecting unit 25.

The reading unit 11 includes a line image sensor such as a charge-coupled device (CCD) photoelectric conversion element (not shown), an analog-to-digital (A/D) converting circuit (not shown), and a driving circuit (not shown) that drives the CCDs and the A/D converting circuit. The reading unit 11 scans an original set therein to obtain image density information of the original, generates 8-bit RGB image data by using the image density information, and outputs the RGB image data to the first image-data processing unit 12.

The first image-data processing unit 12 performs image processing of the RGB image data output by the reading unit 11 such that the RGB image data possesses predetermined characteristics. The predetermined characteristics provided by the first image-data processing unit 12 vary according to the characteristics of the destination to which the RGB image data stored in the MFP 100 (i.e., in the HDD 15) is to be output. The details of the predetermined characteristics provided by the first image-data processing unit 12 are given later. Moreover, when the output-prohibit area detecting unit 25 outputs a detection signal (described later), the first image-data processing unit 12 sends an interrupt requesting signal to the CPU 16 via the bus control unit 13.

The bus control unit 13 controls the functioning of data buses that are used for the communication of a variety of information such as image data or control command data inside the MFP 100. The bus control unit 13 also has a bridge function with respect to various types of bus standards. More particularly, the bus control unit 13 is configured as an application specific integrated circuit (ASIC) that is connected to the first image-data processing unit 12, the second image-data processing unit 14, and the CPU 16 by a PCI-Express bus (PCI stands for peripheral component interconnect); while connected to the HDD 15 by an advanced technology attachment (ATA) bus.

The second image-data processing unit 14 receives the RGB image data having predetermined characteristics provided by the first image-data processing unit 12 and performs image processing suitable to a user-specified destination of the received image data. The image processing performed by the second image-data processing unit 14 is described later in detail.

The HDD 15 is a high-capacity storage medium also installed in PCs. The HDD 15 is mainly used to store the digital image data and the accompanying information (e.g., setting modes). Moreover, the HDD 15 is equipped with ATA connection, which is a standardized expansion of an integrated development environment (IDE) interface.

The CPU 16 is a microprocessor that controls operations of the entire MFP 100. The CPU 16 is an integrated CPU, which has become popular in recent years, in which a CPU core unit is equipped with an integrated connection facility for a common standard I/F or equipped with an integrated bus connection facility using a crossbar switch.

The memory 17 is a fast-access and volatile memory used to store data that is temporarily communicated to absorb the speed difference at the time of bridging a plurality of bus standards or temporarily communicated to absorb the difference in processing speed of a connected component. In addition, the memory 17 is used to temporarily store computer programs or intermediary processing data used when the CPU 16 controls the operations of the MFP 100. To enable high-speed processing in the MFP 100, the CPU 16 boots the system of the MFP 100 by using a boot program stored in the ROM 24, performs fast access to computer programs stored in the memory 17, and executes the computer programs for further processing. In the MFP 100, a standardized dual-in-line memory module (DIMM), which is also installed in PCs, is used as the memory 17.

The plotter I/F unit 18 receives CMYK digital image data via the standard I/F integrated in the CPU 16 (CMYK stands for a color model of cyan, magenta, yellow, and black). Subsequently, the plotter I/F unit 18 performs bus-bridge processing and sends the CMYK digital image data to a dedicated I/F for the plotter unit 19. Meanwhile, a PCI-Express bus is used as the standard I/F integrated in the CPU 16.

The plotter unit 19 performs an electrophotographic process on the CMYK digital image data by using a laser beam and outputs the CMYK image data on a recording medium.

The operation display unit 20 is a user interface of the MFP 100 including a liquid crystal display (LCD) and key switches. The operation display unit 20 displays information about different states of the MFP 100 or various operational methods on the LCD and detects key-switch input operations performed by users. The operation display unit 20 is connected to the CPU 16 via an expansion bus of PCI-Express standard.

The line I/F unit 21 is used to connect the expansion bus of PCI-Express standard to a public line. That enables the MFP 100 to communicate data with a facsimile (FAX) device 26. The FAX device 26 is a general-purpose facsimile device that performs communication of image data with the MFP 100 via the public line.

The external I/F unit 22 is used to connect the expansion bus of PCI-Express standard to a PC 27 as an external device and enables data communication therebetween. For example, the external I/F unit 22 can be connected to a network such as Ethernet (registered trademark) that includes the PC 27. Thus, the MFP 100 is connected to the network via the external I/F unit 22. The PC 27 is installed with application programs or drivers that the user can use to control the operations of the MFP 100 or to perform input-output of data with respect to the MFP 100.

The SB 23 is one of the chips used in a northbridge/southbridge chipset architecture, which is also installed in PCs. The SB 23 has a standardized bridge function for buses such as a PCI-Express bus and an industrial standard architecture (ISA) bus that are used to configure a CPU system having bridge function. In the MFP 100, the SB 23 bridges the CPU 16 to the ROM 24.

The ROM 24 is used to store various computer programs (including the boot program) used by the CPU 16 to control the operations of the MFP 100. The examples of computer programs are a copying program executed to perform a copying process, a scanner distribution program executed to perform scanner distribution, and a facsimileing program executed to perform a facsimileing process.

The output-prohibit area detecting unit 25 obtains the image data that has been input to the first image-data processing unit 12 for processing or the image data that is currently being processed by the first image-data processing unit 12 and detects information regarding output-prohibit areas (hereinafter, "output-prohibit area information") in the image data. The output-prohibit area information is information regarding those areas in the image data that need to be hidden (not allowed to be output) while outputting the image data from the MFP 100.

Figure 2:
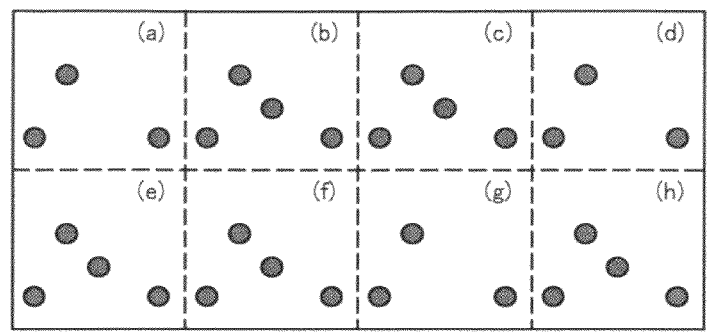
FIG. 2 is a schematic diagram of an exemplary combination of two types of dot patterns defined as a security code.

The output-prohibit area information is not limited to any particular format. For example, as shown in FIG. 2, a combination of two types of dot patterns can be used as the output-prohibit area information to indicate whether a particular area in the image data is an output-prohibit area. In the example shown in FIG. 2, the dot patterns of a first type are assigned the value '0', the dot patterns of a second type are assigned the value '1', and a combination of eight dot patterns of the first type and the second type is defined as a security code that represents the output-prohibit area information. The security code is embedded in advance in the original as pattern data. Thus, it becomes possible to specify the output-prohibit area information without having to use, e.g., a special paper thereby enhancing the utility of the original.

Meanwhile, instead of using dot patterns to represent the output-prohibit area information, it is also possible to use bar codes or quick response (QR) codes. Moreover, it is also possible to use a digital watermarking technique to specify the output-prohibit area information. In any of those cases, one-dimensional code data or two-dimensional code data can be embedded in advance in the original. Thus, it becomes possible to specify the output-prohibit area information without having to use, e.g., a special paper thereby enhancing the utility of the original.

Another way of specifying or reading output-prohibit area information is to embed in advance a radio frequency identification (RFID) tag in the original. However, in that case, it is desirable to arrange the output-prohibit area detecting unit 25 (e.g., an RFID reader) in association with the reading unit 11.

Reverting to the explanation of dot patterns, the output-prohibit area detecting unit 25 detects the dot patterns from image data obtained by scanning an original and converts the dot patterns into a multi-bit security code. Then, the output-prohibit area detecting unit 25 stores the security code in a register (not shown) thereof and outputs a detection signal to the first image-data processing unit 12. The detection signal indicates that a security code (i.e., the output-prohibit area information) has been detected in the image data. The output-prohibit area detecting unit 25 can detect the dot patterns in a software manner by using, e.g., digital signal processing (DSP) or in a hardware manner by using, e.g., ASIC/FPGA hardware (FPGA stands for field programmable gate array). The same is applicable in the case of using bar codes or QR codes instead of dot patterns.

Meanwhile, the MFP 100 can perform various processes such as copying, scanner distribution, printing, facsimileing, and printing of stored data. Because the basic operations in all of the processes are substantially similar, only the copying process is described below in detail as the representative process performed by the MFP 100.

First, the user sets an original in the reading unit 11 and operates the operation display unit 20 to input a desired copying mode and an instruction to start the copying process. The operation display unit 20 converts the user-specified information into control command data and sends the control command data to the CPU 16 via the expansion bus of PCI-Express standard.

Subsequently, based on the control command data about starting the copying process, the CPU 16 executes the copying program and performs necessary settings for copying. Given below is the sequence of operations performed in the copying process.

During the copying process, first, the reading unit 11 scans the set original, generates 8-bit RGB digital image data, and outputs the image data to the first image-data processing unit 12. The first image-data processing unit 12 performs image processing of the image data received from the reading unit 11, whereby the processed image data possesses predetermined characteristics, and sends the processed image data to the bus control unit 13.

Figure 3:
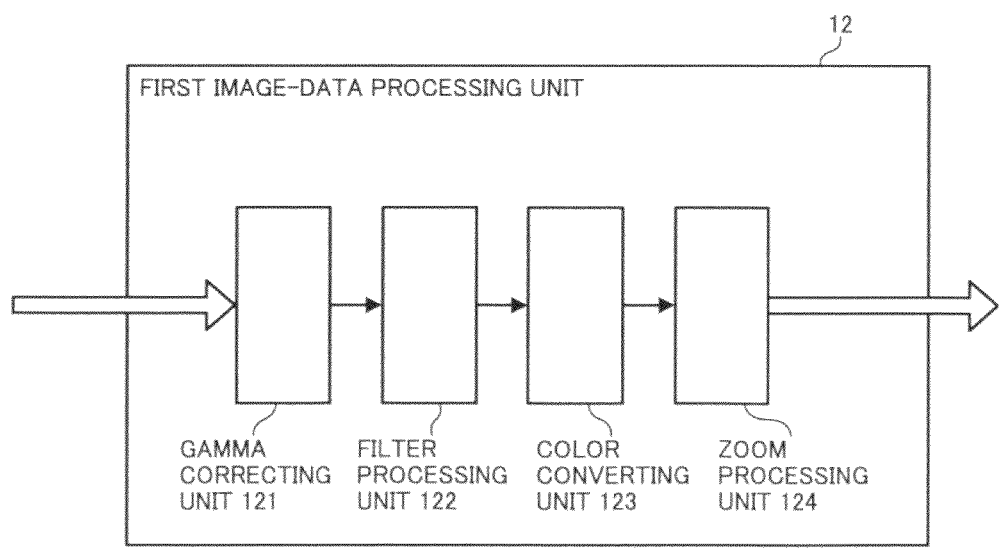
FIG. 3 is a block diagram of a first image-data processing unit shown in FIG. 1.

FIG. 3 is a block diagram of the first image-data processing unit 12. The first image-data processing unit 12 includes a gamma correcting unit 121, a filter processing unit 122, a color converting unit 123, and a zoom processing unit 124.

The gamma correcting unit 121 performs gamma correction of the RGB image data received from the reading unit 11 and converts the brightness of the RGB image data to a predetermined brightness. In the first embodiment, the gamma correcting unit 121 performs conversion to, although not limited to, brightness linear.

Figure 4:
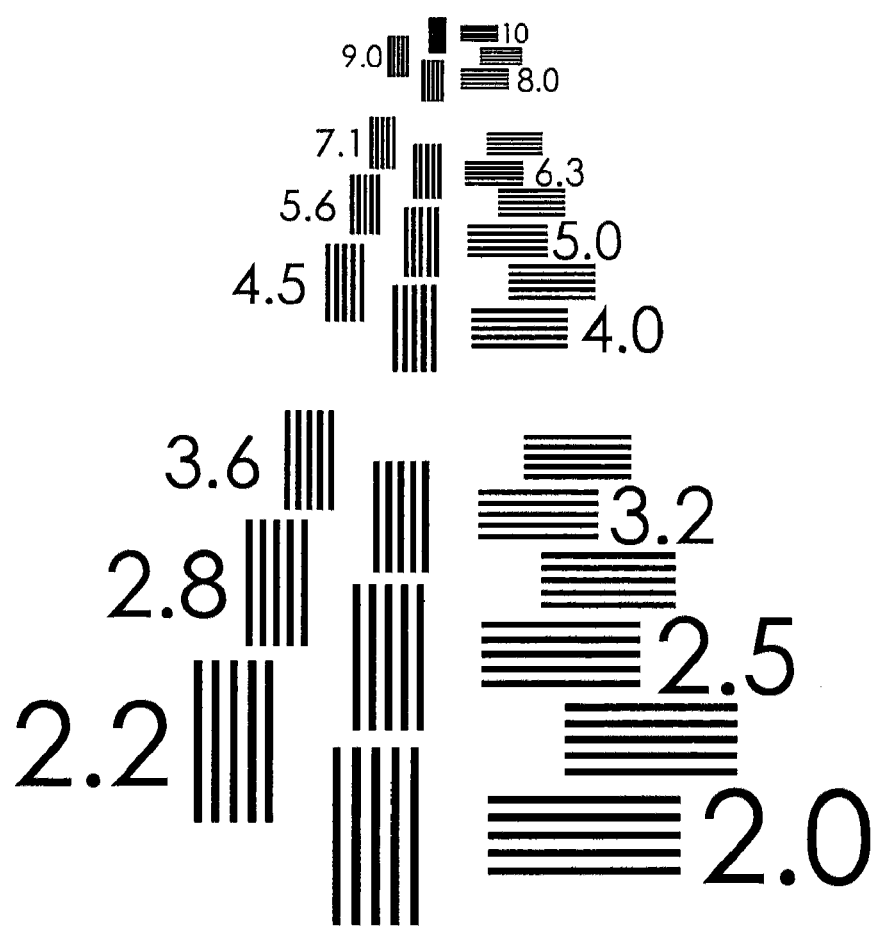
FIG. 4 is a schematic diagram of an exemplary standard chart.

The filter processing unit 122 converts the sharpness of the RGB image data to a predetermined sharpness. In the first embodiment, when the reading unit 11 scans patterns of a standard chart as shown in FIG. 4, the filter processing unit 122 converts scan lines per inch to, although not limited to, predetermined modulation transfer function (MTF) characteristic values.

The color converting unit 123 converts the color of the RGB image data to a predetermined color. In the first embodiment, the color converting unit 123 converts the color space to, although not limited to, Adobe RGB color space developed by Adobe Systems Incorporated.

The zoom processing unit 124 converts the size (resolution) of the RGB image data to a predetermined size (resolution) of, although not limited to, 600 dots per inch (dpi).

The output-prohibit area detecting unit 25 obtains the RGB image data that has been input to the first image-data processing unit 12 for processing or the RGB image data that is currently being processed by the first image-data processing unit 12 and detects output-prohibit area information from the RGB image data. More particularly, the output-prohibit area detecting unit 25 detects predetermined dot patterns from the RGB image data, converts the dot patterns into a multi-bit security code, and stores the security code in the register.

Subsequently, the output-prohibit area detecting unit 25 outputs a 1-bit detection signal to the first image-data processing unit 12. The detection signal indicates that output-prohibit area information has been detected in the RGB image data. Upon receiving the detection signal, the first image-data processing unit 12 requests an interrupt to the CPU 16 via the bus control unit 13.

The CPU 16 receives the request for an interrupt from the first image-data processing unit 12 and, as soon as the reading unit 11 finishes reading of the image data, refers to the register of the output-prohibit area detecting unit 25 to obtain the security code.

Meanwhile, instead of making the CPU 16 obtain the security code from the register of the output-prohibit area detecting unit 25, it is also possible to send the security code to the CPU 16 from the output-prohibit area detecting unit 25 via the first image-data processing unit 12. For that, a circuit path capable of carrying the multi-bit security code can be laid between the output-prohibit area detecting unit 25 and the first image-data processing unit 12. The same is applicable in the case of using bar codes or QR codes instead of dot patterns.

The bus control unit 13 receives the RGB image data processed by the first image-data processing unit 12 and stores the processed RGB image data into the memory 17 via the CPU 16. Subsequently, the CPU 16 stores the security code, which is detected by the output-prohibit area detecting unit 25, in the memory 17 in a corresponding manner with the RGB image data. The CPU 16 obtains the security code from the output-prohibit area detecting unit 25 only when the first image-data processing unit 12 requests for an interrupt. Otherwise, the CPU 16 generates a security code containing all 0-value bits and stores that security code in the memory 17 in a corresponding manner with the RGB image data.

In other words, when output-prohibit area information is not found in the image data, the output-prohibit area detecting unit 25 does not output the detection signal. In that case, the CPU 16 generates a security code containing all 0-value bits and stores that security code in the memory 17 in a corresponding manner with the RGB image data. Subsequently, the CPU 16 sends the RGB image data from the memory 17 to the second image-data processing unit 14 via the bus control unit 13.

When the output-prohibit area detecting unit 25 outputs the detection signal, the CPU 16 reads the security code from the memory 17 and identifies output-prohibit areas in the corresponding RGB image data with the use of the security code. The bit configuration of the security code is described later in detail. Subsequently, the CPU 16 performs masking of the output-prohibit areas whereby the details mentioned in the output-prohibit areas are not disclosed at the time of output. The masking process results in creation of blank spaces in the output-prohibit areas. The CPU 16 rearranges the remaining RGB image data to overwrite the blank spaces in the output-prohibit areas.

Figure 5A:
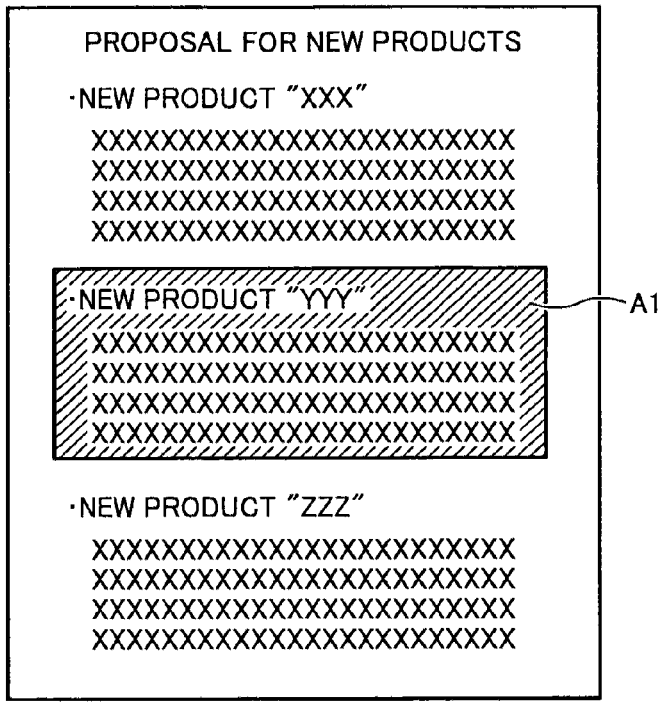
FIG. 5A is a schematic diagram of an original including an output-prohibit area.
Figure 5B:
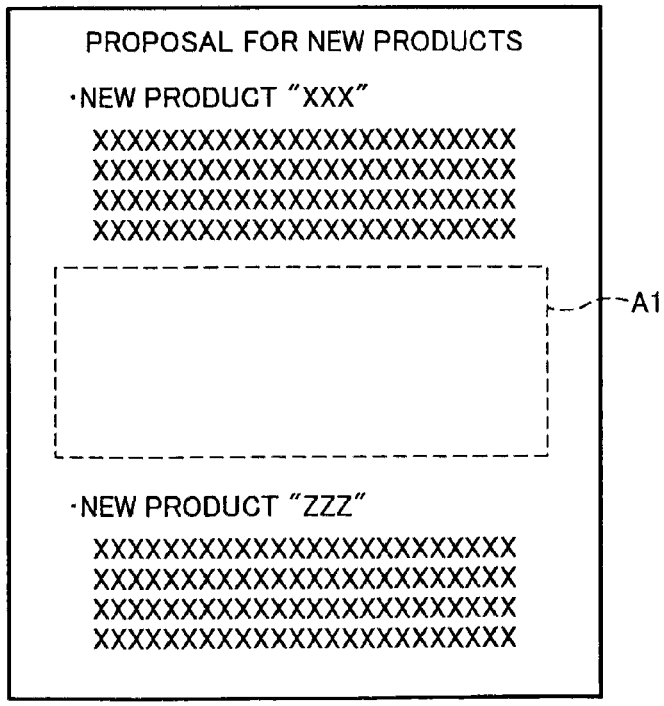
FIG. 5B is a schematic diagram for explaining masking of the output-prohibit area shown in FIG. 5A.

For example, consider a case shown in FIG. 5A. In FIG. 5A, it is assumed that the reading unit 11 reads an original in which an area A1 of 'new product "YYY"' is specified as the output-prohibit area. In that case, the CPU 16 performs masking of the area A1 with white color or with the background density of the original. As a result, the details of the 'new product "YYY"' mentioned in the output-prohibit area (area A1) are hidden (see FIG. 5B).

Figure 5C:
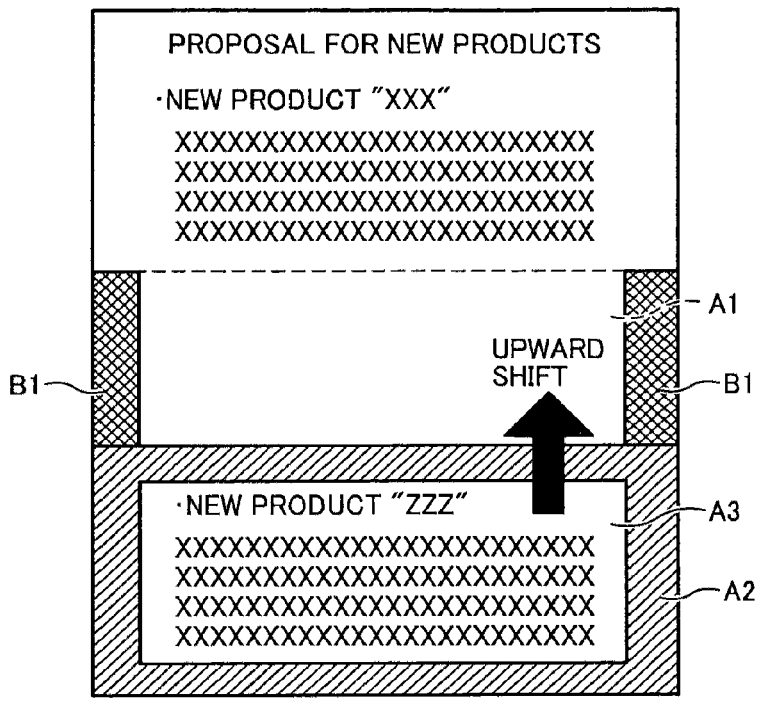
FIGS. 5C, 5D, and 5E are schematic diagrams for explaining exemplary methods of overwriting the masked output-prohibit area shown in FIG. 5B.
Figure 5D:
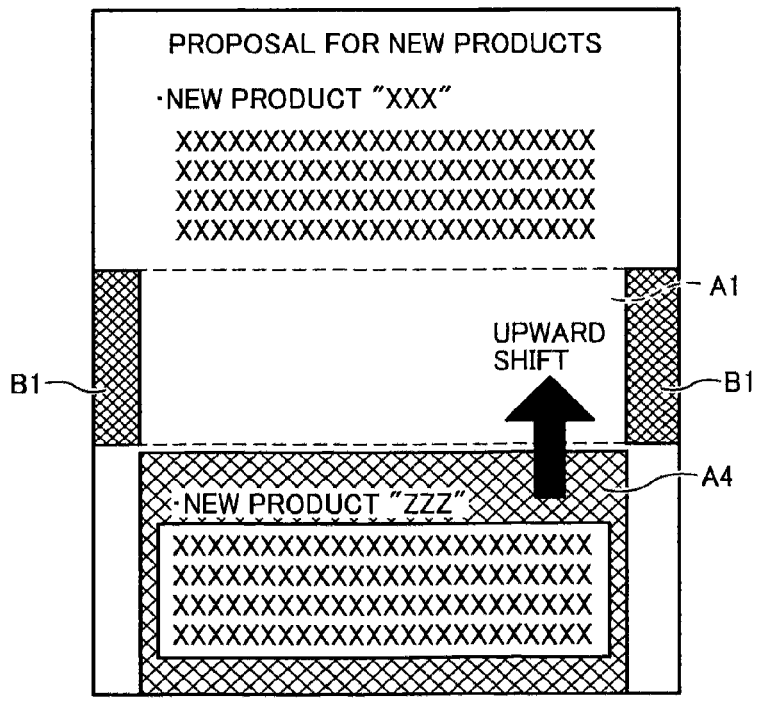

Subsequently, the CPU 16 shifts an area A2, which is the entire area beneath the output-prohibit area (area A1) and which includes an area A3 of 'new product "ZZZ"', over the output-prohibit area (area A1) (see FIG. 5C). As a result, the masked output-prohibit area (area A1) is overwritten by the area A2. However, because the area A2 is larger in dimension along a main scanning direction (horizontal direction in FIG. 5D) than the output-prohibit area (area A1), a margin area B1 that surrounds the output-prohibit area (area A1) in the horizontal direction also gets unnecessarily overwritten by the area A2. To prevent that, two overwriting methods can be used. The first overwriting method is to shift only an area (e.g., an area A4 of 'new product "ZZZ"' shown in FIG. 5D) that is identical in dimension along the main scanning direction to the dimension of the output-prohibit area (area A1) over the output-prohibit area (area A1). That prevents unnecessary overwriting of areas (e.g., the margin area B1) other than the output-prohibit area (area A1).

Figure 5E:
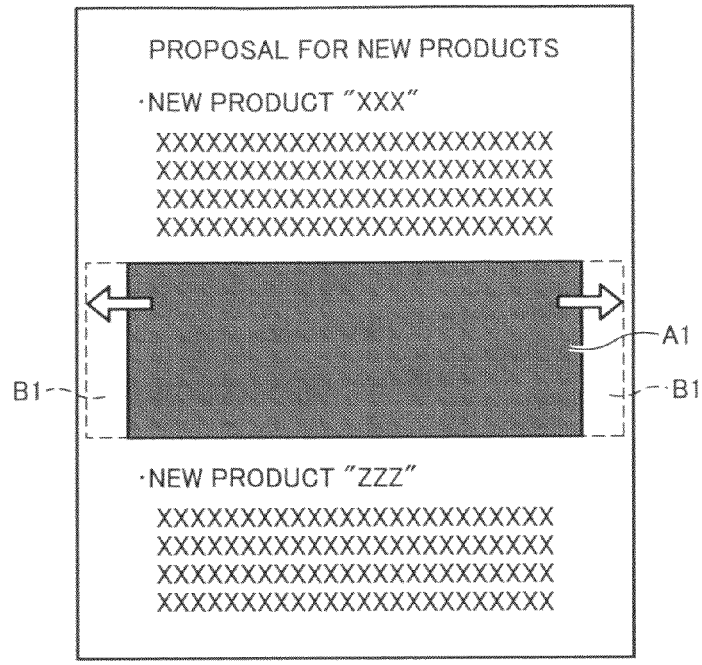

As shown in FIG. 5E, the second overwriting method is to extend the output-prohibit area (area A1) to the maximum extent possible along the main scanning direction and then shift upward the entire area beneath the extended output-prohibit area (area A1). To use the second overwriting method, one way of maintaining the output-prohibit area (area A1) extended along the main scanning direction is to disable the user-specifiable option of specifying a desired dimension of the output-prohibit area along the main scanning direction. On the other hand, in the case of keeping the user-specifiable option activated, the user can be prompted to decide whether the output-prohibit area (area A1) should be extended along the main scanning direction. The user-specified information can be included in the bit information of the security code. If the user decides in favor of extending the output-prohibit area (area A1), then the second overwriting method can be used. Otherwise, the first overwriting method can be used.

Thus, the CPU 16 overwrites a masked output-prohibit area by rearranging an area beneath the output-prohibit area to obtain rearranged RGB image data and sends the rearranged RGB image data to the second image-data processing unit 14 via the bus control unit 13. Meanwhile, in the case of resending the once-sent rearranged RGB image data to the second image-data processing unit 14, the once-sent rearranged RGB image data is stored in the HDD 15 until the appropriate timing of resending. Subsequently, when appropriate, the once-sent rearranged RGB image data in the HDD 15 is loaded in the memory 17 and then output to the second image-data processing unit 14 from the memory 17. That is because the memory 17 functions as a temporary memory in which data is placed only on a temporary basis.

Meanwhile, instead of using the HDD 15 to store the once-sent rearranged RGB image data, the HDD 15 can also be used to store the RGB image data not yet subjected to masking and rearrangement along with the corresponding security code. In that case, the RGB image data and the corresponding security code temporarily stored in the memory 17 is shifted to the HDD 15 via the bus control unit 13. Subsequently, the CPU 16 uses the security code stored in the HDD 15 to identify and overwrite the output-prohibit area in the RGB image data at the time of resending.

The second image-data processing unit 14 converts the RGB image data into color signals of CMYK (CMYK image data) and outputs the CMYK image data to the plotter unit 19.

Figure 6:
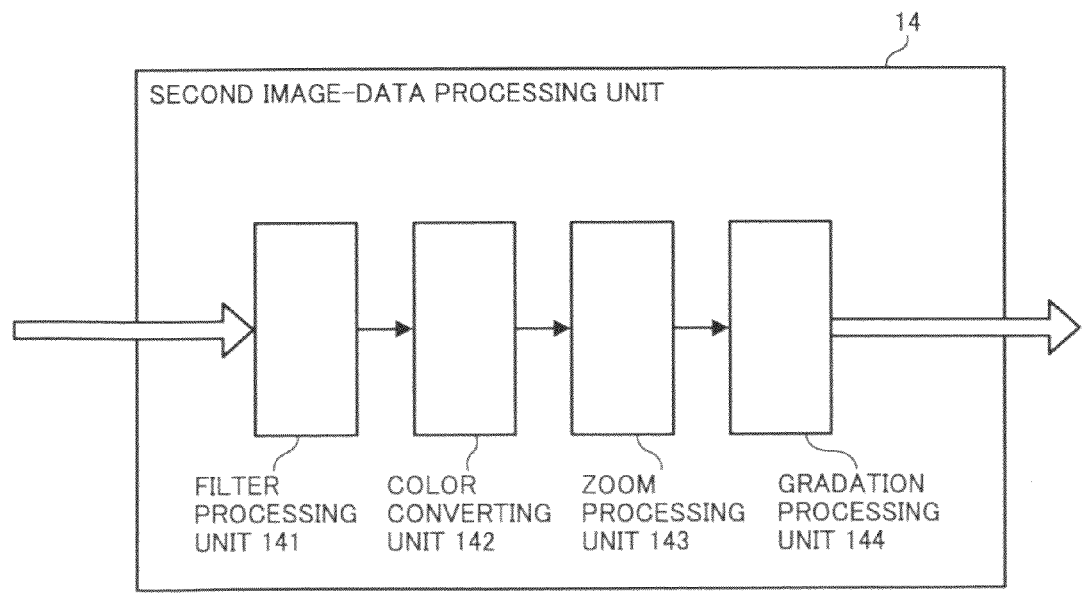
FIG. 6 is a block diagram of a second image-data processing unit shown in FIG. 1.

FIG. 6 is a block diagram of the second image-data processing unit 14. The second image-data processing unit 14 includes a filter processing unit 141, a color converting unit 142, a zoom processing unit 143, and a gradation processing unit 144. Although the details of image processing performed by the second image-data processing unit 14 slightly differ for each process, the description below is given mainly for the copying process.

The filter processing unit 141 performs sharpness correction to enhance the reproducibility of the RGB image data if it is to be output to the plotter unit 19. More particularly, depending on a user-specified image processing mode, the filter processing unit 141 performs sharpening or smoothing of the RGB image data. For example, in a character processing mode, the filter processing unit 141 performs sharpening of characters in the RGB image data; while in a photo processing mode, the filter processing unit 141 performs smoothing to ensure smoother gradation of the RGB image data.

The color converting unit 142 receives the 8-bit RGB image data processed by the filter processing unit 141 and converts the 8-bit RGB image data into 8-bit CMYK image data because CMYK is the suitable color space for the plotter unit 19. Moreover, the color converting unit 142 adjusts the color saturation of the image data depending on the user-specified image processing mode.

The zoom processing unit 143 converts the resolution of the CMYK image data to a resolution suitable for the plotter unit 19. Thus, e.g., if the plotter unit 19 can output an image at 600 dpi and if the zoom processing unit 124 in the first image-data processing unit 12 has already converted the resolution to 600 dpi, then the zoom processing unit 143 does not perform zoom processing.

The gradation processing unit 144 performs gradation conversion of the CMYK image data according to the gradation processing capacity of the plotter unit 19. For example, the gradation processing unit 144 performs gradation conversion of 2-bit CMYK image data by using an error diffusion technique, which is one of the pseudo halftone processing techniques.

Meanwhile, if the user instructs the MFP 100 to perform facsimile transmission of the image data, then the second image-data processing unit 14 converts the image data into monochrome two-value image data suitable for facsimile transmission. Similarly, if the user instructs the MFP 100 to perform scanner distribution of the image data, then the second image-data processing unit 14 converts the image data into a format suitable for scanner distribution (e.g., RGB multivalued image data, grayscale image data, or monochrome two-value image data). In this way, the characteristics and the format of the image data processed by the second image-data processing unit 14 differ for each user-specified process. Apart from that, the sequence of image processing tasks performed prior to the image processing in the second image-data processing unit 14 is identical for all user-specified processes. The bus control unit 13 receives the CMYK image data from the second image-data processing unit 14 and stores the CMYK image data in the memory 17 via the CPU 16. Subsequently, the CMYK image data is sent to the plotter unit 19 from the memory 17 via the CPU 16 and the plotter I/F unit 18. The plotter unit 19 prints the CMYK image data on a recording medium such as transfer paper to produce a copy of the original.

In this way, according to the first embodiment, an output-prohibit area in the image data is masked to hide the details mentioned therein. The blank space created in the output-prohibit area due to masking is overwritten by rearranging the remaining image data. Overwriting of the output-prohibit area makes it difficult to realize that the image data has been masked. That facilitates in hiding the details mentioned in the output-prohibit area and preventing the hidden details from being inferred by analogy.

Meanwhile, the above description according to the first embodiment is also applicable when the RGB image data read by the reading unit 11 is to be displayed on a display unit (not shown) of the PC 27. Even in that case, the CPU 16 performs masking of the output-prohibit areas in the RGB image data and rearranges the remaining areas in the RGB image data to overwrite the output-prohibit areas. The rearranged RGB image data is then output to the PC 27 via the external I/F unit 22.

Figure 7:
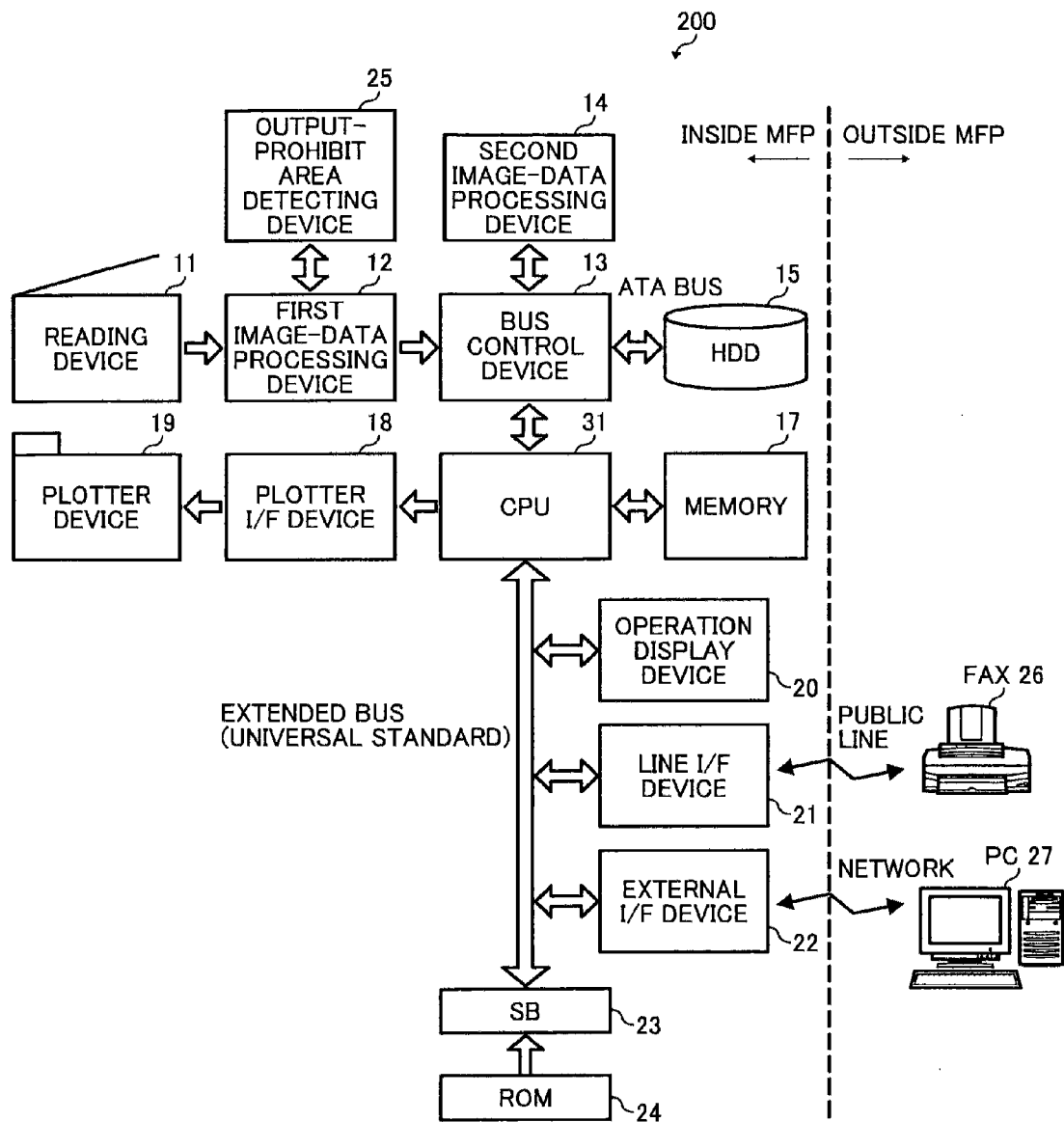
FIG. 7 is a block diagram for explaining an exemplary configuration of a digital color MFP according to a second embodiment of the present invention.

In the first embodiment, it is assumed that the output-prohibit area information is embedded in advance in the original to be scanned. On the other hand, a digital color MFP 200 according to a second embodiment of the present invention allows the user to specify one or more output-prohibit areas in RGB image data that is obtained by scanning an original and appends a security code to the RGB image data based on the user-specified output-prohibit areas. The details of the configuration/operations of the MFP 200 that are identical to the details according to the first embodiment are not repeated for clarity. FIG. 7 is a block diagram for explaining an exemplary configuration of the MFP 200. The MFP 200 includes the reading unit 11, the first image-data processing unit 12, the bus control unit 13, the second image-data processing unit 14, the HDD 15, a CPU 31, the memory 17, the plotter I/F unit 18, the plotter unit 19, the operation display unit 20, the line I/F unit 21, the external I/F unit 22, the SB 23, the ROM 24, and the output-prohibit area detecting unit 25.

The CPU 31 is a microprocessor that controls operations of the entire MFP 200. The CPU 31 executes computer programs stored in the HDD 15 and/or the ROM 24 to perform the functions described below in addition to the functions described in the first embodiment.

More particularly, the CPU 31 analyzes the image data obtained by the reading unit 11 and calculates layout areas such as a text area, a multi-column area, and a picture area that make up the image data. Herein, it is assumed that a known layout analysis technique is used for the calculation of layout areas.

When the user operates the operation display unit 20 to specify particular layout areas as output-prohibit areas, the CPU 31 receives the user-specified information, generates a security code that includes the information regarding the user-specified output-prohibit areas, and appends the security code to the image data. The plotter unit 19 prints the image data with appended security code on a recording medium to produce an original that contains information regarding the user-specified output-prohibit areas (hereinafter, "original containing output-prohibit area information"). Given below is the sequence of operations for producing the original containing output-prohibit area information.

First, the user operates the operation display unit 20 and instructs the MFP 200 to produce an original containing output-prohibit area information. The operation display unit 20 converts the user-specified information into control command data and sends the control command data to the CPU 31. Subsequently, based on the control command data about producing an original containing output-prohibit area information, the CPU 31 executes a corresponding computer program and performs necessary settings.

Then, the user sets an original in the reading unit 11 and operates the operation display unit 20 for inputting an instruction to start reading the original. The operation display unit 20 converts the user-specified information into control command data and sends the control command data to the CPU 31. In the second embodiment, the sequence from reading an original to storing RGB image data in the memory 17 is identical to the sequence described in the copying process according the first embodiment. Hence, that description is not repeated for clarity.

The CPU 31 confirms that RGB image data obtained by the reading unit 11 is stored in the memory 17 and calculates all layout areas that make up the RGB image data. Subsequently, the CPU 31 assigns unique identification information (e.g., a unique layout area) to each layout area. For example, the CPU 31 assigns the layout areas in ascending order from the topmost layout area to the bottommost layout area in the RGB image data.

Figure 8:
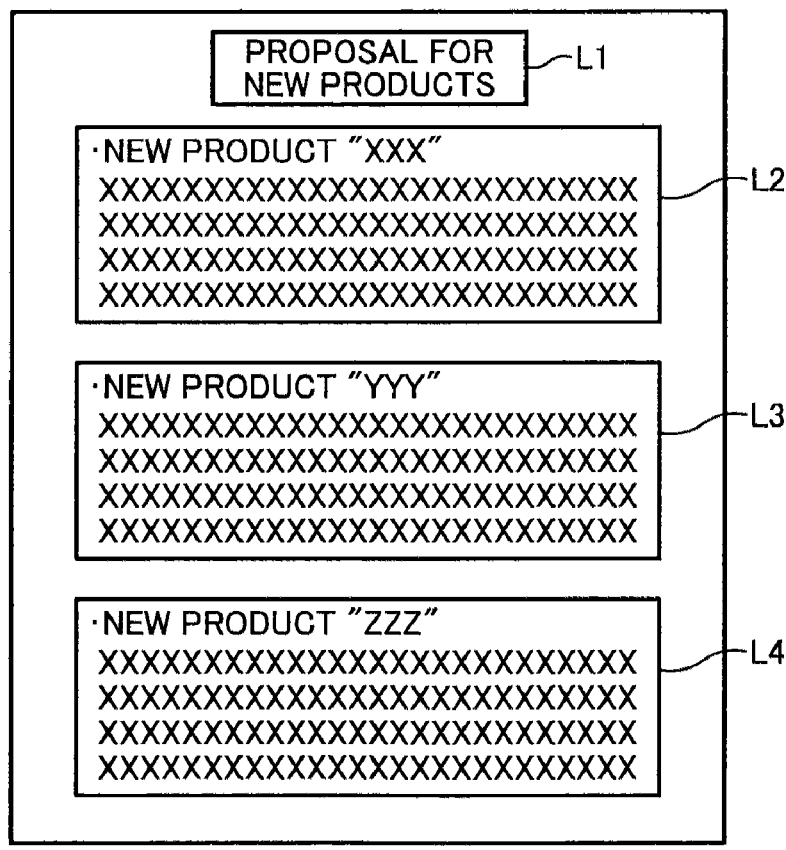
FIG. 8 is a schematic diagram of an exemplary layout area configuration of RGB image data.
Figure 9:
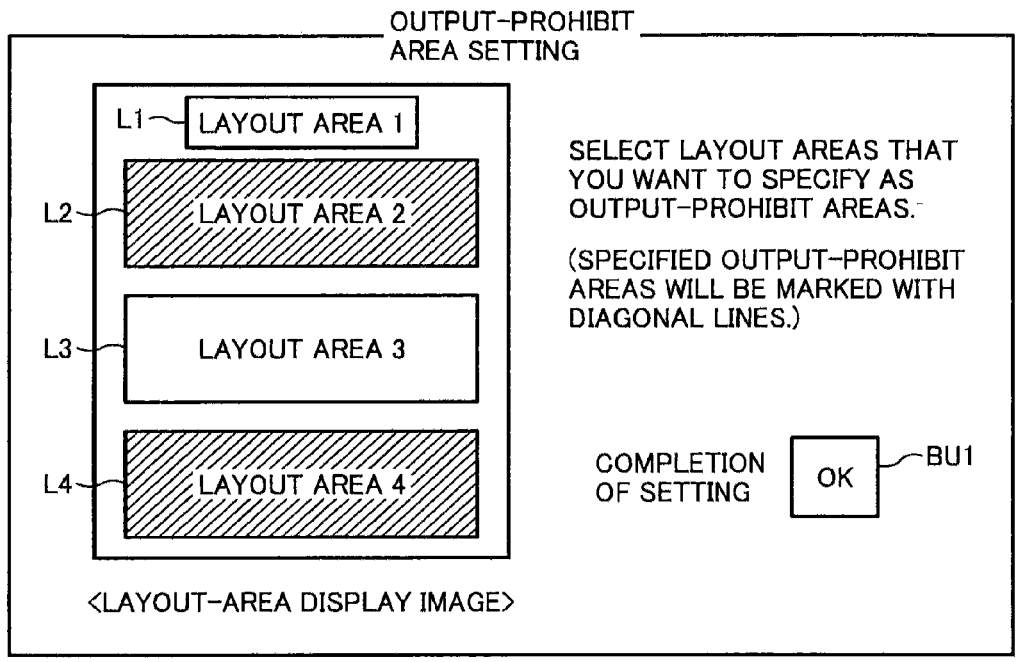
FIG. 9 is a schematic diagram of an exemplary layout-area display image that includes the layout area configuration shown in FIG. 8.

For example, consider a case shown in FIG. 8 when the CPU 31 calculates four layout areas L1 to L4 from the RGB image data. In that case, the CPU 31 displays a layout-area display image (see FIG. 9) on the operation display unit 20 (or on the display unit of the PC 27 via the external I/F unit 22). In the example shown in FIG. 9, the layout areas (layout area 1 to layout area 4) are assigned in ascending order from the topmost layout area (layout area L1) to the bottommost layout area (layout area L4).

Meanwhile, the layout-area display image can be generated by the CPU 31 or by the second image-data processing unit 14. For the generation of the layout-area display image by the second image-data processing unit 14, the RGB image data stored in the memory 17 is sent to the second image-data processing unit 14 via the CPU 31 and the bus control unit 13 and the RGB image data processed by the second image-data processing unit 14 is again stored in the memory 17 via the bus control unit 13 and the CPU 31.

The user can specify one or more layout areas from among the layout areas displayed in the layout-area display image as output-prohibit areas. For example, if the user operates the operation display unit 20 and specifies the layout areas L2 and L4 as the output-prohibit areas (see FIG. 9), then the operation display unit 20 notifies the CPU 31 of the user-specified output-prohibit areas. Subsequently, the CPU 31 stores the layout areas L2 and L4 in the memory 17 and displays the layout areas L2 and L4 in a highlighted manner in the layout-area display image (see FIG. 9).

When the user presses a button BU1 to indicate that the output-prohibit areas have been specified, the operation display unit 20 notifies the CPU 31 of the same. Subsequently, the CPU 31 generates a security code that represents the layout areas of the user-specified output-prohibit areas.

Figure 10:
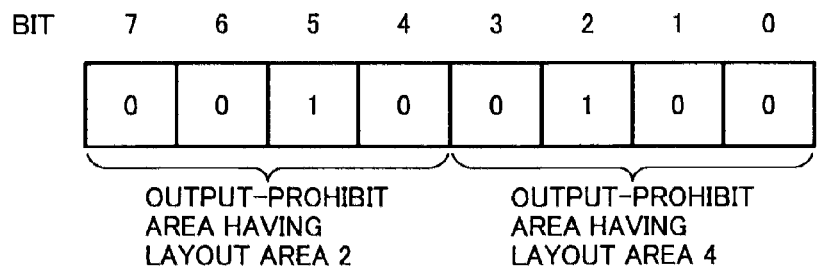
FIG. 10 is a schematic diagram of an exemplary security code that is generated by a central processing unit (CPU) shown in FIG. 7.

FIG. 10 is a schematic diagram of an exemplary 8-bit security code generated by the CPU 31. In the security code, four bits are allocated to each of the two layout areas of the user-specified output-prohibit areas and each layout area is represented as a 4-bit binary number. As shown in FIG. 10, the binary number "0010" between the bit 7 and the bit 4 represents the layout area 2 of the layout area L2, while the binary number "0100" between the bit 3 and the bit 0 represents the layout area 4 of the layout area L4.

The bit configuration of the security code or the number of bits allocated to a layout area is not limited to the description with reference FIG. 10. Moreover, the method of representing output-prohibit areas is also not limited to the description with reference FIG. 10. Different configurations of the security code are described later in detail.

Upon generating the security code, the CPU 31 sends the RGB image data from the memory 17 to the second image-data processing unit 14 via the bus control unit 13. The second image-data processing unit 14 converts the RGB image data into CMYK image data in an identical manner as described in the first embodiment.

Subsequently, the bus control unit 13 receives the CMYK image data from the second image-data processing unit 14 and stores the CMYK image data in the memory 17 via the CPU 31. The CPU 31 converts each bit of the security code into a dot pattern, appends the dot patterns as pattern data to the CMYK image data, and sends the CMYK image data with appended pattern data to the plotter unit 19 via the plotter I/F unit 18. The plotter unit 19 prints the CMYK image data with appended pattern data on a recording medium to produce an original containing output-prohibit area information.

The original containing output-prohibit area information contains the security code shown in FIG. 10. If the user instructs the MFP 200 to produce a copy of the original containing output-prohibit area information, then the details mentioned in the layout areas L2 and L4 specified as the output-prohibit areas are hidden and the remaining layout areas L1 and L3 are rearranged in an identical manner as described in the first embodiment. As a result, the copy of the original containing output-prohibit area information does not include the details mentioned in the output-prohibit areas (layout areas L2 and L4). Meanwhile, although the description is given only for the copying process, the basic operations in the processes of scanner distribution, printing, facsimileing, and printing of stored data are substantially similar.

In this way, according to the second embodiment, an output-prohibit area in the image data is masked to hide the details mentioned therein. The blank space created in the output-prohibit area due to masking is overwritten by rearranging the remaining layout areas. Overwriting of the output-prohibit area makes it difficult to realize that the image data has been masked. That facilitates in hiding the details mentioned in the output-prohibit area and preventing the hidden details from being inferred by analogy.

Moreover, performing the masking and rearranging operations on the basis of layout areas facilitates in enhancing the efficiency of the MFP 200.

Meanwhile, in the second embodiment, the security code (pattern data) is appended not to the RGB image data but to the CMYK image data. That is because the plotter unit 19 requires the image data in CMYK color space for printing. However, if it is not necessary to print the RGB image data (e.g., in the case of storing the RGB image data in the HDD 15 or in an external storage device), it is also possible to append the security code to the RGB image data. Moreover, in the case of displaying the RGB image data with appended security code on the display unit of the PC 27, it is possible to display the rearranged RGB image data (RGB image data subjected to masking and rearrangement by the CPU 31) or to display the RGB image data that is appended with the security code but not yet subjected to masking and rearrangement. In the latter case, the displayed RGB image data can be printed to obtain an original containing output-prohibit area information and the original containing output-prohibit area information can be used to perform masking and rearrangement operations in an identical manner as described in the first embodiment.

The description according to the second embodiment (i.e., allowing the user to specify output-prohibit areas in the image data, producing an original containing output-prohibit area information, and producing a copy of the original containing output-prohibit area information) is given on the premise that the image data obtained by scanning the original containing output-prohibit area information is stored in the memory 17 with an orientation identical to the orientation of the image data used at the time of specifying output-prohibit areas. That is when the security code described in the second embodiment provides correct information regarding the user-specified output-prohibit areas. On the other hand, consider a case when the image data obtained by scanning the original containing output-prohibit area information is stored in the memory 17 with an orientation rotated by, although not limited to, 90° or 180° with respect to the orientation of the image data used at the time of specifying the output-prohibit areas. In that case, it is likely that layout areas not specified by the user as the output-prohibit areas get incorrectly masked and overwritten, while the user-specified output-prohibit areas are output without being masked.

Figure 11A:
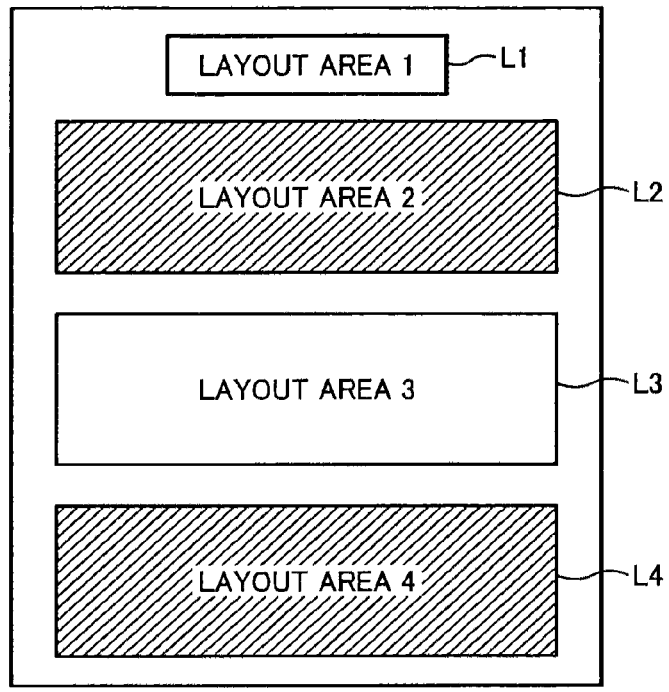
FIG. 11A is a schematic diagram of an exemplary layout area configuration of RGB image data that includes user-specified output-prohibit areas.

For example, consider a case when RGB image data shown in FIG. 11A is obtained by scanning an original containing output-prohibit area information and is stored in the memory 17. The RGB image data includes four layout areas L1 to L4 to which layout areas are assigned in ascending order from the topmost layout area (layout area L1) to the bottommost layout area (layout area L4). It is assumed that the user has specified the layout areas L2 and L4 as the output-prohibit areas and the original containing output-prohibit area information is generated with the security code that provides information regarding the user-specified output-prohibit areas (layout areas L2 and L4).

Figure 11B:
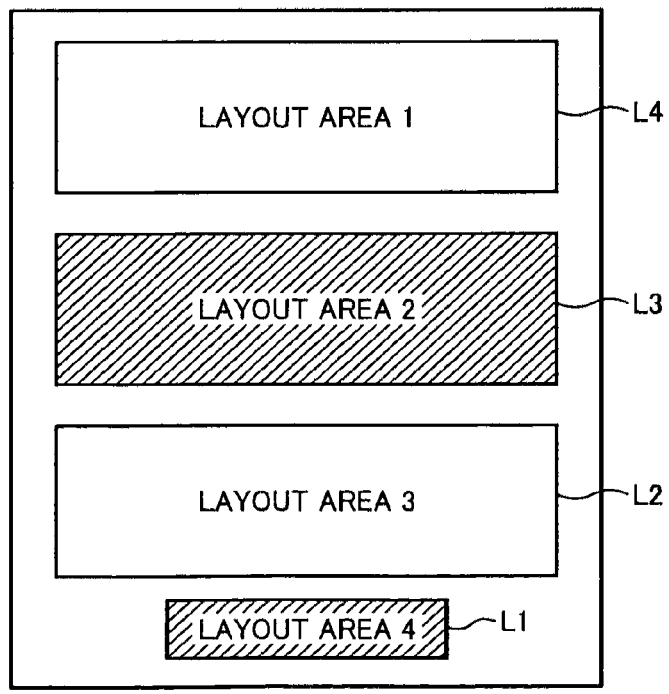
FIG. 11B is a schematic diagram of a layout area configuration of RGB image data that is rotated by 180° with respect to the orientation of the RGB data shown in FIG. 11A.

According to the orientation in which the original containing output-prohibit area information is set in the reading unit 11 for scanning, there is a possibility that the reading unit 11 obtains RGB image data with an orientation rotated by, although not limited to, 90° or 180° with respect to the orientation of the RGB image data used at the time of specifying the output-prohibit areas. The RGB image data of the original containing output-prohibit area information is stored in the memory 17 with the same orientation as obtained by the reading unit 11. For example, FIG. 11B is a schematic diagram of the RGB image data that is rotated by 180° with respect to the orientation of the RGB data shown in FIG. 11A. If the RGB image data shown in FIG. 11B is stored in the memory 17, the layout areas are assigned in ascending order from the topmost layout area (layout area L4) to the bottommost layout area (layout area L1). That results in a mismatch between the layout area configuration of the RGB image data shown in FIG. 11A and the layout area configuration of the RGB image data shown in FIG. 11B. Thus, because of the reversal in the order of the layout areas in the RGB image data shown in FIG. 11B, the layout areas L3 and L1 are incorrectly defined as the user-specified output-prohibit areas in the security code. As a result, the details mentioned in the layout areas L3 and L1 are hidden, while the details mentioned in the actual user-specified output-prohibit areas (layout areas L2 and L4) are disclosed at the time of outputting the RGB image data shown in FIG. 11B.

Such a problem can be avoided with the use of a digital color MFP 300 described below according to a third embodiment of the present invention. The details of the configuration/operations of the MFP 300 that are identical to the details according to the abovementioned embodiments are not repeated for clarity.

Figure 12:
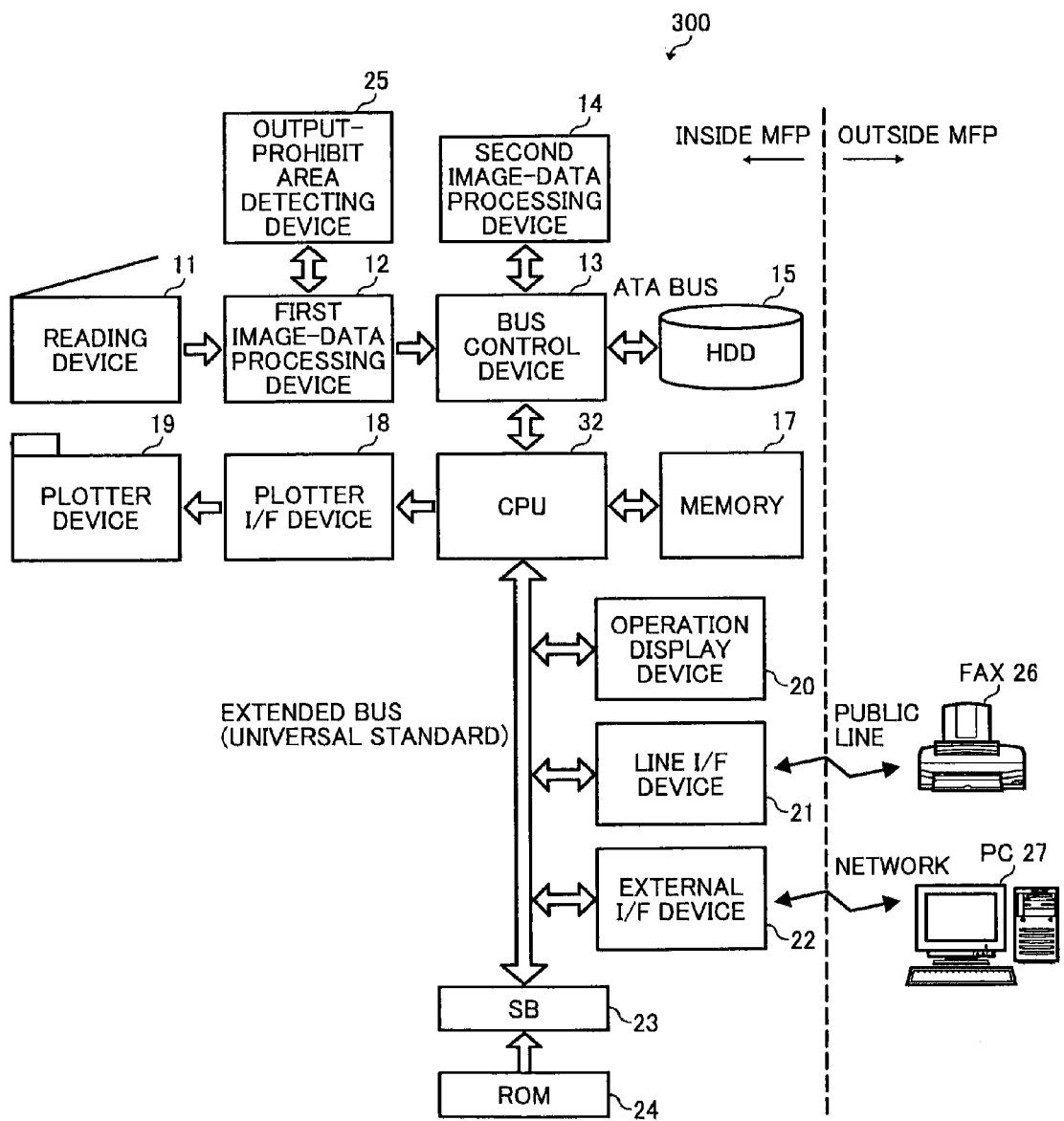
FIG. 12 is a block diagram for explaining an exemplary configuration of a digital color MFP according to a third embodiment of the present invention.

FIG. 12 is a block diagram for explaining an exemplary configuration of the MFP 300. The MFP 300 includes the reading unit 11, the first image-data processing unit 12, the bus control unit 13, the second image-data processing unit 14, the HDD 15, a CPU 32, the memory 17, the plotter I/F unit 18, the plotter unit 19, the operation display unit 20, the line I/F unit 21, the external I/F unit 22, the SB 23, the ROM 24, and the output-prohibit area detecting unit 25.

The CPU 32 is a microprocessor that controls operations of the entire MFP 300. The CPU 32 executes computer programs stored in the HDD 15 and/or the ROM 24 to perform the functions described below in addition to the functions described in the first two embodiments.

More particularly, the CPU 32 analyzes the image data obtained by the reading unit 11 and calculates layout areas that make up the image data. Moreover, the CPU 32 calculates the centroid of each layout area and generates a layout table in which the layout areas and the centroids are placed in a corresponding manner. When the user operates the operation display unit 20 to specify particular layout areas as output-prohibit areas, the CPU 32 receives the user-specified information, generates a security code that includes information regarding the user-specified output-prohibit areas and identification information of the layout table, and appends the security code to the image data. The plotter unit 19 prints the image data with appended security code on a recording medium to produce an original containing output-prohibit area information.

If the user operates the operation display unit 20 to instruct, e.g., copying of the original containing output-prohibit area information, the CPU 32 reads the centroid of each layout area from the layout table corresponding to the security code appended to the original containing output-prohibit area information. Subsequently, the CPU 32 compares the centroids of the layout areas written in the layout table corresponding to the security code with the centroids of the layout areas present in the RGB image data obtained by scanning the original containing output-prohibit area information. Depending on the comparison result, the CPU 32 adjusts the angle of the RGB image data such that the centroids of the layout areas in the layout table and the centroids of the layout areas in the RGB image data coincide.

Given below is the sequence of operations peculiar to the CPU 32 in producing an original containing output-prohibit area information and producing a copy of the original containing output-prohibit area information.

First, the user operates the operation display unit 20 and instructs the MFP 300 to produce an original containing output-prohibit area information. The operation display unit 20 converts the user-specified information into control command data and sends the control command data to the CPU 32. Subsequently, based on the control command data about producing an original containing output-prohibit area information, the CPU 32 executes a corresponding computer program and performs necessary settings.

Then, the user sets an original in the reading unit 11 and operates the operation display unit 20 for inputting an instruction to start reading the original. The operation display unit 20 converts the user-specified information into control command data and sends the control command data to the CPU 32. In the third embodiment, the sequence from reading an original to storing RGB image data in the memory 17 is identical to the sequence described in the copying process according to the first embodiment. Hence, that description is not repeated for clarity.

The CPU 32 confirms that RGB image data obtained by the reading unit 11 is stored in the memory 17 and calculates all layout areas that make up the RGB image data. Subsequently, the CPU 32 assigns a unique layout area to each layout area.

Figure 13:
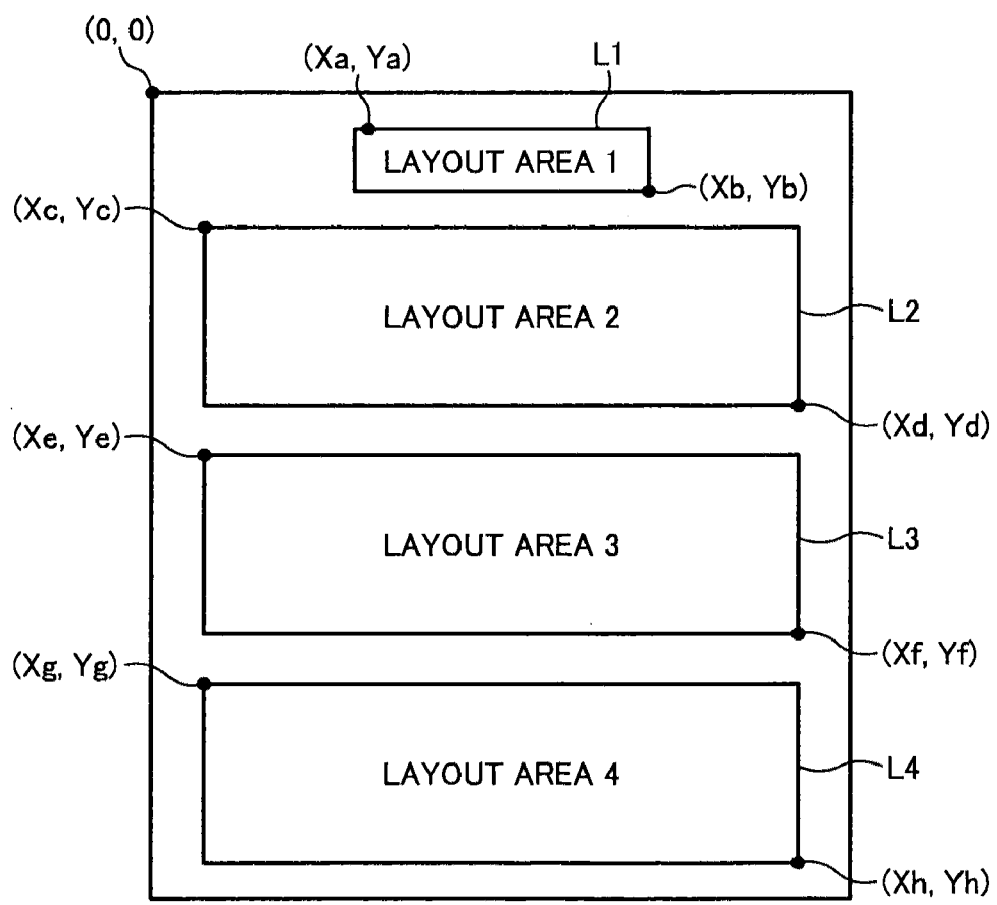
FIG. 13 is a schematic diagram of an exemplary layout area configuration of RGB image data along with position coordinates of each layout area.

For example, consider a case shown in FIG. 13 when the CPU 32 calculates four layout areas L1 to L4 from the RGB image data. Subsequently, the CPU 32 calculates a position coordinate (top left coordinate, bottom right coordinate) of each layout area with reference to the top left coordinate of the RGB image data as origin (0,0). In the example shown in FIG. 13, the layout area L1 has the position coordinate ((Xa, Ya),(Xb,Yb)), the layout area L2 has the position coordinate ((Xc,Yc),(Xd,Yd)), the layout area L3 has the position coordinate ((Xe,Ye),(Xf,Yf)), and the layout area L4 has the position coordinate ((Xg,Yg),(Xh,Yh)). Meanwhile, the origin (0,0) is not limited to the top left coordinate of the RGB image data and can be determined arbitrarily.

Subsequently, the CPU 32 calculates the centroid of each of the layout areas L1 to L4 by using the corresponding position coordinate. More particularly, with respect to each layout area, the CPU 32 obtains a sum of the X-coordinates and a sum of the Y-coordinates in the position coordinate and divides each sum by two to obtain the centroid. The CPU 32 then generates a layout table in which the layout area and the centroid of each layout area are placed in a corresponding manner. Moreover, the CPU 32 appends unique identification information such as a table registration to the layout table and stores the layout table in the memory 17.

Figures 14, 15, 16:
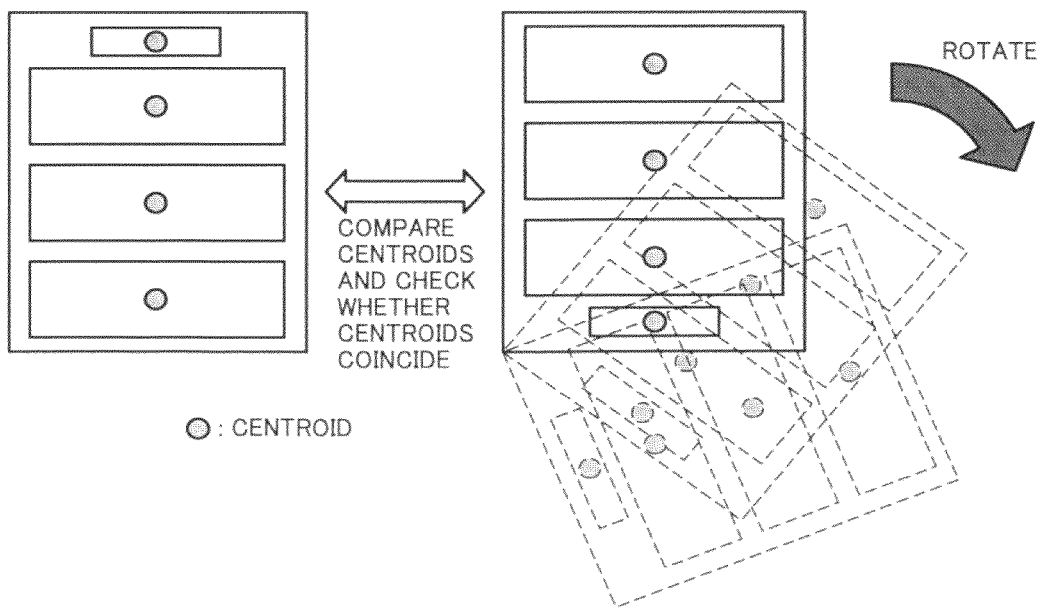
FIG. 14 is an exemplary layout table generated by a CPU shown in FIG. 12 corresponding to the layout area configuration shown in FIG. 13.
FIG. 15 is a schematic diagram of an exemplary security code generated by the CPU shown in FIG. 12.
FIG. 16 is a schematic diagram for explaining centroid adjustment of layout areas in RGB image data that includes user-specified output-prohibit areas.

FIG. 14 is an exemplary layout table corresponding to the RGB image data shown in FIG. 13. In the layout table, the layout area and the centroid of each of the layout areas L1 to L4 are placed in a corresponding manner. Moreover, 'table registration 1' mentioned on the top of the layout table is the unique identification information of the layout table.

Upon generating the layout table, the CPU 32 displays a layout-area display image, identical to that described in the second embodiment, on the operation display unit 20 (or on the display unit of the PC 27 via the external I/F unit 22).

The user can specify one or more layout areas from among the layout areas displayed in the layout-area display image as output-prohibit areas. Subsequently, the operation display unit 20 notifies the CPU 32 of the user-specified output-prohibit areas (e.g., the layout areas L2 and L4). The CPU 32 stores the layout areas of the user-specified output-prohibit areas in the memory 17 and displays the user-specified output-prohibit areas in a highlighted manner in the layout-area display image.

When the CPU 32 receives an indication that the output-prohibit areas have been specified, the CPU 32 generates a security code that represents the layout areas of the user-specified output-prohibit areas and the table registration of the layout table.

FIG. 15 is a schematic diagram of an exemplary 8-bit security code generated by the CPU 32. In the security code, the first two bits (bit 7 and bit 6) are allocated to the table registration, while the subsequent bit groups of three bits each (a bit group from bit 5 to bit 3 and a bit group from bit 2 to bit 0) are allocated to the layout areas of the user-specified output-prohibit areas. The security code shown in FIG. 15 indicates that the user has specified the layout areas L2 and L4 as the output-prohibit areas.

Upon generating the security code, the CPU 32 sends the RGB image data from the memory 17 to the second image-data processing unit 14 via the bus control unit 13. The second image-data processing unit 14 converts the RGB image data into CMYK image data in an identical manner as described in the first embodiment.

Subsequently, the bus control unit 13 receives the CMYK image data from the second image-data processing unit 14 and stores the CMYK image data in the memory 17 via the CPU 32. The CPU 32 converts each bit of the security code into a dot pattern, appends the dot patterns as pattern data to a predetermined area in the CMYK image data, and sends the CMYK image data with appended pattern data to the plotter unit 19 via the plotter I/F unit 18. The plotter unit 19 prints the CMYK image data with appended pattern data on a recording medium to produce an original containing output-prohibit area information. When the original containing output-prohibit area information is produced, the CPU 32 moves the layout table from the memory 17 and stores it in the HDD 15.

The original containing output-prohibit area information contains the security code shown in FIG. 15. Given below is the description of producing a copy of the original containing output-prohibit area information.

First, the user sets the original containing output-prohibit area information in the reading unit 11 and operates the operation display unit 20 to input a desired copying mode and an instruction to start the copying process. The operation display unit 20 converts the user-specified information into control command data and sends the control command data to the CPU 32. Based on the control command data about starting the copying process, the CPU 32 executes the copying program and performs necessary settings for copying.

The output-prohibit area detecting unit 25 detects dot patterns from the original containing output-prohibit area information and converts the dot patterns into a multi-bit security code. Then, the output-prohibit area detecting unit 25 stores the security code in the register and outputs a detection signal to the first image-data processing unit 12. The detection signal indicates that output-prohibit area information has been detected. Upon receiving the detection signal, the first image-data processing unit 12 requests an interrupt to the CPU 32. The interrupt triggers the CPU 32 to refer to the register of the output-prohibit area detecting unit 25 and obtain the security code.

The CPU 32 confirms that RGB image data obtained by the reading unit 11 is stored in the memory 17 and calculates all layout areas that make up the RGB image data. Moreover, the CPU 32 calculates the centroid of each layout area with reference to the origin (0,0), which is assumed to be the top left coordinate of the RGB image data.

Subsequently, the CPU 32 reads the layout table, which is identified by the table registration mentioned in the security code, from the HDD 15. The CPU 32 compares the centroids of the layout areas specified in the layout table with the centroids of the layout areas present in the RGB image data obtained by scanning the original containing output-prohibit area information. If the compared centroids do not coincide, the CPU 32 adjusts the angle of the RGB image data such that the centroids in the layout table and the centroids in the RGB image data coincide or substantially coincide. As a result, the orientation of the RGB image data obtained by scanning the original containing output-prohibit area information becomes identical or substantially identical to the orientation of the RGB image data used at the time of specifying the output-prohibit areas.

FIG. 16 is a schematic diagram for explaining the adjustment of the centroids of the layout areas in the RGB image data obtained by scanning the original containing output-prohibit area information. The RGB image data used at the time of specifying the output-prohibit areas is shown on the left side of FIG. 16, while the RGB image data obtained by scanning the original containing output-prohibit area information is shown on the right side of FIG. 16. The CPU 32 rotates the RGB image data obtained by scanning the original containing output-prohibit area information such that the centroids of the layout areas in both the RGB image data coincide or substantially coincide. Meanwhile, the direction of rotation or the reference position for rotation is not limited to the example shown in FIG. 16.

Subsequently, the CPU 32 performs masking of the output-prohibit areas corresponding to the layout areas mentioned in the security code and overwrites the blank spaces created in the output-prohibit areas due to masking by rearranging the remaining layout areas. The details of the masking and rearranging operations are identical to the operations described in the first embodiment.

The CPU 32 then outputs the rearranged RGB image data to the second image-data processing unit 14 via the bus control unit 13. The second image-data processing unit 14 converts the RGB image data into CMYK image data and outputs the CMYK image data to the plotter unit 19. The plotter unit 19 prints the CMYK image data on a recording medium such as transfer paper to produce a copy of the original containing output-prohibit area information.

In this way, according to the third embodiment, an output-prohibit area in the image data is masked to hide the details mentioned therein. The blank space created in the output-prohibit area due to masking is overwritten by rearranging the remaining layout areas. Overwriting of the output-prohibit area makes it difficult to realize that the image data has been masked. That facilitates in hiding the details mentioned in the output-prohibit area and preventing the hidden details from being inferred by analogy.

Moreover, because the user is allowed to specify the output-prohibit areas from among the calculated layout areas, it is possible to output the image data in the format that meets the user requirement. That enhances the user-friendliness of the MFP 300.

Meanwhile, instead of storing the centroid of each layout area in the layout table, it is also possible to configure the security code to include the centroids. In that case, there is no need to store the layout table in the HDD 15.

Given below is the description of a digital color MFP 400 according to a fourth embodiment of the present invention. In the MFP 400, output-prohibit areas can be specified in a different manner than described in the second and third embodiments. The details of the configuration/operations of the MFP 400 that are identical to the details according to the abovementioned embodiments are not repeated for clarity.

Figure 17:
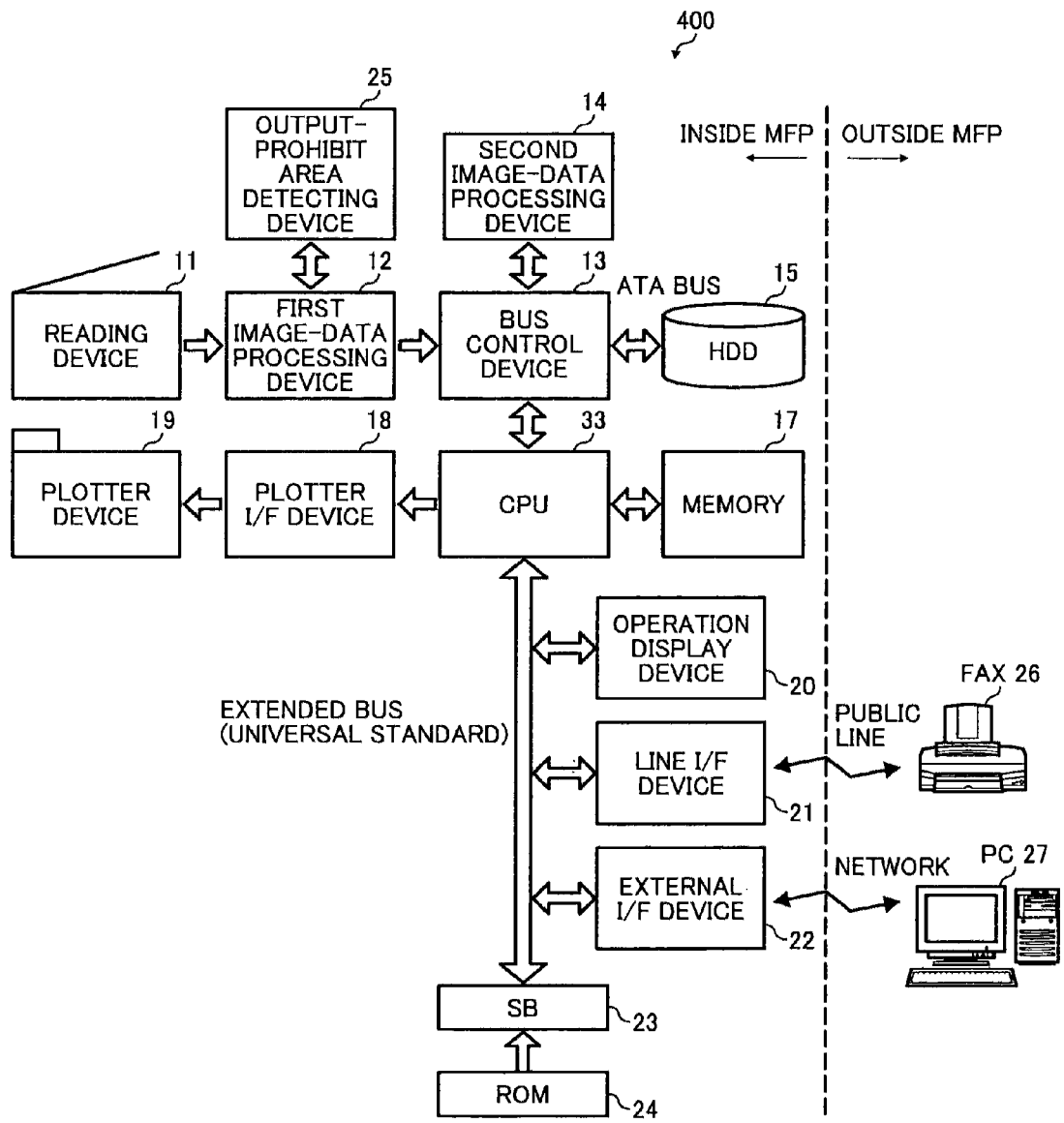
FIG. 17 is a block diagram for explaining an exemplary configuration of a digital color MFP according to a fourth embodiment of the present invention.

FIG. 17 is a block diagram for explaining an exemplary configuration of the MFP 400. The MFP 400 includes the reading unit 11, the first image-data processing unit 12, the bus control unit 13, the second image-data processing unit 14, the HDD 15, a CPU 33, the memory 17, the plotter I/F unit 18, the plotter unit 19, the operation display unit 20, the line I/F unit 21, the external I/F unit 22, the SB 23, the ROM 24, and the output-prohibit area detecting unit 25.

The CPU 33 is a microprocessor that controls operations of the entire MFP 400. The CPU 33 executes computer programs stored in the HDD 15 and/or the ROM 24 to perform the functions described below in addition to the functions described in the abovementioned embodiments.

More particularly, when the user specifies one or more areas in the RGB image data displayed on the operation display unit 20, the CPU 33 calculates the position coordinate (top left coordinate, bottom right coordinate) of each user-specified area on the RGB image data and sets the user-selected areas as layout areas. The position coordinates are calculated with reference to a predetermined origin (e.g., top left coordinate) of the RGB image data.

Moreover, the CPU 33 generates a layout table in which the layout areas and the position coordinates are placed in a corresponding manner. When the user operates the operation display unit 20 to specify particular layout areas as output-prohibit areas, the CPU 33 receives the user-specified information and generates a security code that includes information regarding the user-specified output-prohibit areas and identification information of the layout table. The CPU 33 then appends the security code to CMYK image data generated by the second image-data processing unit 14. The plotter unit 19 prints the CMYK image data with appended security code on a recording medium to produce an original containing output-prohibit area information.

If the user operates the operation display unit 20 to instruct, e.g., copying of the original containing output-prohibit area information, the CPU 33 reads the position coordinate of each layout area from the layout table corresponding to the security code appended to the original containing output-prohibit area information and identifies the user-specified output-prohibit areas mentioned in the security code from among the layout areas.

Given below is the sequence of operations peculiar to the CPU 33 in producing an original containing output-prohibit area information and producing a copy of the original containing output-prohibit area information.

First, the user operates the operation display unit 20 and instructs the MFP 400 to produce an original containing output-prohibit area information. The operation display unit 20 converts the user-specified information into control command data and sends the control command data to the CPU 33. Subsequently, based on the control command data about producing an original containing output-prohibit area information, the CPU 33 executes a corresponding computer program and performs necessary settings.

Then, the user sets an original in the reading unit 11 and operates the operation display unit 20 for inputting an instruction to start reading the original. The operation display unit 20 converts the user-specified information into control command data and sends the control command data to the CPU 33. In the fourth embodiment, the sequence from reading an original to storing RGB image data in the memory 17 is identical to the sequence described in the copying process according the first embodiment. Hence, that description is not repeated for clarity.

The CPU 33 confirms that RGB image data obtained by the reading unit 11 is stored in the memory 17 and displays the RGB image data on the operation display unit 20 (or on the display unit of the PC 27) as a layout-area display image. That is, unlike in the case of the second and third embodiments, the CPU 33 does not calculate layout areas from the RGB image data stored in the memory 17. Instead, the CPU 33 displays the RGB image data as it is as the layout-area display image.

The user can arbitrarily enclose rectangular areas in the layout-area display image and specify the enclosed areas as layout areas. When the user finishes specifying the layout areas, the operation display unit 20 notifies the CPU 33 about the same.

Subsequently, the CPU 33 calculates the position coordinate of each enclosed area on the RGB image data and sets the enclosed areas as user-specified layout areas. The CPU 33 displays the user-specified layout areas for confirmation in the layout-area display image. Moreover, the CPU 33 assigns a unique layout area to each user-specified layout area. Meanwhile, there is no limitation on the number of layout areas that the user can specify.

The CPU 33 then generates a layout table in which the layout area and the position coordinate of each user-specified layout area are placed in a corresponding manner. Moreover, the CPU 33 appends unique identification information (e.g., a table registration) to the layout table and stores the layout table in the memory 17.

For example, identical to the example shown in FIG. 13, assume that the user specifies layout areas L1 to L4 from the RGB image data. In that case, the CPU 33 generates a layout table as shown in FIG. 18. In the layout table, the layout area and the position coordinate (top left coordinate, bottom right coordinate) of each of the layout areas L1 to L4 are placed in a corresponding manner. Moreover, 'table registration 1' mentioned on the top of the layout table is the unique identification information of the layout table.

The user can specify one or more layout areas as output-prohibit areas from among the layout areas L1 to L4 displayed in the layout-area display image. Subsequently, the operation display unit 20 notifies the CPU 33 of the user-specified output-prohibit areas. The CPU 33 stores the layout areas of the user-specified output-prohibit areas in the memory 17 and displays the user-specified output-prohibit areas in a highlighted manner in the layout-area display image.

When the user presses a button to indicate that the output-prohibit areas have been specified, the operation display unit 20 notifies the CPU 33 of the same. Subsequently, the CPU 33 generates a security code that represents the layout areas of the user-specified output-prohibit areas and the table registration of the layout table.

FIG. 19 is a schematic diagram of an exemplary 8-bit security code generated by the CPU 33. In the security code, the first two bits (bit 7 and bit 6) are allocated to the table registration, while the subsequent bit groups of three bits each (a bit group from bit 5 to bit 3 and a bit group from bit 2 to bit 0) are allocated to the layout areas of the user-specified output-prohibit areas. The value "01" in the first two bits indicates that the layout table has the 'table registration 1' as its unique identification information. Similarly, the value "010" in the bit group from bit 5 to bit 3 and the value "100" in the bit group from bit 2 to bit 0 indicate that the user has specified the layout areas L2 and L4, respectively, as the output-prohibit areas.

Upon generating the security code, the CPU 33 sends the RGB image data from the memory 17 to the second image-data processing unit 14 via the bus control unit 13. The second image-data processing unit 14 converts the RGB image data into CMYK image data in an identical manner as described in the first embodiment.

Subsequently, the bus control unit 13 receives the CMYK image data from the second image-data processing unit 14 and stores the CMYK image data in the memory 17 via the CPU 33. The CPU 33 converts each bit of the security code into a dot pattern and appends the dot patterns as pattern data to a predetermined area in the CMYK image data.

The CPU 33 then sends the CMYK image data with appended pattern data to the plotter unit 19 via the plotter I/F unit 18. The plotter unit 19 prints the CMYK image data with appended pattern data on a recording medium to produce an original containing output-prohibit area information. When the original containing output-prohibit area information is produced, the CPU 33 moves the layout table from the memory 17 and stores it in the HDD 15.

The original containing output-prohibit area information contains the security code shown in FIG. 19. Given below is the description of producing a copy of the original containing output-prohibit area information.

First, the user sets the original containing output-prohibit area information in the reading unit 11 and operates the operation display unit 20 to input a desired copying mode and an instruction to start the copying process. The operation display unit 20 converts the user-specified information into control command data and sends the control command data to the CPU 33. Based on the control command data about starting the copying process, the CPU 33 executes the copying program and performs necessary settings for copying.

The output-prohibit area detecting unit 25 detects dot patterns from the original containing output-prohibit area information and converts the dot patterns into a multi-bit security code. Then, the output-prohibit area detecting unit 25 stores the security code in the register and outputs a detection signal to the first image-data processing unit 12. The detection signal indicates that output-prohibit area information has been detected. Upon receiving the detection signal, the first image-data processing unit 12 requests an interrupt to the CPU 33. The interrupt triggers the CPU 33 to refer to the register of the output-prohibit area detecting unit 25 and obtain the security code.

Subsequently, the CPU 33 reads the layout table, which is identified by the table registration mentioned in the security code, from the HDD 15 and, according to the position coordinates of the layout areas written in the layout table, sets the layout areas in the RGB image data that is obtained by scanning the original containing output-prohibit area information and is stored in the memory 17.

Then, the CPU 33 performs masking of the user-specified output-prohibit areas mentioned in the security code and overwrites the blank spaces created in the output-prohibit areas due to masking by rearranging the remaining layout areas. The details of the masking and rearranging operations are identical to the operations described in the first embodiment.

The CPU 33 outputs the rearranged RGB image data to the second image-data processing unit 14 via the bus control unit 13. The second image-data processing unit 14 converts the RGB image data into CMYK image data and outputs the CMYK image data to the plotter unit 19. The plotter unit 19 prints the CMYK image data on a recording medium such as transfer paper to produce a copy of the original containing output-prohibit area information.

In this way, according to the fourth embodiment, an output-prohibit area in the image data is masked to hide the details mentioned therein. The blank space created in the output-prohibit area due to masking is overwritten by rearranging the remaining layout areas. Overwriting of the output-prohibit area makes it difficult to realize that the image data has been masked. That facilitates in hiding the details mentioned in the output-prohibit area and preventing the hidden details from being inferred by analogy.

Moreover, because the user is allowed to specify the layout areas and the output-prohibit areas, it is possible to output the image data in the format that meets the user requirement. That enhances the user-friendliness of the MFP 400. Furthermore, because there is no need for the CPU 33 to calculate the layout areas, the CPU load decreases thereby enhancing the real-timeliness of the MFP 400.

Meanwhile, in the fourth embodiment, the user first specifies layout areas and then selects output-prohibit areas from among the specified layout areas. Instead, it is also possible to configure the MFP 400 such that the user can enclose rectangular areas in the RGB image data and directly specify the enclosed areas as output-prohibit areas.

Moreover, instead of using the layout table, it is also possible to configure the security code to include the position coordinates of the user-specified output-prohibit areas as binary numbers. In that case, there is no need to store the layout table in the HDD 15.

Given below is the description of a digital color MFP 500 according to a fifth embodiment of the present invention. Unlike in the case according to the first embodiment when an output-prohibit area is always overwritten by an area lying beneath the output-prohibit area, the MFP 500 allows the user to arbitrarily specify one or more layout areas to be shifted (rearranged) for overwriting an output-prohibit area. The details of the configuration/operations of the MFP 500 that are identical to the details according to the abovementioned embodiments are not repeated for clarity.

Figure 20:
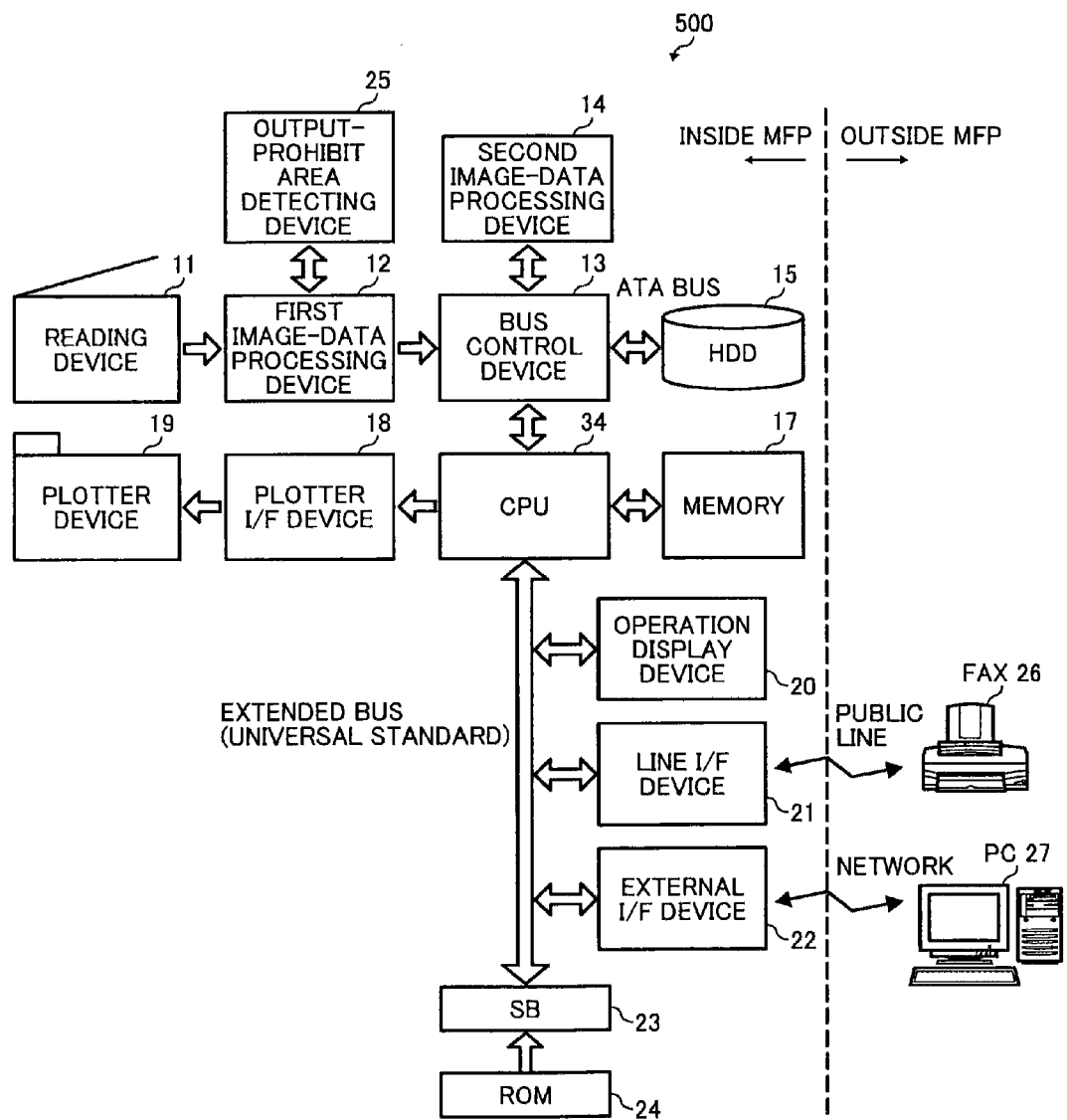
FIG. 20 is a block diagram for explaining an exemplary configuration of a digital color MFP according to a fifth embodiment of the present invention.

FIG. 20 is a block diagram for explaining an exemplary configuration of the MFP 500. The MFP 500 includes the reading unit 11, the first image-data processing unit 12, the bus control unit 13, the second image-data processing unit 14, the HDD 15, a CPU 34, the memory 17, the plotter I/F unit 18, the plotter unit 19, the operation display unit 20, the line I/F unit 21, the external I/F unit 22, the SB 23, the ROM 24, and the output-prohibit area detecting unit 25.

The CPU 34 is a microprocessor that controls operations of the entire MFP 500. The CPU 34 executes computer programs stored in the HDD 15 and/or the ROM 24 to perform the functions described below in addition to the functions described in the abovementioned embodiments.

Assume that the user specifies an output-prohibit area from among calculated layout areas and then specifies a layout area from among the remaining layout areas that is be shifted for overwriting the output-prohibit area. In that case, the CPU 34 generates a security code that includes the information regarding the user-specified output-prohibit area, the user-specified layout area to be shifted for overwriting the output-prohibit area, and the direction in which the user-specified layout area needs to be shifted. The CPU 34 then appends the security code to CMYK image data generated by the second image-data processing unit 14. The plotter unit 19 prints the CMYK image data with appended security code on a recording medium to produce an original containing output-prohibit area information.

If the user operates the operation display unit 20 to instruct, e.g., copying of the original containing output-prohibit area information, the CPU 34 performs masking of the output-prohibit area mentioned in the corresponding security code and shifts the user-specified layout area over the output-prohibit area according to the direction mentioned in the corresponding security code.

Given below is the sequence of operations peculiar to the CPU 34 in producing an original containing output-prohibit area information and producing a copy of the original containing output-prohibit area information.

First, the user operates the operation display unit 20 and instructs the MFP 500 to produce an original containing output-prohibit area information. The operation display unit 20 converts the user-specified information into control command data and sends the control command data to the CPU 34. Subsequently, based on the control command data about producing an original containing output-prohibit area information, the CPU 34 executes a corresponding computer program and performs necessary settings.

Then, the user sets an original in the reading unit 11 and operates the operation display unit 20 for inputting an instruction to start reading the original. The operation display unit 20 converts the user-specified information into control command data and sends the control command data to the CPU 34. In the fifth embodiment, the sequence from reading an original to storing RGB image data in the memory 17 is identical to the sequence described in the copying process according the first embodiment. Hence, that description is not repeated for clarity.

The CPU 34 confirms that RGB image data obtained by the reading unit 11 is stored in the memory 17 and calculates all layout areas that make up the RGB image data. Subsequently, the CPU 34 assigns a unique layout area to each layout area and displays a layout-area display image on the operation display unit 20 (or on the display unit of the PC 27 via the external I/F unit 22).

The user can specify one or more layout areas from among the layout areas displayed in the layout-area display image as output-prohibit areas. The CPU 34 stores the layout areas of the user-specified output-prohibit areas in the memory 17. Moreover, the user can specify which of the remaining layout areas are to be shifted in which directions for overwriting the output-prohibit areas. The operation display unit 20 notifies the CPU 34 about the same. The CPU 34 stores the user-specified layout areas and the directions in which the user-specified layout areas are to be shifted in a corresponding manner in the memory 17.

Figure 21:
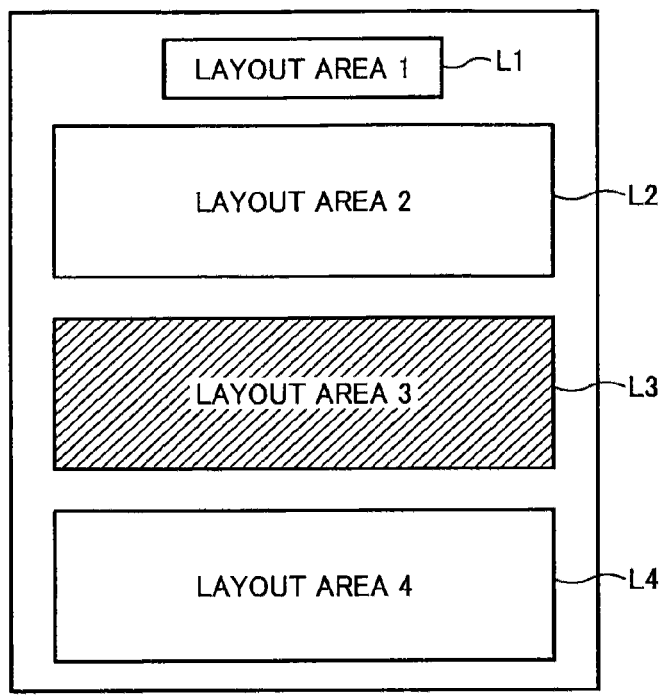
FIG. 21 is a schematic diagram of an exemplary layout area configuration of RGB image data including a user-specified output-prohibit area.
Figure 22:
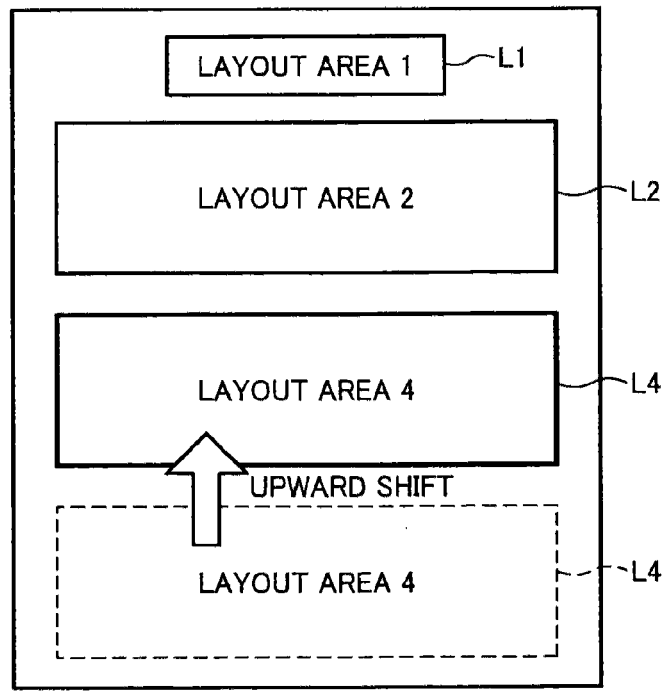
FIGS. 22 and 23 are schematic diagrams for explaining exemplary methods of overwriting masked output-prohibit area.

For example, consider a case shown in FIG. 21 in which the user specifies a layout area L3 as the output-prohibit area from among four layout areas L1 to L4. Subsequently, if the user specifies that only the layout area L4 is to be shifted upward without shifting the layout areas L1 and L2, then the CPU 34 shifts the layout area L4 and performs overwriting of the layout area L3 as shown in FIG. 22. Alternatively, if the user specifies that the layout area L2 is to be shifted downward and the layout area L4 is to be shifted upward without shifting the layout area L1, then the CPU 34 shifts the layout areas L2 and L4 and performs overwriting of the layout area L3 as shown in FIG. 23.

The CPU 34 can be configured to display the rearranged layout areas as the layout-area display image on the operation display unit 20 (or on the display unit of the PC 27) for confirmation. Meanwhile, the fifth embodiment is described under the assumption that the set original is an A4-size portrait-orientated original with horizontal writing. Instead, in response to the possibility that the user sets an A4-size portrait-oriented original or an A4-size landscape-oriented original, the MFP 500 can be configured in such a way that, when the specifies only the orientation of the set original, a suitable direction for rearranging layout areas is automatically determined from among predetermined directions according to the user-specified layout orientation.

When the user presses a button to indicate that the output-prohibit areas and the layout areas to be shifted have been specified, the operation display unit 20 notifies the CPU 34 of the same. Subsequently, the CPU 34 generates a security code that represents the layout areas of the user-specified output-prohibit areas stored in the memory 17, the layout areas of the user-specified layout areas to be shifted, and the direction in which the user-specified layout areas are to be shifted.

Figure 23:
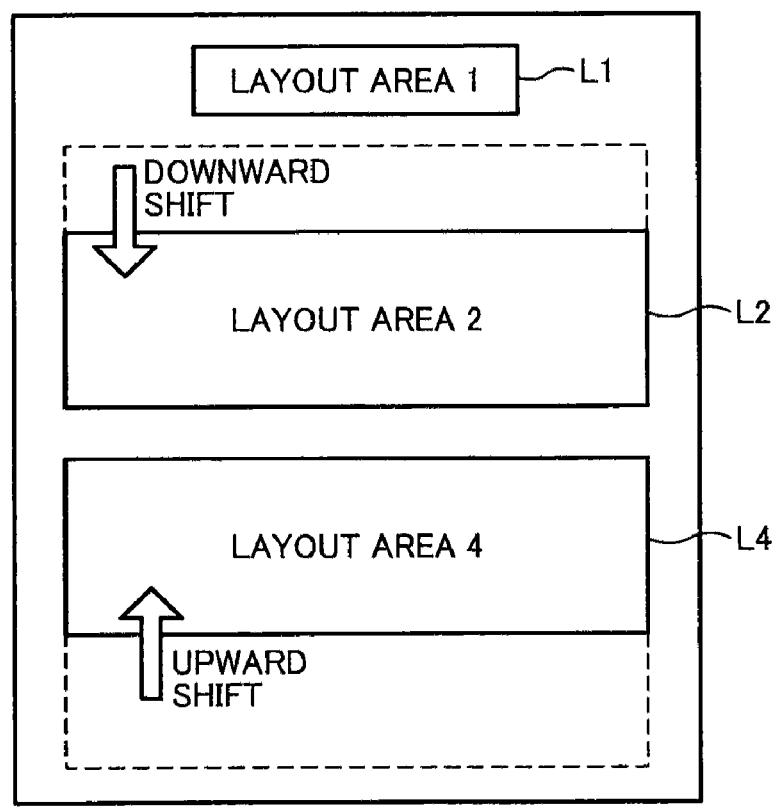
Figure 24A:
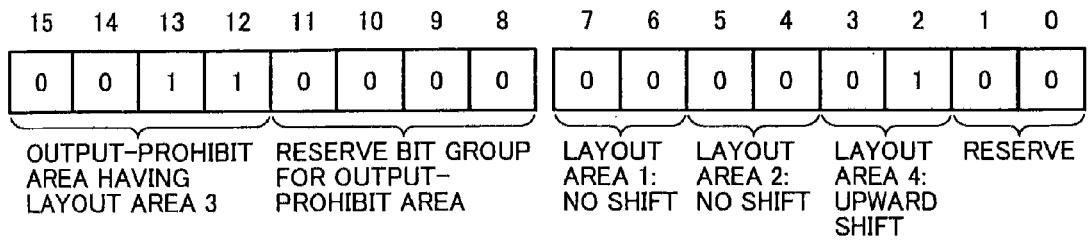
FIG. 24A is a schematic diagram of an exemplary security code generated by a CPU shown in FIG. 20 with respect to rearranged layout areas shown in FIG. 22.
Figure 24B:
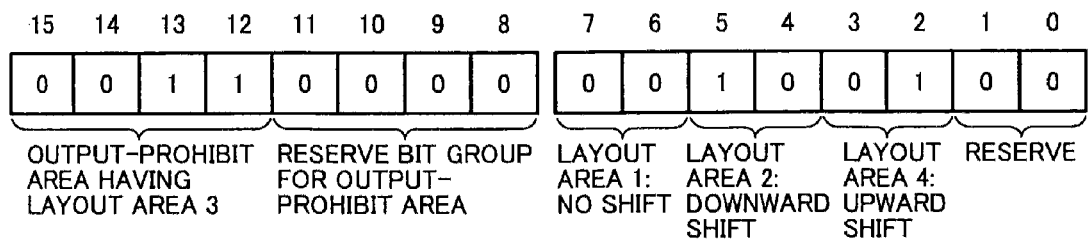
FIG. 24B is a schematic diagram of an exemplary security code generated by the CPU shown in FIG. 20 with respect to rearranged layout areas shown in FIG. 23.

FIG. 24A is a schematic diagram of an exemplary 16-bit security code generated by the CPU 34 with respect to the rearranged layout areas shown in FIG. 22, while FIG. 24B is a schematic diagram of an exemplary 16-bit security code generated by the CPU 34 with respect to the rearranged layout areas shown in FIG. 23. However, the bit configuration of a security code is not limited to the 16-bit configuration shown in FIGS. 24A and 24B.

In the security codes shown in FIGS. 24A and 24B, the upper eight bits (two bit groups of four bits each, namely, a bit group from bit 15 to bit 12 and a bit group from bit 11 to bit 8) are allocated to the layout areas of the user-specified output-prohibit areas. In the example shown in FIG. 21, because only the layout area L3 is specified as the output-prohibit area, the bit group from bit 15 to bit 12 is allocated to the layout area L3 and the bit group from bit 11 to bit 8 is kept as a reserve bit group having value "0000".

In the lower eight bits, four bit groups of two bits each are allocated in descending order to indicate the user-specified rearrangement of the remaining layout areas in ascending order of the layout areas. A layout area not to be shifted is indicated by 0, a layout area to be shifted upward is indicated by 1, and a layout area to be shifted downward is indicated by 2. In the security codes shown in FIGS. 24A and 24B, because there are three layout areas (layout areas L1, L2, and L4) other than the output-prohibit area (layout area L3), the bit group of bit 1 and bit 0 is kept as a reserve bit group having value "00".

The above description is given for the case of allocating a bit group of two bits to indicate shifting of a layout area in vertical direction. However, the number of bits can be increased to indicate shifting of a layout area in vertical and horizontal directions or in vertical, horizontal, and oblique directions.

Meanwhile, consider a case when the MFP 500 is not configured to read a 16-bit security code as described above or when it is necessary to precisely specify the rearranged position of a layout area. In such a case, similar to the description in the third and fourth embodiments, a security code can be generated corresponding to a layout table stored in the HDD 15. In that layout table, the layout areas of all layout areas and the directions of rearrangement (or the rearranged positions) of the layout areas can be placed in a corresponding manner.

FIG. 25 is an exemplary layout table of the layout areas shown in FIG. 21 and their rearranged positions. In the layout table, the layout area and the rearranged position coordinate (rearranged top left coordinate, rearranged bottom right coordinate) of each layout area are placed in a corresponding manner. The hyphen characters (-) written in the rearranged position coordinate of the layout area L3 indicate that the layout area L3 is the user-specified output-prohibit area.

Moreover, identical to the description in the third and fourth embodiments, 'table registration 1' mentioned on the top of the layout table is the unique identification information of the layout table. The 'table registration 1' is used to link the layout table to the security code. To define the relation between the security code and the layout table, it is desirable that the CPU 34 generates the security code having bit configuration as shown in FIG. 26.

FIG. 26 is a schematic diagram of an exemplary 8-bit security code generated corresponding to the layout table shown in FIG. 25. In the security code, the first two bits (bit 7 and bit 6) are allocated to the table registration of the layout table, while the subsequent bit groups of three bits each (a bit group from bit 5 to bit 3 and a bit group from bit 2 to bit 0) are allocated to the layout areas corresponding to user-specified output-prohibit areas. The value "01" in the first two bits indicates that the layout table has the 'table registration 1' as its unique identification information. Similarly, the value "011" in the bit group from bit 5 to bit 3 indicates that the user has specified the layout area L3 as the output-prohibit area. Because only the layout area L3 is specified as the output-prohibit area, the bit group from bit 5 to bit 3 is allocated to the layout area L3 and the bit group from bit 2 to bit 0 is kept as a reserve bit group having value "000".

Reverting to the process of producing an original containing output-prohibit area information, the CPU 34 sends the RGB image data from the memory 17 to the second image-data processing unit 14 via the bus control unit 13. The second image-data processing unit 14 converts the RGB image data into CMYK image data in an identical manner as described in the first embodiment.

The bus control unit 13 receives the CMYK image data from the second image-data processing unit 14 and stores the CMYK image data in the memory 17 via the CPU 34. The CPU 34 converts each bit of the security code, which is generated as shown in FIG. 24A or FIG. 24B, into a dot pattern and appends the dot patterns as pattern data to a predetermined area in the CMYK image data.

The CPU 34 then sends the CMYK image data with appended pattern data to the plotter unit 19 via the plotter I/F unit 18. The plotter unit 19 prints the CMYK image data with appended pattern data on a recording medium to produce an original containing output-prohibit area information. When the original containing output-prohibit area information is produced, the CPU 34 deletes the related instructions/notifications from the memory 17.

The original containing output-prohibit area information contains the security code (output-prohibit area information) shown in FIG. 24A or FIG. 24B. Given below is the description of producing a copy of the original containing output-prohibit area information.

First, the user sets the original containing output-prohibit area information in the reading unit 11 and operates the operation display unit 20 to input a desired copying mode and an instruction to start the copying process. The operation display unit 20 converts the user-specified information into control command data and sends the control command data to the CPU 34. Based on the control command data about starting the copying process, the CPU 34 executes the copying program and performs necessary settings for copying.

The output-prohibit area detecting unit 25 detects dot patterns from the original containing output-prohibit area information and converts the dot patterns into a multi-bit security code. Then, the output-prohibit area detecting unit 25 stores the security code in the register and outputs a detection signal to the first image-data processing unit 12. The detection signal indicates that output-prohibit area information has been detected. Upon receiving the detection signal, the first image-data processing unit 12 requests an interrupt to the CPU 34. The interrupt triggers the CPU 34 to refer to the register of the output-prohibit area detecting unit 25 and obtain the security code.

Subsequently, identical to the description in the third embodiment, the CPU 34 calculates all layout areas in the RGB image data that is obtained by scanning the original containing output-prohibit area information and is stored in the memory 17.

Then, the CPU 34 performs masking of the user-specified output-prohibit area (layout area L3) mentioned in the security code and overwrites the blank space created in the output-prohibit area due to masking by rearranging the remaining layout areas according to the user-specified information regarding the layout areas to be shifted and the directions in which those layout areas are to be shifted.

For example, if the security code shown in FIG. 24A is used for masking and rearranging in the RGB image data shown in FIG. 21, then the CPU 34 performs masking of the layout area L3 and then shifts the layout area L4 upward to overwrite the blank space created by masking the layout area L3 (see FIG. 22). Alternatively, if the security code shown in FIG. 24B is used for masking and rearranging in the RGB image data shown in FIG. 21, then the CPU 34 performs masking of the layout area L3 and then shifts the layout area L2 downward and the layout area L4 upward to overwrite the blank space created by masking the layout area L3 (see FIG. 23).

Meanwhile, consider a case when the security code shown in FIG. 26 is used for masking and rearranging in the RGB image data shown in FIG. 21. In that case, the CPU 34 reads the layout table having the table registration 1 from the HDD 15 and loads the rearranged position coordinate (rearranged top left coordinate, rearranged bottom right coordinate) of each layout area in a register (not shown) thereof or a register (not shown) of the memory 17. Subsequently, the CPU 34 allocates layout areas to the layout areas by using a layout-area display image obtained after layout analysis, performs masking of the layout area L3, and shifts the remaining layout areas according to the respective rearranged position coordinates.

The CPU 34 then outputs the rearranged RGB image data to the second image-data processing unit 14 via the bus control unit 13. The second image-data processing unit 14 converts the RGB image data into CMYK image data and outputs the CMYK image data to the plotter unit 19. The plotter unit 19 prints the CMYK image data on a recording medium such as transfer paper to produce a copy of the original containing output-prohibit area information.

In this way, according to the fifth embodiment, an output-prohibit area in the image data is masked to hide the details mentioned therein. The blank space created in the output-prohibit area due to masking is overwritten by rearranging the remaining layout areas. Overwriting of the output-prohibit area makes it difficult to realize that the image data has been masked. That facilitates in hiding the details mentioned in the output-prohibit area and preventing the hidden details from being inferred by analogy.

Moreover, because the user is allowed to specify the directions in which one or more layout areas other than the output-prohibit areas are to be rearranged, it is possible to output the image data in the format that meets the user requirement. That enhances the user-friendliness of the MFP 500.

Given below is the description of a digital color MFP 600 according to a sixth embodiment of the present invention. Unlike in the description according to the first five embodiments in which the original is assumed to be a one-page original, the MFP 600 allows the user to specify output-prohibit areas from a multipage original and accordingly produces a multipage original containing output-prohibit area information. The details of the configuration/operations of the MFP 600 that are identical to the details according to the abovementioned embodiments are not repeated for clarity.

Figure 27:
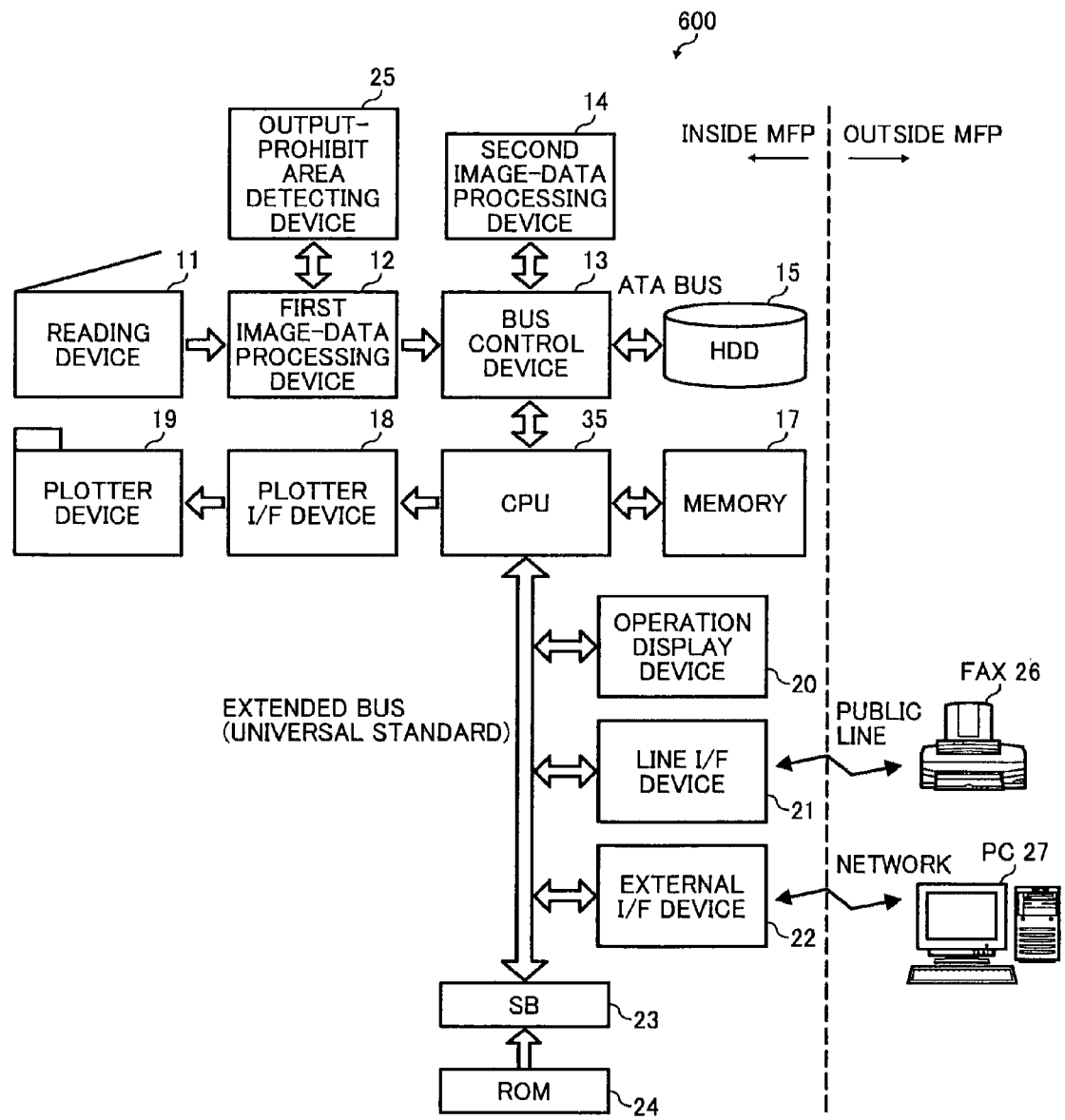
FIG. 27 is a block diagram for explaining an exemplary configuration of a digital color MFP according to a sixth embodiment of the present invention.

FIG. 27 is a block diagram for explaining an exemplary configuration of the MFP 600. The MFP 600 includes the reading unit 11, the first image-data processing unit 12, the bus control unit 13, the second image-data processing unit 14, the HDD 15, a CPU 35, the memory 17, the plotter I/F unit 18, the plotter unit 19, the operation display unit 20, the line I/F unit 21, the external I/F unit 22, the SB 23, the ROM 24, and the output-prohibit area detecting unit 25.

The CPU 35 is a microprocessor that controls operations of the entire MFP 600. The CPU 35 executes computer programs stored in the HDD 15 and/or the ROM 24 to perform the functions described below in addition to the functions described in the abovementioned embodiments.

Assume that the user specifies one or more output-prohibit areas from among calculated layout areas in RGB image data that is obtained by scanning a multipage original. In that case, the CPU 35 generates a security code with respect to each page of RGB image data. When the second image-data processing unit 14 converts each page of RGB image data into a corresponding page of CMYK image data, the CPU 35 appends the security codes to the corresponding pages of CMYK image data. The plotter unit 19 prints each page of CMYK image data with appended security code on a recording medium to obtain a multipage original containing output-prohibit area information.

If the user operates the operation display unit 20 to instruct, e.g., copying of the multipage original containing output-prohibit area information, the CPU 35 performs masking of the user-specified output-prohibit areas in each page according to the corresponding security code and overwrites the user-specified output-prohibit areas by rearranging the remaining layout areas.

Given below is the sequence of operations peculiar to the CPU 35 in producing an original containing output-prohibit area information and producing a copy of the original containing output-prohibit area information.

First, the user operates the operation display unit 20 and instructs the MFP 600 to produce an original containing output-prohibit area information. The operation display unit 20 converts the user-specified information into control command data and sends the control command data to the CPU 35. Subsequently, based on the control command data about producing an original containing output-prohibit area information, the CPU 35 executes a corresponding computer program and performs necessary settings.

Then, the user sets a multipage original in the reading unit 11 and operates the operation display unit 20 for inputting an instruction to start scanning of the multipage original. The operation display unit 20 converts the user-specified information into control command data and sends the control command data to the CPU 35. That triggers the reading unit 11 to start scanning of the multipage original. When the reading unit 11 finishes scanning of the last page of the multipage original, the user sends a notification that all pages of the multipage original have been scanned by, e.g., pressing a '#' key on the operation display unit 20. The operation display unit 20 notifies the CPU 35 of the same. If the reading unit 11 is equipped with an auto document feeder (ADF) that can automatically feed a plurality of pages to the reading unit 11 for scanning, then the ADF can be used to notify the CPU 35 that all pages of the multipage original have been scanned.

Figure 28:
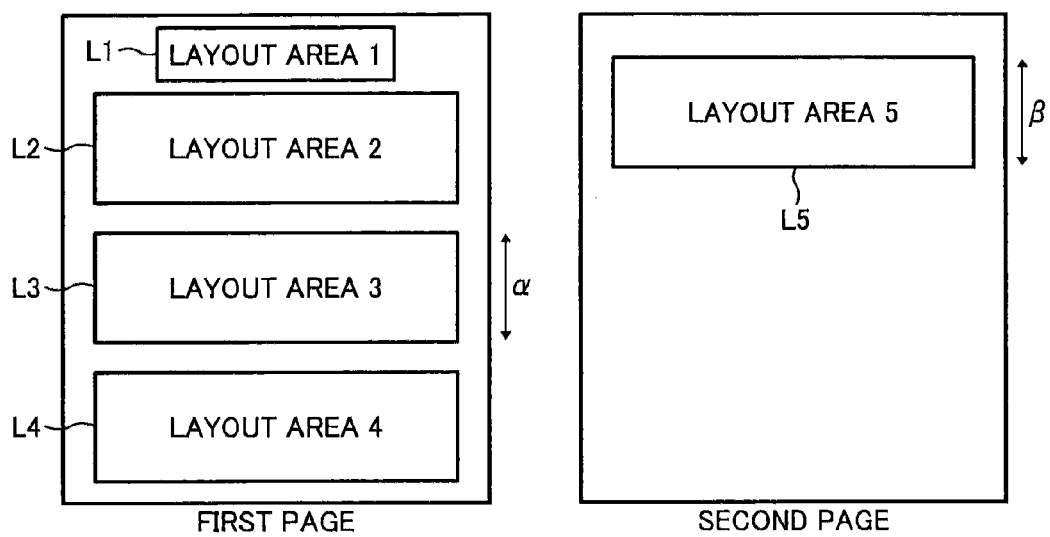
FIG. 28 is a schematic diagram of an exemplary layout area configuration of two-page RGB image data.

For example, consider a case when the reading unit 11 scans a two-page original to obtain RGB image data as shown in FIG. 28. In that case, when the reading unit 11 finishes scanning of the first page and starts scanning of the second page, the CPU 35 calculates all layout areas that make up the first page of RGB image data and stores a layout-area display image of that RGB image data in the memory 17. Meanwhile, because the reading unit 11 does not contend with the second image-data processing unit 14 for hardware resources while scanning an original, the second image-data processing unit 14 can also be used to perform layout analysis of RGB image data.

When the reading unit 11 finishes scanning of the second page, the CPU 35 calculates all layout areas that make up the second page of RGB image data and stores a layout-area display image of that RGB image data in the memory 17. Subsequently, in a similar manner as described in the second embodiment, the CPU 35 displays the layout-area display image of each page of RGB image data on the operation display unit 20 (or on the display unit of the PC 27 via the external I/F unit 22).

The user can specify one or more layout areas from among the layout areas displayed in the two display images as output-prohibit areas. For example, assume that the user specifies a layout area L3 in the first page as the output-prohibit area from among all layout areas L1 to L5 (see FIG. 28). The operation display unit 20 notifies the CPU 35 of the user-specified output-prohibit area. Subsequently, the CPU 35 generates an 8-bit security code shown in FIG. 29A corresponding to the first page of RGB image data and an 8-bit security code shown in FIG. 29B corresponding to the second page of RGB image data.

Figure 29A:
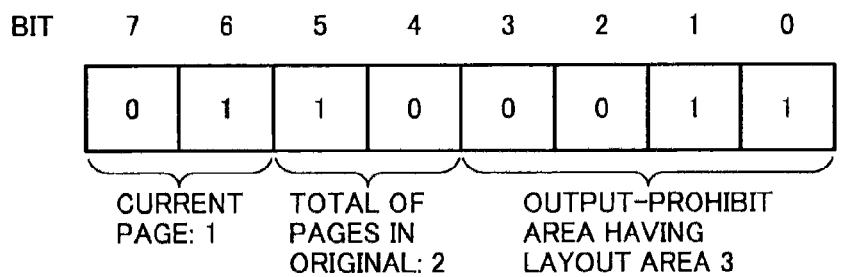
FIG. 29A is a schematic diagram of an exemplary security code generated by a CPU shown in FIG. 27 with respect to the first page of RGB image data shown in FIG. 28.
Figure 29B:
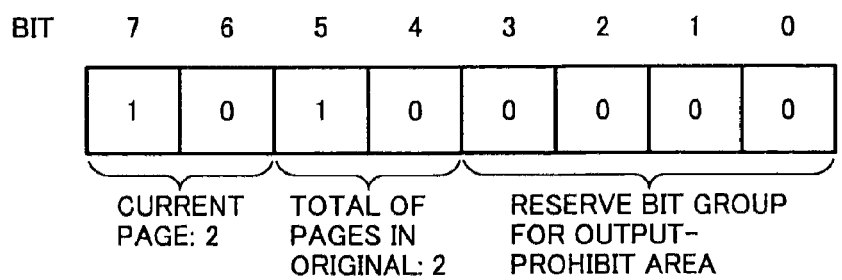
FIG. 29B is a schematic diagram of an exemplary security code generated by the CPU shown in FIG. 27 with respect to the second page of RGB image data shown in FIG. 28.

In the security codes shown in FIGS. 29A and 29B, the first two bits (bit 7 and bit 6) represent a 2-bit binary number that indicates the page of the corresponding page, the subsequent two bits (bit 5 and bit 4) represent a 2-bit binary number that indicates the total number of pages in the multipage original, and the last four bits (bit 3 to bit 0) represent a 4-bit binary number that indicates a unique layout area of the user-specified output-prohibit area. As shown in FIG. 29A, the first four bits (bit 7 to bit 4) have the value "0110" indicating that the corresponding page is the first page of the two-page original, while the last four bits (bit 3 to bit 0) have the value "0011" indicating that the layout area L3 is the user-specified output-prohibit area. Similarly, in the security code shown in FIG. 29B, the first four bits (bit 7 to bit 4) have the value "1010" indicating that the corresponding page is the second page of the two-page original, while the last four bits (bit 3 to bit 0) have the value "0000" indicating that the bits are kept as reserve bits because no layout area in the second page is specified as an output-prohibit area.

Upon generating the security codes, the CPU 35 sends both pages of RGB image data from the memory 17 to the second image-data processing unit 14 via the bus control unit 13. The second image-data processing unit 14 converts each page of RGB image data into a corresponding page of CMYK image data.

The bus control unit 13 receives each page of CMYK image data from the second image-data processing unit 14 and stores it in the memory 17 via the CPU 35. The CPU 35 converts each bit of the security code shown in FIG. 29A into dot patterns and appends those dot patterns as pattern data to the first page of CMYK image data. Similarly, the CPU 35 converts each bit of the security code shown in FIG. 29B into dot patterns and appends those dot patterns as pattern data to the second page of CMYK image data.

Subsequently, the CPU 35 sends the first page of CMYK image data with appended pattern data and the second page of CMYK image data with appended pattern data to the plotter unit 19 via the plotter I/F unit 18. The plotter unit 19 prints the two pages of CMYK image data with corresponding appended pattern data on a recording medium to produce a two-page original containing output-prohibit area information.

The two-page original containing output-prohibit area information contains the security codes shown in FIGS. 29A and 29B. Given below is the description of producing a copy of the two-page original containing output-prohibit area information.

First, the user sets the two-page original containing output-prohibit area information in the reading unit 11 and operates the operation display unit 20 to input a desired copying mode and an instruction to start the copying process. The operation display unit 20 converts the user-specified information into control command data and sends the control command data to the CPU 35. Based on the control command data about starting the copying process, the CPU 35 executes the copying program and performs necessary settings for copying.

The output-prohibit area detecting unit 25 detects dot patterns from the first page of the two-page original containing output-prohibit area information and converts the dot patterns into a multi-bit security code. Then, the output-prohibit area detecting unit 25 stores the security code of the first page in the register and outputs a detection signal to the first image-data processing unit 12. The detection signal indicates that output-prohibit area information has been detected. Upon receiving the detection signal, the first image-data processing unit 12 requests an interrupt to the CPU 35. The interrupt triggers the CPU 35 to refer to the register of the output-prohibit area detecting unit 25 and obtain the security code of the first page.

Subsequently, in an identical manner to the description in the third embodiment, the CPU 35 calculates all layout areas that make up the first page of RGB image data obtained by the reading unit 11 and stored in the memory 17. In the meantime, the reading unit 11 finishes scanning of the second page and the first image-data processing unit 12 stores the second page of RGB image data in the memory 17. The output-prohibit area detecting unit 25 detects the security code (dot patterns) from the second page and stores the security code of the second page in the register.

The CPU 35 finishes masking of the output-prohibit area mentioned in the security code of the first page and, because the first four bits (having value "0110") in the security code of the first page (see FIG. 29A) indicate that the original is a two-page original, performs layout analysis and masking of the second page of RGB image data with the use of the corresponding security code.

Subsequently, the CPU 35 rearranges the layout areas other than the user-specified output-prohibit area (layout area L3) depending on the dimension in a sub-scanning direction of the layout area L3 and the dimension in the sub-scanning direction of the remaining layout areas.

Given below is the process of rearranging the remaining layout areas shown in FIG. 28 when the layout area L3 is specified as the output-prohibit area.

Figure 30:
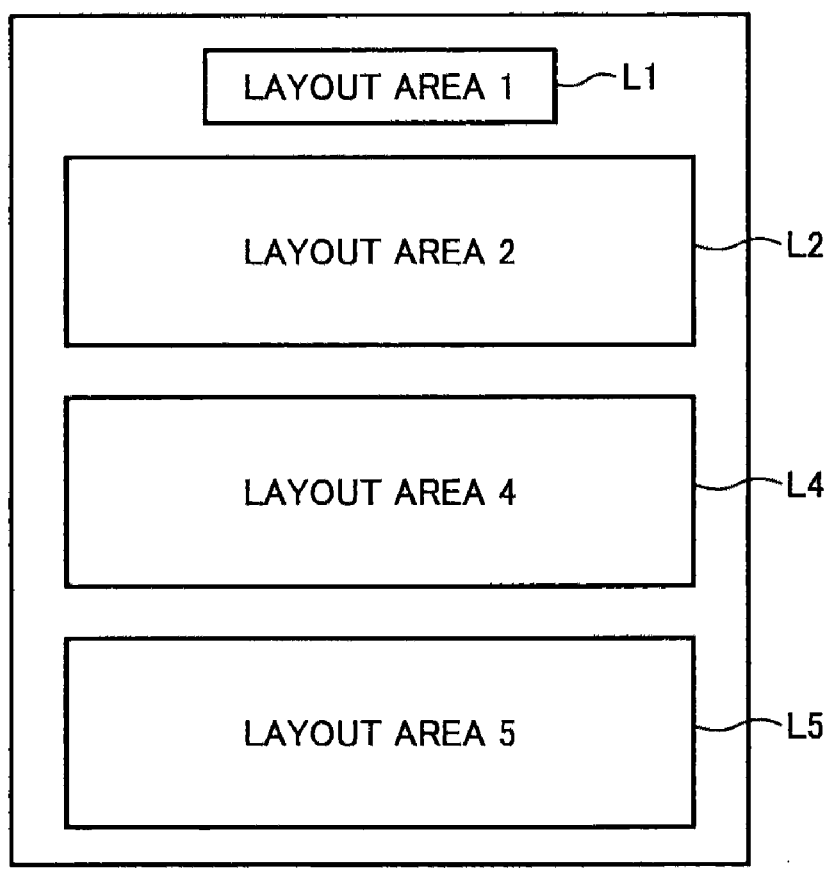
FIG. 30 is a schematic diagram for explaining a result of an exemplary rearrangement of the RGB image data shown in FIG. 28.

First, the CPU 35 compares a dimension $\alpha$ in the sub-scanning direction (vertical direction in FIG. 28) of the layout area L3 in the first page and a dimension $\beta$ in the sub-scanning direction of the layout area L5 in the second page. If the dimension $\alpha$ is equal to or larger than the dimension $\beta$ ($\alpha \geq \beta$), the CPU 35 shifts the layout area L4 in the first page over the masked layout area L3 and inserts the layout area L5 in the blank space created by shifting the layout area L4. Such rearranging of layout areas results in RGB image data as shown in FIG. 30.

In this case, all the layout areas other than the user-specified output-prohibit area are put together to form a single page of RGB image data. Meanwhile, after inserting the layout area L5 in the first page, if the only remaining layout areas in the second page of RGB image data are page-specific layout areas such as a title area, a header area, and a footer area described later, then it is desirable that the CPU 35 does not output the second page of RGB image data to the second image-data processing unit 14 for further processing.

On the other hand, if the dimension $\alpha$ is smaller than the dimension $\beta$ ($\alpha < \beta$), the CPU 35 determines that the layout area L5 is too large to be inserted in the first page of RGB image data. In that case, the CPU 35 keeps the second page of RGB image data as it is and rearranges only the first page of RGB image data by shifting the layout area L4 over the masked layout area L3. The CPU 35 then sends the rearranged first page of RGB image data and the second page of RGB image data to the second image-data processing unit 14 via the bus control unit 13.

The second image-data processing unit 14 converts the two pages of RGB image data into corresponding pages of CMYK image data. The plotter unit 19 prints the two pages of CMYK image data on a recording medium such as transfer paper to produce a copy of the two-page original containing output-prohibit area information.

In this way, according to the sixth embodiment, an output-prohibit area in the image data is masked to hide the details mentioned therein. The blank space created in the output-prohibit area due to masking is overwritten by rearranging the remaining layout areas. Overwriting of the output-prohibit area makes it difficult to realize that the image data has been masked. That facilitates in hiding the details mentioned in the output-prohibit area and preventing the hidden details from being inferred by analogy.

Moreover, in the case of multipage image data, rearrangement of layout areas other than the user-specified output-prohibit areas is performed across the pages of the image data. That makes it difficult to realize that the image data has been masked in one or more pages and facilitates in hiding the details mentioned in the output-prohibit areas. As a result, the hidden details are prevented from being inferred by analogy.

Given below is the description of a digital color MFP 700 according to a seventh embodiment of the present invention. According to the seventh embodiment, the user is allowed to specify an order of priority according to which the MFP 700 rearranges layout areas other than the user-specified output-prohibit areas. The order of priority indicates the order in which the user wants the layout areas rearranged as well as the layout areas that the user does not want to be rearranged. The details of the configuration/operations of the MFP 700 that are identical to the details according to the abovementioned embodiments are not repeated for clarity.

Figure 31:
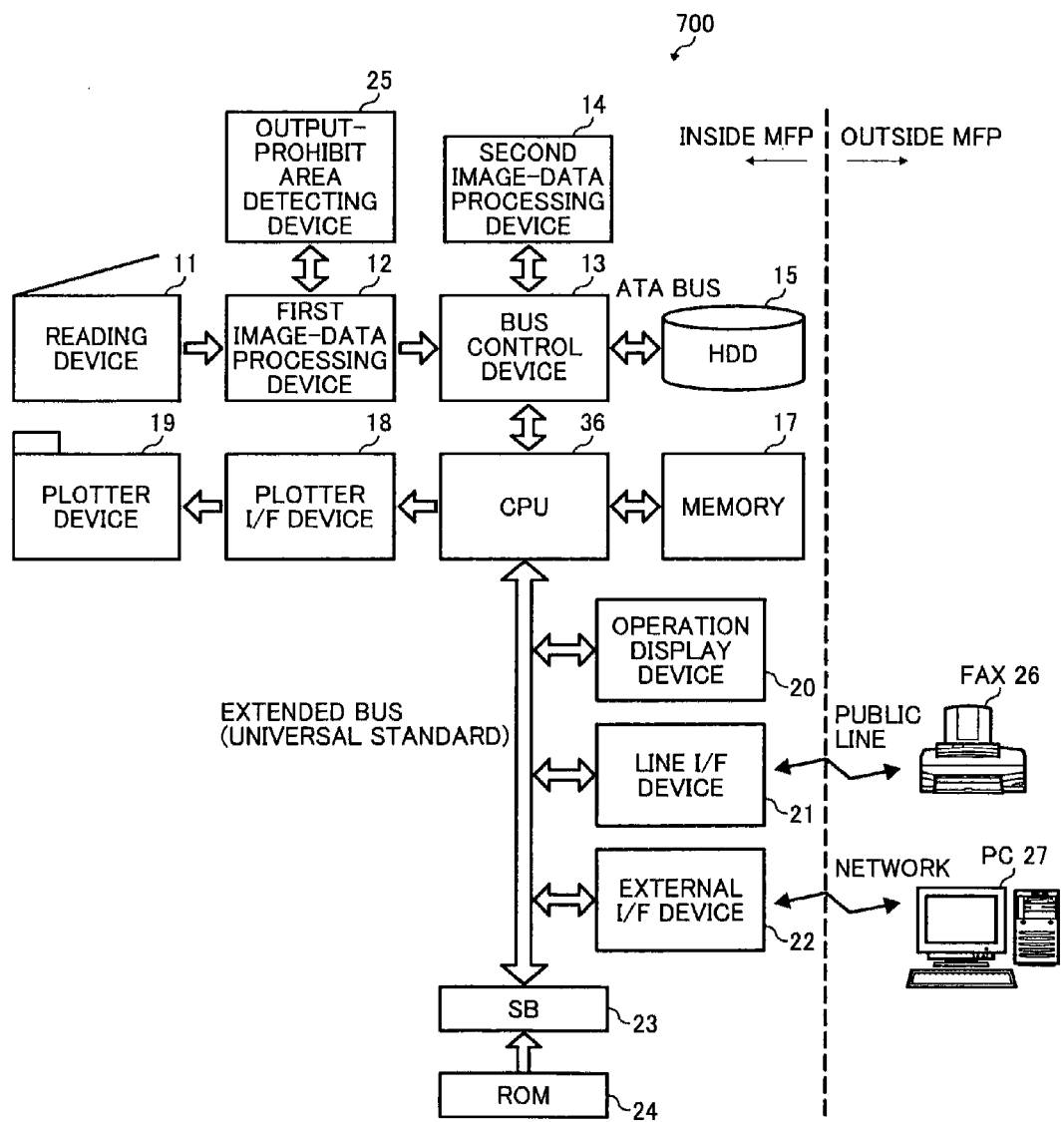
FIG. 31 is a block diagram for explaining an exemplary configuration of a digital color MFP according to a seventh embodiment of the present invention.

FIG. 31 is a block diagram for explaining an exemplary configuration of the MFP 700. The MFP 700 includes the reading unit 11, the first image-data processing unit 12, the bus control unit 13, the second image-data processing unit 14, the HDD 15, a CPU 36, the memory 17, the plotter I/F unit 18, the plotter unit 19, the operation display unit 20, the line I/F unit 21, the external I/F unit 22, the SB 23, the ROM 24, and the output-prohibit area detecting unit 25.

The CPU 36 is a microprocessor that controls operations of the entire MFP 700. The CPU 36 executes computer programs stored in the HDD 15 and/or the ROM 24 to perform the functions described below in addition to the functions described in the abovementioned embodiments.

Assume that the user specifies an output-prohibit area from among calculated layout areas and an order of priority for rearranging the remaining layout areas. In that case, the CPU 36 generates a security code that includes the information regarding the user-specified output-prohibit area and the user-specified order of priority for rearranging the remaining layout areas. The CPU 36 then appends the security code to CMYK image data generated by the second image-data processing unit 14. The plotter unit 19 prints the CMYK image data with appended security code on a recording medium to produce an original containing output-prohibit area information.

If the user operates the operation display unit 20 to instruct, e.g., copying of the original containing output-prohibit area information, the CPU 36 uses the corresponding security code for masking of the output-prohibit area and rearranging of the remaining layout areas according to the user-specified order of priority.

Given below is the sequence of operations peculiar to the CPU 36 in producing an original containing output-prohibit area information and producing a copy of the original containing output-prohibit area information.

First, the user operates the operation display unit 20 and instructs the MFP 700 to produce an original containing output-prohibit area information. The operation display unit 20 converts the user-specified information into control command data and sends the control command data to the CPU 36. Subsequently, based on the control command data about producing an original containing output-prohibit area information, the CPU 36 executes a corresponding computer program and performs necessary settings.

Then, the user sets a multipage original in the reading unit 11 and operates the operation display unit 20 for inputting an instruction to start scanning of the multipage original. The operation display unit 20 converts the user-specified information into control command data and sends the control command data to the CPU 36. That triggers the reading unit 11 to start scanning of the multipage original. When the reading unit 11 finishes scanning of the last page of the multipage original, the user sends a notification that all pages of the multipage original have been scanned by, e.g., pressing a '#' key on the operation display unit 20. The operation display unit 20 notifies the CPU 36 of the same. If the reading unit 11 is equipped with an ADF that can automatically feed a plurality of pages to the reading unit 11 for scanning, then the ADF can be used to notify the CPU 36 that all pages of the multipage original have been scanned.

Figure 32:
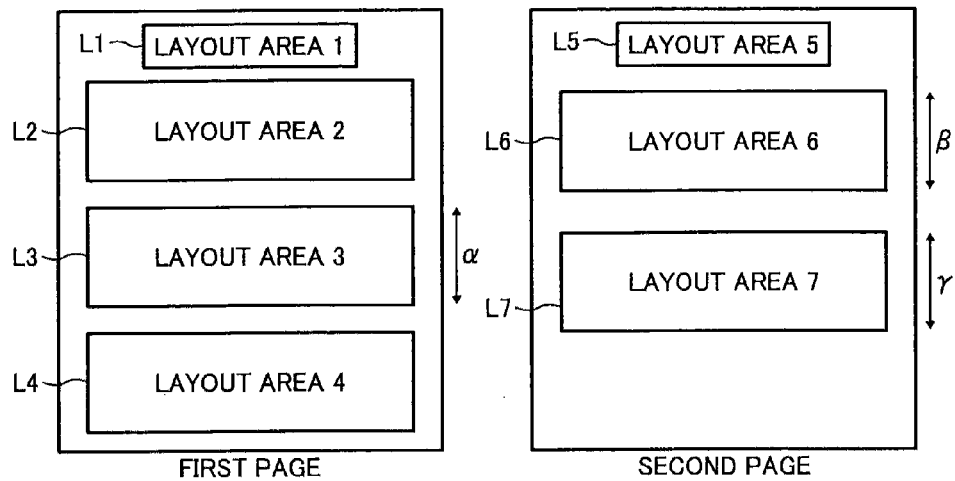
FIG. 32 is a schematic diagram of an exemplary layout area configuration of two-page RGB image data.

For example, consider a case when the reading unit 11 scans a two-page original to obtain RGB image data as shown in FIG. 32. In that case, when the reading unit 11 finishes scanning of the first page and starts scanning of the second page, the CPU 36 calculates all layout areas that make up the first page of RGB image data and stores a layout-area display image of that RGB image data in the memory 17. Meanwhile, because the reading unit 11 does not contend with the second image-data processing unit 14 for hardware resources while scanning an original, the second image-data processing unit 14 can also be used to perform layout analysis of RGB image data.

When the reading unit 11 finishes scanning of the second page, the CPU 36 calculates all layout areas that make up the second page of RGB image data and stores a layout-area display image of that RGB image data in the memory 17. Subsequently, in an identical manner as described in the second embodiment, the CPU 36 displays the layout-area display image of each page of RGB image data on the operation display unit 20 (or on the display unit of the PC 27 via the external I/F unit 22).

The user can specify one or more layout areas from among the layout areas displayed in the two layout-area display images as output-prohibit areas. Moreover, the user can specify an order of priority for rearranging the layout areas not specified as the output-prohibit areas.

For example, assume that the user specifies a layout area L3 in the first page as the output-prohibit area from among all layout areas L1 to L7 (see FIG. 32). Moreover, assume that, with respect to the second page of RGB image data, the user specifies a priority 0 (no priority) for the layout area L5, a priority 1 (highest priority) for the layout area L6, and a priority 2 (second-highest priority) for the layout area L7. The priority 0 specified for a particular layout area indicates that the particular layout area is not to be rearranged (inserted) in another page. For example, the priority 0 can be specified for page-specific layout areas such as a title area, a header area, and a footer area that should not be inserted in another page.

When the user presses a button to indicate that the output-prohibit area and the order of priority for the remaining layout areas has been specified, the operation display unit 20 notifies the CPU 36 of the same. Subsequently, the CPU 36 generates a 16-bit security code shown in FIG. 33A corresponding to the first page of RGB image data and a 16-bit security code shown in FIG. 33B corresponding to the second page of RGB image data.

Figure 33A:
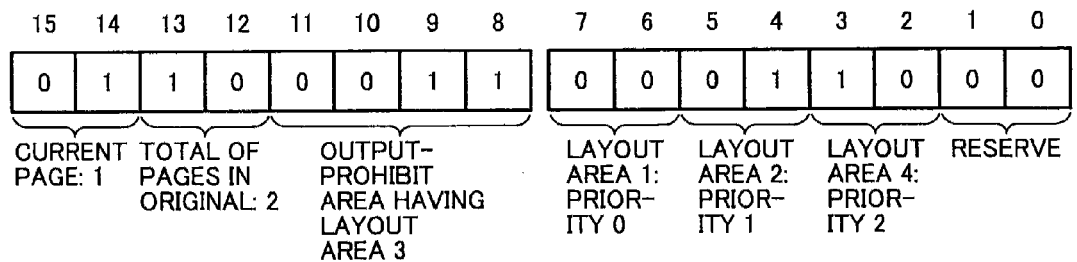
FIG. 33A is a schematic diagram of an exemplary security code generated by a CPU shown in FIG. 31 with respect to the first page of RGB image data shown in FIG. 32.
Figure 33B:
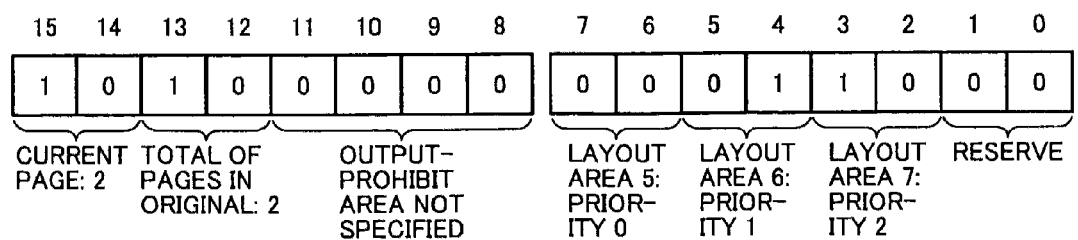
FIG. 33B is a schematic diagram of an exemplary security code generated by the CPU shown in FIG. 31 with respect to the second page of RGB image data shown in FIG. 32.

In the security codes shown in FIGS. 33A and 33B, the upper eight bits (bit 15 to bit 8) indicate information (i.e., page, total number of pages in the multipage original, and unique layout area of the user-specified output-prohibit area) identical to that indicated by the security codes described in the sixth embodiment, while the lower eight bits are used to indicate the user-specified order of priority for rearranging the remaining layout areas. More particularly, in the lower eight bits, four bit groups of two bits each are allocated in descending order to indicate the order of priority for rearranging the remaining layout areas in ascending order of corresponding layout areas. For example, in FIG. 33B, the bit group of bit 7 and bit 6 has the value "00" indicating that the priority for the layout area 5 is set to 0 (no priority). Similarly, the bit group of bit 5 and bit 4 has the value "01" indicating that the priority for the layout area 6 is set to 1 (highest priority). Moreover, the bit group of bit 3 and bit 2 has the value "10" indicating that the priority for the layout area 7 is set to 2 (second-highest priority). The bit group of bit 1 and bit 0 is a kept as a reserve bit having the value "00".

Upon generating the security codes, the CPU 36 sends both pages of RGB image data from the memory 17 to the second image-data processing unit 14 via the bus control unit 13. The second image-data processing unit 14 converts each page of RGB image data into a corresponding page of CMYK image data.

The bus control unit 13 receives each page of CMYK image data from the second image-data processing unit 14 and stores it in the memory 17 via the CPU 36. The CPU 36 converts each bit of the security code shown in FIG. 33A into dot patterns and appends those dot patterns as pattern data to the first page of CMYK image data. Similarly, the CPU 36 converts each bit of the security code shown in FIG. 33B into dot patterns and appends those dot patterns as pattern data to the second page of CMYK image data.

Subsequently, the CPU 36 sends the first page of CMYK image data with appended pattern data and the second page of CMYK image data with appended pattern data to the plotter unit 19 via the plotter I/F unit 18. The plotter unit 19 prints the two pages of CMYK image data with corresponding appended pattern data on a recording medium to produce a two-page original containing output-prohibit area information.

The two-page original containing output-prohibit area information contains the security codes shown in FIGS. 33A and 33B. Given below is the description of producing a copy of the two-page original containing output-prohibit area information.

First, the user sets the two-page original containing output-prohibit area information in the reading unit 11 and operates the operation display unit 20 to input a desired copying mode and an instruction to start the copying process. The operation display unit 20 converts the user-specified information into control command data and sends the control command data to the CPU 36. Based on the control command data about starting the copying process, the CPU 36 executes the copying program and performs necessary settings for copying.

The output-prohibit area detecting unit 25 detects dot patterns from the first page of the two-page original containing output-prohibit area information and converts the dot patterns into a multi-bit security code. Then, the output-prohibit area detecting unit 25 stores the security code of the first page in the register and outputs a detection signal to the first image-data processing unit 12. The detection signal indicates that output-prohibit area information has been detected. Upon receiving the detection signal, the first image-data processing unit 12 requests an interrupt to the CPU 36. The interrupt triggers the CPU 36 to refer to the register of the output-prohibit area detecting unit 25 and obtain the security code of the first page.

Subsequently, in an identical manner to the description in the third embodiment, the CPU 36 calculates all layout areas that make up the first page of RGB image data obtained by the reading unit 11 and stored in the memory 17. In the meantime, the reading unit 11 finishes scanning of the second page and the first image-data processing unit 12 stores the second page of RGB image data in the memory 17. The output-prohibit area detecting unit 25 detects the security code (dot patterns) from the second page and stores the security code of the second page in the register.

The CPU 36 finishes masking of the output-prohibit area mentioned in the security code of the first page and, because the first four bits (having value "0110") in the security code of the first page (see FIG. 33A) indicate that the original is a two-page original, performs layout analysis and masking of the second page of RGB image data with the use of the corresponding security code.

Subsequently, the CPU 36 rearranges the remaining layout areas according to the user-specified order of priority.

Given below is the process of rearranging the layout areas shown in FIG. 32 when the layout area L3 is specified as the output-prohibit area. First, the CPU 36 compares a dimension $\alpha$ in the sub-scanning direction of the layout area L3 in the first page and a dimension $\beta$ in the sub-scanning direction of the layout area L6, which is set to have the highest priority for rearrangement in the second page. If the dimension $\alpha$ is smaller than the dimension $\beta$ ($\alpha<\beta$), the CPU 36 rearranges the first page of RGB image data by shifting only the layout areas L1, L2, and L4, and keeps the second page of RGB image data as it is. On the other hand, if the dimension $\alpha$ is equal to or larger than the dimension $\beta$ ($\alpha\geq\beta$), the CPU 36 first calculates a sum of the dimension $\beta$ and a dimension $\gamma$ in the sub-scanning direction of the layout area L7, which is set to have the second-highest priority for rearrangement in the second page. Then, the CPU 36 compares the sum of the dimensions $\beta$ and $\gamma$ with the dimension $\alpha$. If the dimension $\alpha$ is smaller than the sum of the dimensions $\beta$ and $\gamma$ ($\alpha<\beta+\gamma$), the CPU 36 rearranges the first page of RGB image data by shifting the layout areas L1, L2, and L4, and inserting the layout area L6 in the first page. Moreover, the CPU 36 rearranges the second page of RGB image data by shifting the layout areas L5 and L7.

On the other hand, if the dimension $\alpha$ is equal to or larger than the sum of the dimensions $\beta$ and $\gamma$ ($\alpha\geq\beta+\gamma$), the CPU 36 tries to select another layout area from the second page of RGB image data along with the layout areas L6 and L7. However, apart from the layout areas L6 and L7, the second page of RGB image data includes only the layout area L5, which cannot be inserted in another page because of the priority 0 set to it. Thus, from the second page of RGB image data, the CPU 36 is able to use only the layout areas L6 and L7 for rearrangement. Accordingly, the CPU 36 rearranges the first page of RGB image data by shifting the layout areas L1, L2, and L4, and inserting the layout areas L6 and L7 in the first page. In this case, after finishing the rearrangement, the CPU 36 does not output the second page of RGB image data to the second image-data processing unit 14 for further processing.

Figures 34, 35:
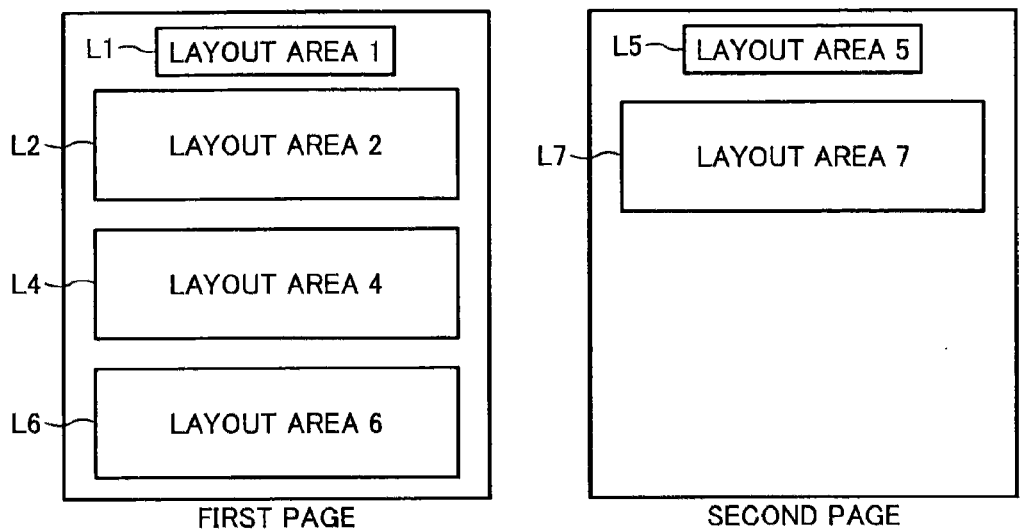
FIG. 34 is a schematic diagram for explaining a result of an exemplary rearrangement of the RGB image data shown in FIG. 32.
FIG. 35 is an exemplary layout table generated by the CPU shown in FIG. 31.

FIG. 34 is a schematic diagram for explaining the rearranged state of the RGB image data shown in FIG. 31 when the dimension $\alpha$ is equal to or larger than the dimension $\beta$ but less than the sum of the dimensions $\beta$ and $\gamma$ ($\alpha\geq\beta$ and $\alpha<\beta+\gamma$). As shown in FIG. 34, the first page of RGB image data includes the layout areas L1, L2, L4, and L6; while the second page of RGB image data includes the layout areas L5 and L7.

Subsequently, the CPU 36 sends the rearranged first page of RGB image data and the rearranged second page of RGB image data to the second image-data processing unit 14 via the bus control unit 13. The second image-data processing unit converts the two rearranged pages of RGB image data into corresponding pages of CMYK image data. The plotter unit 19 prints the two pages of CMYK image data on a recording medium such as transfer paper to produce a copy of the two-page original containing output-prohibit area information.

In this way, according to the seventh embodiment, an output-prohibit area in the image data is masked to hide the details mentioned therein. The blank space created in the output-prohibit area due to masking is overwritten by rearranging the remaining layout areas. Overwriting of the output-prohibit area makes it difficult to realize that the image data has been masked. That facilitates in hiding the details mentioned in the output-prohibit area and preventing the hidden details from being inferred by analogy.

Moreover, because the user is allowed to specify the order of priority for rearranging the layout areas other than the output-prohibit areas, it is possible to output the image data in the format that meets the user requirement. That enhances the user-friendliness of the MFP 700.

Meanwhile, consider a case when the MFP 700 is not configured to read a 16-bit security code as described above. In such a case, similar to the description in the third, fourth, and fifth embodiments, a security code can be generated corresponding to a layout table stored in the HDD 15. In that layout table, the pages in the multipage original, the layout areas of all layout areas, and the order of priority for rearranging the layout areas are placed in a corresponding manner.

FIG. 35 is an exemplary layout table of the layout areas shown in FIG. 32. In the layout table, the pages of the two-page original, the layout areas, and the order of priority for rearranging the layout areas are placed in a corresponding manner. The hyphen character (-) written in the order of priority column indicates that the layout area L3 is the user-specified output-prohibit area.

Moreover, identical to the description in the third, fourth, and fifth embodiments, 'table registration 1' mentioned on the top of the layout table is the unique identification information of the layout table. The 'table registration 1' is used to link the layout table to the security code. In this case, the CPU 36 can generate the security code having a bit configuration identical to the bit configuration described with reference to FIGS. 29A and 29B.

By using the security code, the CPU 36 can refer to the layout table corresponding to the 'table registration 1' and obtain information regarding the user-specified output-prohibit area and the order of priority for rearranging the remaining layout areas. Such a configuration enables the CPU 36 to perform the masking and rearranging operations described in the seventh embodiment even after reducing the bit number of the security code.

Given below is the description of a digital color MFP 800 according to an eighth embodiment of the present invention. According to the eighth embodiment, in addition to specifying an order of priority for rearranging layout areas other than output-prohibit areas, the user can also specify a zoom ratio (zoom-out ratio) by which the layout areas should be zoomed out at the time of rearrangement. The details of the configuration/operations of the MFP 800 that are identical to the details according to the abovementioned embodiments are not repeated for clarity.

Figure 36:
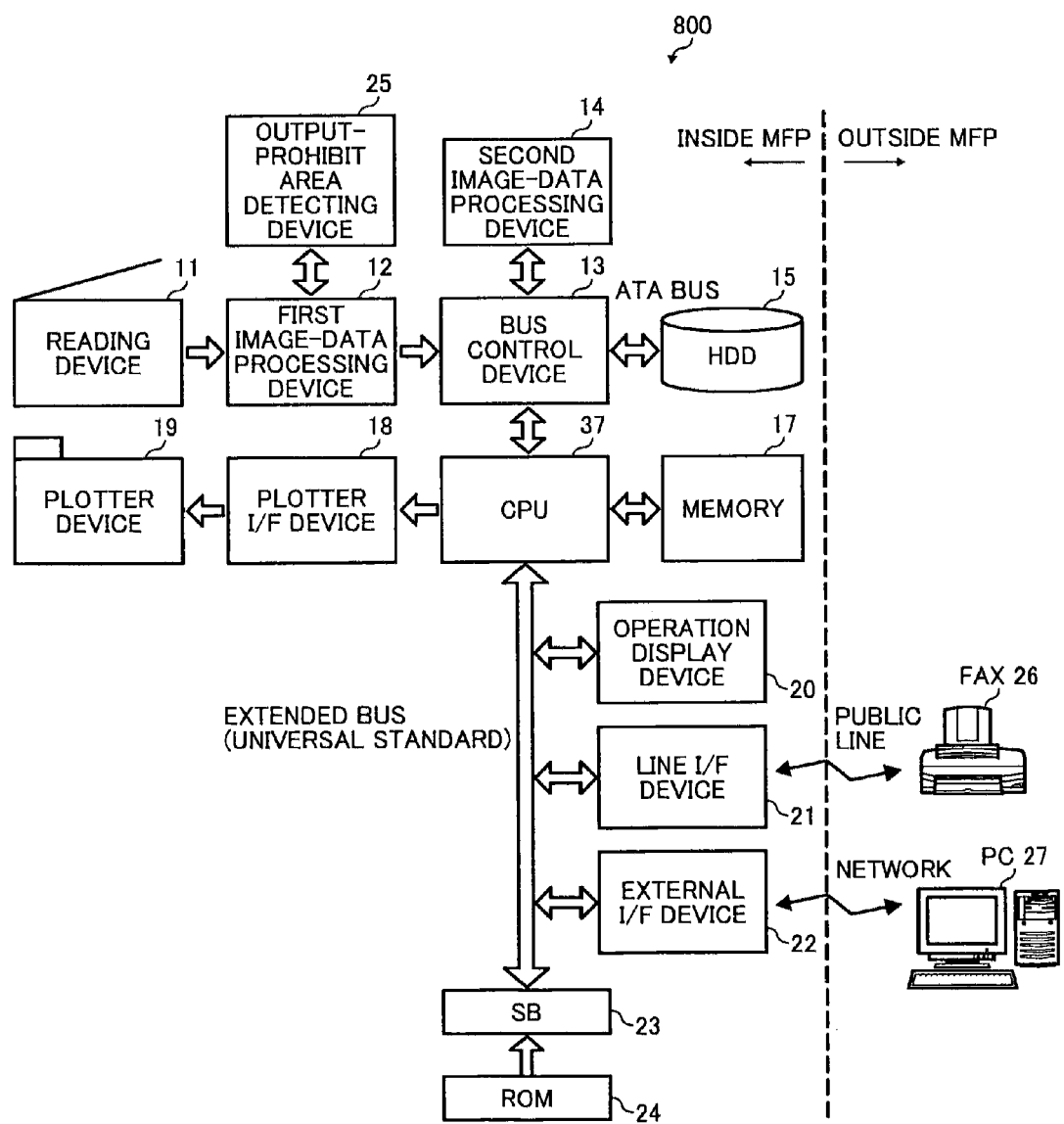
FIG. 36 is a block diagram for explaining an exemplary configuration of a digital color MFP according to an eighth embodiment of the present invention.

FIG. 36 is a block diagram for explaining an exemplary configuration of the MFP 800. The MFP 800 includes the reading unit 11, the first image-data processing unit 12, the bus control unit 13, the second image-data processing unit 14, the HDD 15, a CPU 37, the memory 17, the plotter I/F unit 18, the plotter unit 19, the operation display unit 20, the line I/F unit 21, the external I/F unit 22, the SB 23, the ROM 24, and the output-prohibit area detecting unit 25.

The CPU 37 is a microprocessor that controls operations of the entire MFP 800. The CPU 37 executes computer programs stored in the HDD 15 and/or the ROM 24 to perform the functions described below in addition to the functions described in the abovementioned embodiments.

Assume that the user specifies an output-prohibit area from among calculated layout areas, an order of priority for the remaining layout areas, and a minimum zoom ratio by which the remaining layout areas can be zoomed out at the time of rearrangement. In that case, the CPU 37 generates a security code that includes the information regarding the user-specified output-prohibit area, the user-specified order of priority for rearranging the remaining layout areas, and the user-specified minimum zoom ratio. The CPU 37 then appends the security code to CMYK image data generated by the second image-data processing unit 14. The plotter unit 19 prints the CMYK image data with appended security code on a recording medium to produce an original containing output-prohibit area information.

If the user operates the operation display unit 20 to instruct, e.g., copying of the original containing output-prohibit area information, the CPU 37 uses the corresponding security code for masking of the output-prohibit area and rearranging of the remaining layout areas according to the user-specified order of priority and the user-specified minimum zoom ratio.

Given below is the sequence of operations peculiar to the CPU 37 in producing an original containing output-prohibit area information and producing a copy of the original containing output-prohibit area information.

First, the user operates the operation display unit 20 and instructs the MFP 800 to produce an original containing output-prohibit area information. The operation display unit 20 converts the user-specified information into control command data and sends the control command data to the CPU 37. Subsequently, based on the control command data about producing an original containing output-prohibit area information, the CPU 37 executes a corresponding computer program and performs necessary settings.

Then, the user sets, e.g., a multipage original in the reading unit 11 and operates the operation display unit 20 for inputting an instruction to start scanning of the multipage original. The operation display unit 20 converts the user-specified information into control command data and sends the control command data to the CPU 37. That triggers the reading unit 11 to start scanning of the multipage original. When the reading unit 11 finishes scanning of the last page of the multipage original, the user sends a notification that all pages of the multipage original have been scanned by, e.g., pressing a '#' key on the operation display unit 20. The operation display unit 20 notifies the CPU 37 of the same. If the reading unit 11 is equipped with an ADF that can automatically feed a plurality of pages to the reading unit 11 for scanning, then the ADF can be used to notify the CPU 37 that all pages of the multipage original have been scanned.

For example, consider a case when the reading unit 11 scans a two-page original to obtain RGB image data as shown in FIG. 32. In that case, when the reading unit 11 finishes scanning of the first page and starts scanning of the second page, the CPU 37 calculates all layout areas that make up the first page of RGB image data and stores a layout-area display image of that RGB image data in the memory 17. Meanwhile, because the reading unit 11 does not contend with the second image-data processing unit 14 for hardware resources while scanning an original, the second image-data processing unit 14 can also be used to perform layout analysis of RGB image data.

When the reading unit 11 finishes scanning of the second page, the CPU 37 calculates all layout areas that make up the second page of RGB image data and stores a layout-area display image of that RGB image data in the memory 17. Subsequently, in an identical manner as described in the second embodiment, the CPU 37 displays the layout-area display image of each page of RGB image data on the operation display unit 20 (or on the display unit of the PC 27 via the external I/F unit 22).

The user can specify one or more layout areas from among the layout areas displayed in the two layout-area display images as output-prohibit areas. Moreover, the user can specify an order of priority for rearranging the remaining layout areas not specified as the output-prohibit areas and a minimum zoom ratio by which the remaining layout areas can be zoomed out at the time of rearrangement.

For example, assume that the user specifies a layout area L3 in the first page as the output-prohibit area from among all layout areas L1 to L7 (see FIG. 32). Moreover, assume that, with respect to the second page of RGB image data, the user specifies a priority 0 (no priority) for the layout area L5, a priority 1 (highest priority) for the layout area L6, and a priority 2 (second-highest priority) for the layout area L7. Furthermore, the user specifies a minimum zoom ratio of 80% for zooming out the remaining layout areas at the time of rearrangement.

When the user presses a button to indicate that the output-prohibit area, the order of priority for the remaining layout areas, and the minimum zoom ratio for the remaining layout areas has been specified, the operation display unit 20 notifies the CPU 37 of the same. Subsequently, the CPU 37 generates a 16-bit security code shown in FIG. 37A corresponding to the first page of RGB image data and a 16-bit security code shown in FIG. 37B corresponding to the second page of RGB image data.

In the security codes shown in FIGS. 37A and 37B, the upper 14 bits (bit 15 to bit 2) indicate information (i.e., page, total number of pages in the multipage original, unique layout area of the user-specified output-prohibit area, and order of priority for the remaining layout areas) identical to that indicated by the security codes described in the seventh embodiment (see FIGS. 33A and 33B), while the bit group of bit 1 and bit 0 is used to indicate the user-specified minimum zoom ratio for zooming out the remaining layout areas. Herein, to reduce the bit number of the security code, the value 0 is assigned to a minimum zoom ratio of 100%, the value 1 is assigned to a minimum zoom ratio of 90%, the value 2 is assigned to a minimum zoom ratio of 80%, the value 3 is assigned to a minimum zoom ratio of 70%, and so on. Thus, the user-specified minimum zoom ratio of 80% is represented as a binary number "10" in the bit group of bit 1 and bit 0. If the user specifies the minimum zoom ratio of 100%, then the bit group of bit 1 and bit 0 represent a binary number "00". Meanwhile, the minimum zoom ratio of 100% means that it is not possible to zoom out the remaining layout areas at the time of rearrangement. In other words, the remaining layout areas are to be rearranged in their original size.

Meanwhile, instead of generating the 16-bit security code, the CPU 37 can also generate a security code corresponding to a layout table stored in the HDD 15. In that layout table, the pages in the multipage original, the layout areas of all layout areas, the order of priority for rearranging the layout areas, and the minimum zoom out ratio for zooming out the layout areas are placed in a corresponding manner. Such a configuration enables to reduce the bit count of the security code in a similar manner to the description given in the third, fourth, fifth, and seventh embodiments.

Upon generating the security codes shown in FIG. 37A and 37B, the CPU 37 sends both pages of RGB image data from the memory 17 to the second image-data processing unit 14 via the bus control unit 13. The second image-data processing unit 14 converts each page of RGB image data into a corresponding page of CMYK image data.

The bus control unit 13 receives each page of CMYK image data from the second image-data processing unit 14 and stores it in the memory 17 via the CPU 37. The CPU 37 converts each bit of the security code shown in FIG. 37A into dot patterns and appends those dot patterns as pattern data to the first page of CMYK image data. Similarly, the CPU 37 converts each bit of the security code shown in FIG. 37B into dot patterns and appends those dot patterns as pattern data to the second page of CMYK image data.

Subsequently, the CPU 37 sends the first page of CMYK image data with appended pattern data and the second page of CMYK image data with appended pattern data to the plotter unit 19 via the plotter I/F unit 18. The plotter unit 19 prints the two pages of CMYK image data with corresponding appended pattern data on a recording medium to produce a two-page original containing output-prohibit area information.

The two-page original containing output-prohibit area information contains the security codes shown in FIGS. 37A and 37B. Given below is the description of producing a copy of the two-page original containing output-prohibit area information.

First, the user sets the two-page original containing output-prohibit area information in the reading unit 11 and operates the operation display unit 20 to input a desired copying mode and an instruction to start the copying process. The operation display unit 20 converts the user-specified information into control command data and sends the control command data to the CPU 37. Based on the control command data about starting the copying process, the CPU 37 executes the copying program and performs necessary settings for copying.

The output-prohibit area detecting unit 25 detects dot patterns from the first page of the two-page original containing output-prohibit area information and converts the dot patterns into a multi-bit security code. Then, the output-prohibit area detecting unit 25 stores the security code of the first page in the register and outputs a detection signal to the first image-data processing unit 12. The detection signal indicates that output-prohibit area information has been detected. Upon receiving the detection signal, the first image-data processing unit 12 requests an interrupt to the CPU 37. The interrupt triggers the CPU 37 to refer to the register of the output-prohibit area detecting unit 25 and obtain the security code of the first page.

Subsequently, in an identical manner to the description in the third embodiment, the CPU 37 calculates all layout areas that make up the first page of RGB image data obtained by the reading unit 11 and stored in the memory 17. In the meantime, the reading unit 11 finishes scanning of the second page and the first image-data processing unit 12 stores the second page of RGB image data in the memory 17. The output-prohibit area detecting unit 25 detects the security code (dot patterns) from the second page and stores the security code of the second page in the register.

The CPU 37 finishes masking of the output-prohibit area mentioned in the security code of the first page and, because the first four bits (having value "0110") in the security code of the first page (see FIG. 37A) indicate that the original is a two-page original, performs layout analysis and masking of the second page of RGB image data with the use of the corresponding security code.

Subsequently, the CPU 37 refers to the user-specified minimum zoom ratio mentioned in the security codes and, if the user-specified minimum zoom ratio is 100%, rearranges the remaining layout areas in their original size in an identical manner as described in the seventh embodiment.

On the other hand, if the user-specified minimum zoom ratio is less than 100%, the CPU 37 zooms out the remaining layout areas by the user-specified minimum zoom ratio and rearranges the zoomed-out layout areas according to the user-specified order of priority.

FIG. 38 is a flowchart for explaining the sequence of operations when the CPU 37 rearranges the RGB image data shown in FIG. 32 by using the security codes shown in FIGS. 37A and 37B. First, the CPU 37 determines whether a dimension α in the sub-scanning direction of the layout area L3 (user-specified output-prohibit area) in the first page is equal to or larger than a dimension β in the sub-scanning direction of the layout area L6, which is set to have the highest priority for rearrangement in the second page (Step S11). If the dimension α is smaller than the dimension β (α<β) (No at Step S11), the CPU 37 performs masking of the layout area L3, zooms out each of the layout areas L1, L2, and L4 by the user-specified minimum zoom ratio of 80%, and shifts the zoomed-out layout areas L1, L2, and L4 upward. That creates a blank space in the lower portion of the first page. Then, the CPU 37 determines whether a dimension δ in the sub-scanning direction of the blank space is equal to or larger than a zoomed-out version of the dimension β (hereinafter, "zoomed-out dimension β") obtained by zooming out the layout area L6 by the user-specified minimum zoom ratio of 80% (Step S12).

Figure 39:
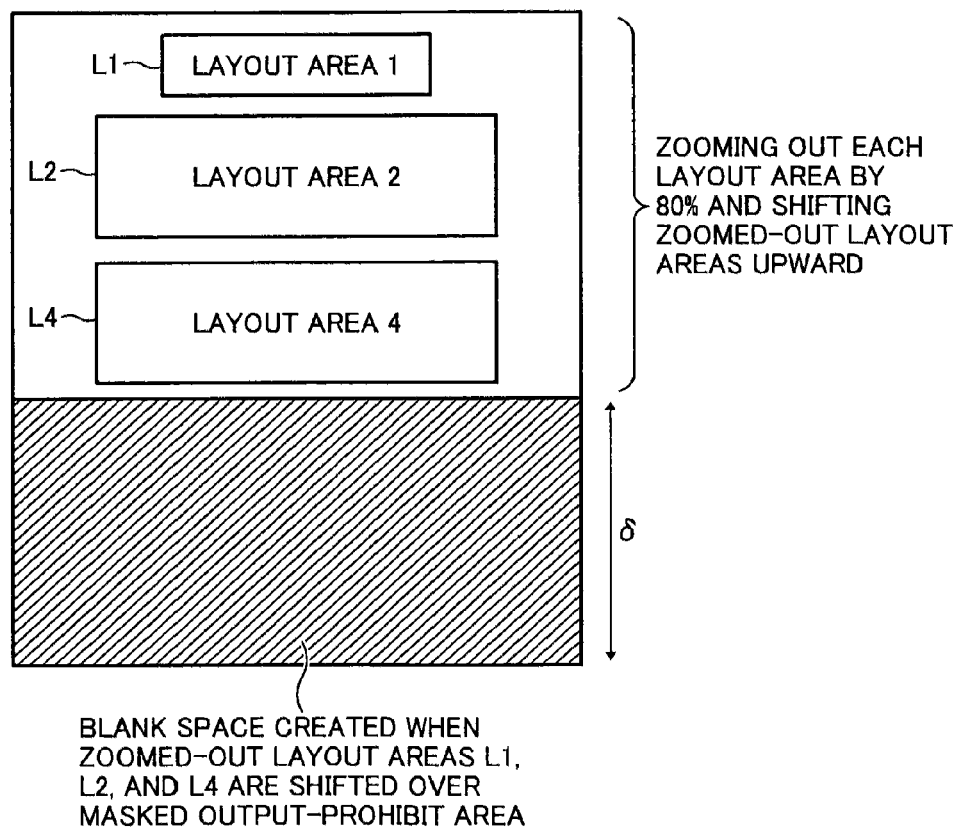
FIG. 39 is a schematic diagram for explaining the dimension of a blank space created in the first page of RGB image data shown in FIG. 32 due to rearrangement of layout areas.

FIG. 39 is a schematic diagram for explaining the dimension δ of the blank space. As shown in FIG. 39, the dimension δ is the dimension in the sub-scanning direction of the blank space that is created when the CPU 37 shifts the zoomed-out layout areas L1, L2, and L4 over the masked layout area L3 in the first page. The dimension δ represents the upper limit of the dimension in the sub-scanning direction of the blank space within which a layout area can be inserted from another page.

If the dimension α is less than the zoomed-out dimension β (α<0.8β) (No at Step S12), the CPU 37 rearranges the layout areas only within the first page of RGB image data and keeps the second page of RGB image data as it is (Step S13).

Figure 40A:
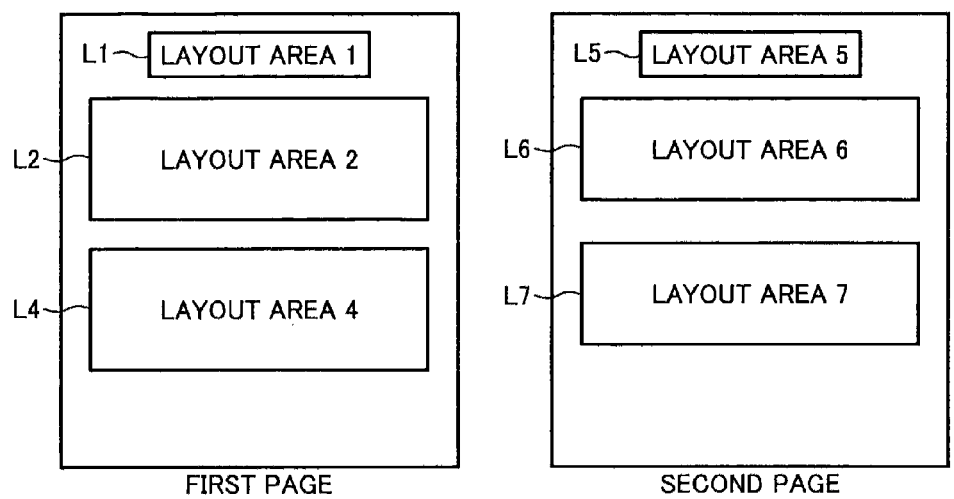
FIG. 40A is a schematic diagram for explaining the result of rearrangement performed at Step S13 of the flowchart shown in FIG. 38.

FIG. 40A is a schematic diagram for explaining the result of rearrangement performed at Step S13. As shown in FIG. 40A, the layout area L4 is shifted over the masked layout area L3 in the first page, while the second page remains unchanged.

On the other hand, if the dimension α is equal to or larger than the zoomed-out dimension β (α≧0.8β) (Yes at Step S12), the CPU 37 calculates a sum of the zoomed-out dimension β and a zoomed-out version of a dimension γ (hereinafter, "zoomed-out dimension γ") in the sub-scanning direction of the layout area L7, which is set to have the second-highest priority for rearrangement in the second page. Then, the CPU 37 determines whether the dimension δ of the blank space is equal to or larger than the sum of the zoomed-out dimension β and the zoomed-out dimension γ (Step S14). If the dimension δ is smaller than the sum of the zoomed-out dimension β and the zoomed-out dimension γ (δ<0.8(β+γ)) (No at Step S14), the CPU 37 zooms out the layout areas L1, L2, L4, L5, L6, and L7 by the user-specified minimum zoom ratio of 80%, rearranges the first page of RGB image data by shifting the zoomed-out layout areas L1, L2, and L4 upward and inserting the zoomed-out layout area L6 beneath the zoomed-out layout area L4, and rearranges the second page of RGB image data by shifting the zoomed-out layout areas L5 and L7 (Step S15).

Figure 40B:
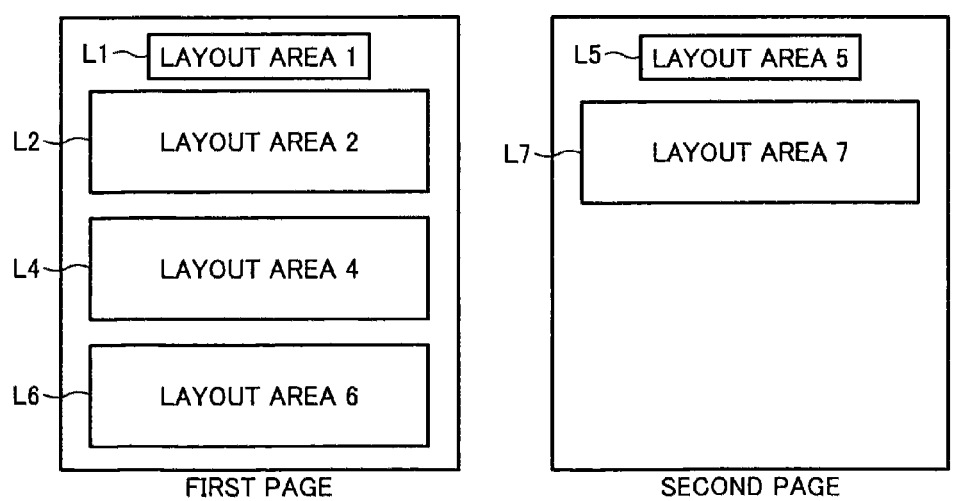
FIG. 40B is a schematic diagram for explaining the result of rearrangement performed at Step S15 of the flowchart shown in FIG. 38.

FIG. 40B is a schematic diagram for explaining the result of rearrangement performed at Step S15. As shown in FIG. 40B, the CPU 37 zooms out the layout areas L1, L2, L4, L5, L6, and L7 by the user-specified minimum zoom ratio of 80%, rearranges the first page of RGB image data by shifting the zoomed-out layout area L4 over the masked layout area L3 and inserting the zoomed-out layout area L6 beneath the zoomed-out layout area L4, and rearranges the second page of RGB image data by rearranging the zoomed-out layout areas L5 and L7.

If the dimension δ is equal to or larger than the sum of the zoomed-out dimension β and the zoomed-out dimension γ (δ>0.8(β+γ)) (Yes at Step S14), the CPU 37 zooms out the layout areas L1, L2, L4, L5, L6, and L7 by the user-specified minimum zoom ratio of 80% and rearranges the first page of RGB image data by shifting the zoomed-out layout areas L1, L2, and L4 upward and inserting the zoomed-out layout areas L6 and L7 beneath the zoomed-out layout area L4 (Step S16).

Figure 40C:
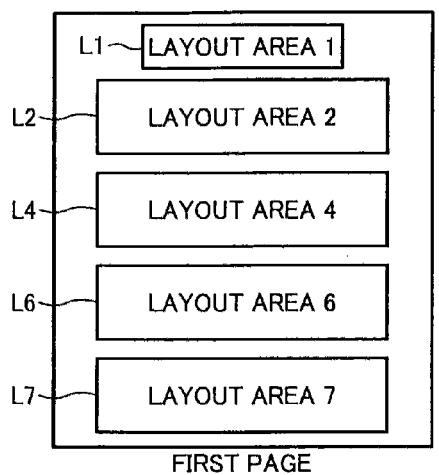
FIG. 40C is a schematic diagram for explaining a layout area configuration of the rearranged first page of RGB image data obtained at Step S16 of the flowchart shown in FIG. 38.

FIG. 40C is a schematic diagram for explaining the layout area configuration of the rearranged first page of RGB image data obtained at Step S16. As shown in FIG. 40C, the first page of RGB image data is rearranged by shifting the zoomed-out layout areas L1, L2, and L4 upward and inserting the zoomed-out layout areas L6 and L7 beneath the zoomed-out layout area L4. Consequently, the second page of RGB image data is left with only the zoomed-out layout area L5, which is the page-specific layout area with the priority 0. Thus, the CPU 37 does not output the second page of RGB image data to the second image-data processing unit 14 for further processing.

Reverting to Step S1, if the dimension α is equal to or larger than the dimension β (α≧β) (Yes at Step S11), the CPU 37 determines whether the dimension α is equal to or grater than the sum of the dimensions β and γ (Step S17). If the dimension α is equal to or larger than the sum of the dimensions β and γ (α≧β+γ) (Yes at Step S17), the CPU 37 rearranges the first page of RGB image data by shifting the layout areas L1, L2, and L4 upward and inserting the layout areas L6 and L7 beneath the layout area L4 (Step S18).

Figure 40D:
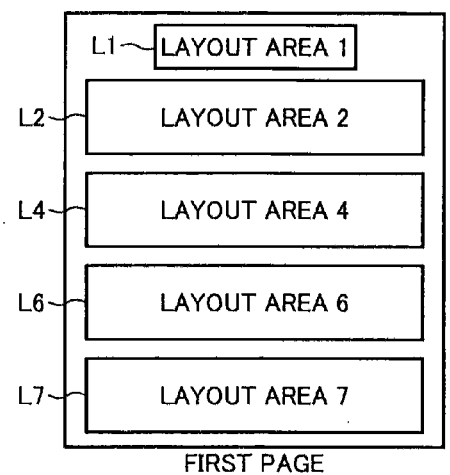
FIG. 40D is a schematic diagram for explaining a layout area configuration of the rearranged first page of RGB image data obtained at Step S18 of the flowchart shown in FIG. 38.

FIG. 40D is a schematic diagram for explaining the layout area configuration of the rearranged first page of RGB image data obtained at Step S18. As shown in FIG. 40D, the first page of RGB image data is rearranged by shifting the layout areas L1, L2, and L4 upward and inserting the layout areas L6 and L7 beneath the layout area L4. Consequently, the second page of RGB image data is left with only the layout area L5, which is the page-specific layout area with the priority 0. Thus, the CPU 37 does not output the second page of RGB image data to the second image-data processing unit 14 for further processing.

If the dimension α is smaller than the sum of the dimensions β and γ (α<β+γ) (No at Step S17), the CPU 37 determines whether the dimension δ is equal to or larger than the sum of the zoomed-out dimension β and the zoomed-out dimension γ (Step S19). If the dimension δ is smaller than the sum of the zoomed-out dimension β and the zoomed-out dimension γ (δ<0.8(β+γ)) (No at Step S19), the CPU 37 rearranges the first page of RGB image data by shifting the layout areas L1, L2, and L4 upward and inserting the layout area L6 beneath the layout area L4 and rearranges the second page of RGB image data by shifting the layout areas L5 and L7 (Step S20).

Figure 40E:
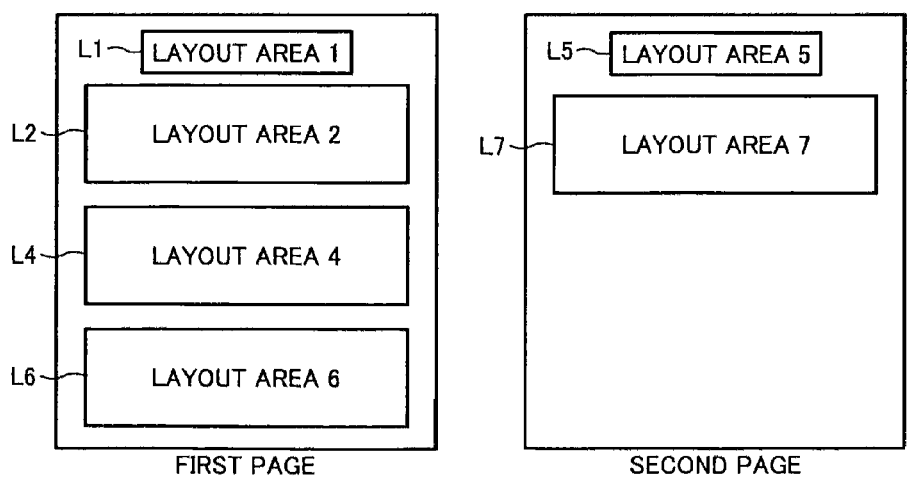
FIG. 40E is a schematic diagram for explaining the result of rearrangement performed at Step S20 of the flowchart shown in FIG. 38.

FIG. 40E is a schematic diagram for explaining the result of rearrangement performed at Step S20. As shown in FIG. 40E, the first page of RGB image data is rearranged by shifting the layout areas L1, L2, and L4 in their original size upward and inserting the layout area L6 in its original size beneath the layout area L4 and while the second page of RGB image data is rearranged by shifting the layout areas L5 and L7 in their original size.

If the dimension δ is equal to or larger than the sum of the zoomed-out dimension β and the zoomed-out dimension γ (δ>0.8(β+γ)) (Yes at Step S19), the CPU 37 zooms out the layout areas L1, L2, L4, L5, L6, and L7 by the user-specified minimum zoom ratio of 80% and rearranges the first page of RGB image data by shifting the zoomed-out layout areas L1, L2, and L4 upward and inserting the zoomed-out layout areas L6 and L7 beneath the zoomed-out layout area L4 (Step S21). The result of rearrangement performed at Step S21 is identical to the RGB image data shown in FIG. 40C.

Upon finishing the rearrangement of the RGB image data according to the user-specified minimum zoom ratio and the user-specified order of priority, the CPU 37 sends the rearranged RGB image data to the second image-data processing unit 14 via the bus control unit 13. The second image-data processing unit converts the RGB image data into CMYK image data. The plotter unit 19 prints the CMYK image data on a recording medium such as transfer paper to produce a copy of the two-page original containing output-prohibit area information.

In this way, according to the eighth embodiment, an output-prohibit area in the image data is masked to hide the details mentioned therein. The blank space created in the output-prohibit area due to masking is overwritten by rearranging the remaining layout areas. Overwriting of the output-prohibit area makes it difficult to realize that the image data has been masked. That facilitates in hiding the details mentioned in the output-prohibit area and preventing the hidden details from being inferred by analogy.

Moreover, because the user is allowed to specify the minimum zoom ratio for zooming out the layout areas at the time of rearrangement, it is possible to output the image data in the format that meets the user requirement. That enhances the user-friendliness of the MFP 800. Furthermore, by zooming out the layout areas, it becomes possible to put together the layout areas in a single page in an efficient manner. That helps in reducing the number of printed pages and thus saving on transfer paper or printing material.

Given below is the description of a digital color MFP 900 according to a ninth embodiment of the present invention. Unlike in the abovementioned embodiments, the MFP 900 allows the user to determine whether output-prohibit areas should be masked and whether masked output-prohibit areas should be overwritten by rearranging remaining layout areas. The details of the configuration/operations of the MFP 900 that are identical to the details according to the abovementioned embodiments are not repeated for clarity.

Figure 41:
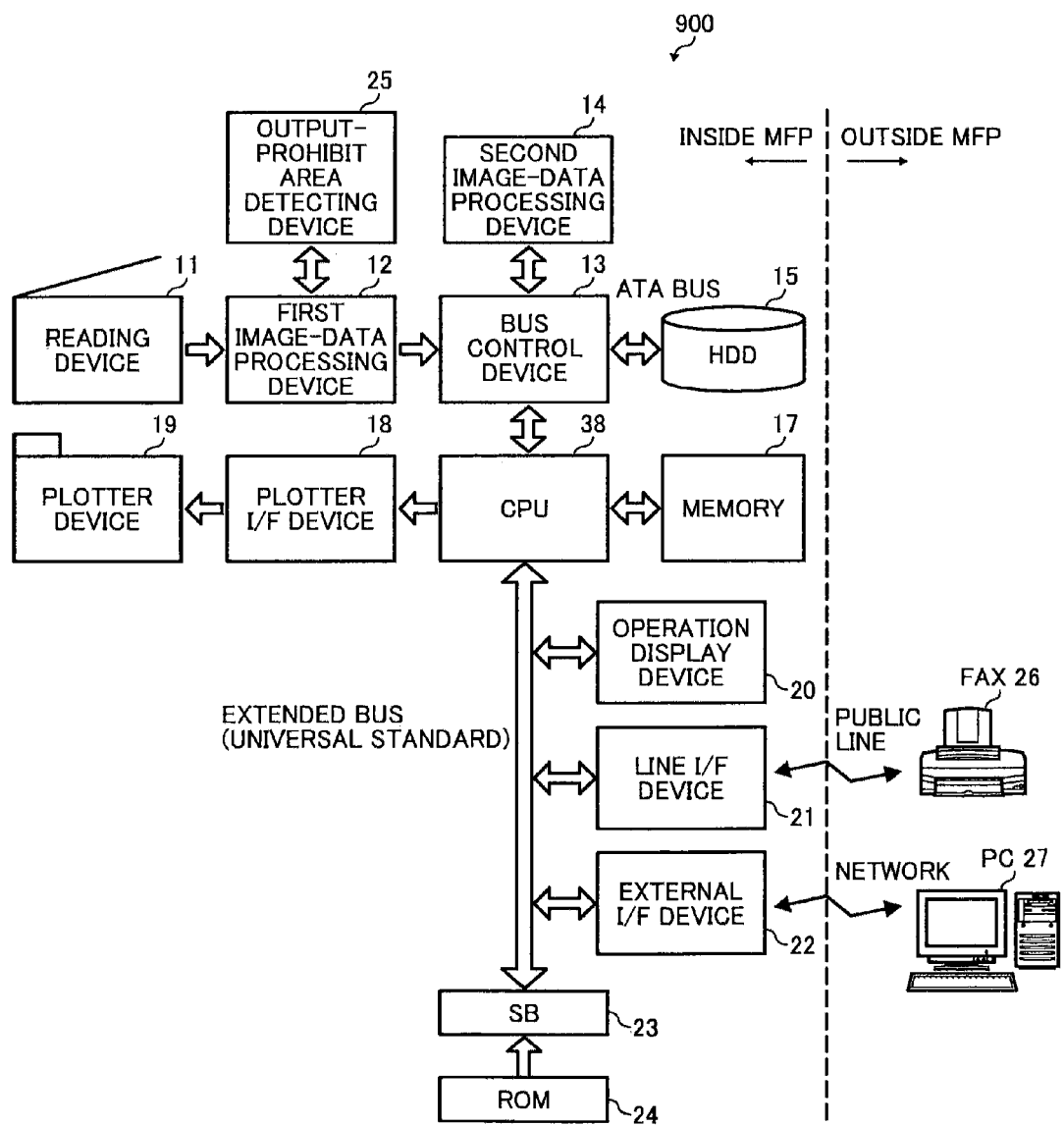
FIG. 41 is a block diagram for explaining an exemplary configuration of a digital color MFP according to a ninth embodiment of the present invention.

FIG. 41 is a block diagram for explaining an exemplary configuration of the MFP 900. The MFP 900 includes the reading unit 11, the first image-data processing unit 12, the bus control unit 13, the second image-data processing unit 14, the HDD 15, a CPU 38, the memory 17, the plotter I/F unit 18, the plotter unit 19, the operation display unit 20, the line I/F unit 21, the external I/F unit 22, the SB 23, the ROM 24, and the output-prohibit area detecting unit 25.

The CPU 38 is a microprocessor that controls operations of the entire MFP 900. The CPU 38 executes computer programs stored in the HDD 15 and/or the ROM 24 to perform the functions described below in addition to the functions described in the abovementioned embodiments.

Assume that the user specifies one or more output-prohibit areas in the RGB image data that is obtained by scanning an original and that is displayed on the operation display unit 20. Moreover, the user specifies an output-prohibit area processing mode to be applied at the time of producing an original containing output-prohibit area information. In that case, the CPU 38 generates a security code that includes the information regarding the user-specified output-prohibit areas and the user-specified output-prohibit area processing mode. The CPU 38 then appends the security code to CMYK image data generated by the second image-data processing unit 14. The plotter unit 19 prints the CMYK image data with appended security code on a recording medium to produce an original containing output-prohibit area information.

According to the ninth embodiment, there are two output-prohibit area processing modes that the user can specify. The first output-prohibit area processing mode is a masking-and-rearranging mode that instructs the MFP 900 to perform masking of the user-specified output-prohibit areas and rearrange the remaining layout areas to overwrite the user-specified output-prohibit areas. The second output-prohibit area processing mode is a masking-only mode that instructs the MFP 900 to perform masking of the user-specified output-prohibit areas but not to rearrange the remaining layout areas.

If the user operates the operation display unit 20 to instruct, e.g., copying of the original containing output-prohibit area information, the CPU 38 uses the corresponding security code for masking of the output-prohibit areas and/or rearranging of the remaining layout areas according to the user-specified output-prohibit area processing mode.

Given below is the sequence of operations peculiar to the CPU 38 in producing an original containing output-prohibit area information and producing a copy of the original containing output-prohibit area information.

First, the user operates the operation display unit 20 and instructs the MFP 900 to produce an original containing output-prohibit area information. The operation display unit 20 converts the user-specified information into control command data and sends the control command data to the CPU 38. Subsequently, based on the control command data about producing an original containing output-prohibit area information, the CPU 38 executes a corresponding computer program and performs necessary settings.

Then, the user sets an original in the reading unit 11 and operates the operation display unit 20 for inputting an instruction to start scanning of the original. The operation display unit 20 converts the user-specified information into control command data and sends the control command data to the CPU 38. In the ninth embodiment, the sequence from reading an original to storing RGB image data in the memory 17 is identical to the sequence described in the copying process according the first embodiment. Hence, that description is not repeated for clarity.

The CPU 38 confirms that RGB image data obtained by the reading unit 11 is stored in the memory 17 and displays the RGB image data on the operation display unit 20 (or on the display unit of the PC 27) as a layout-area display image. That is, unlike in the case of the second and third embodiments, the CPU 38 does not calculate layout areas from the RGB image data stored in the memory 17. Instead, the CPU 38 displays the RGB image data as it is as the layout-area display image.

The user can specify one or more output-prohibit areas in the layout-area display image in an identical manner as described in the second embodiment and specify either one of the masking-and-rearranging mode and the masking-only mode.

For example, consider a case when the user operates the operation display unit 20 to specify the layout area L3 in the two-page RGB image data shown in FIG. 28 as the output-prohibit area and also specify either one of the masking-and-rearranging mode and the masking-only mode. Then, the operation display unit 20 notifies the CPU 38 of the user-specified output-prohibit area and the user-specified output-prohibit area processing mode. Subsequently, the CPU 38 stores that information in the memory 17 and displays the layout area L3 in a highlighted manner.

When the user presses a button to indicate that the output-prohibit area and the output-prohibit area processing mode has been specified, the operation display unit 20 notifies the CPU 38 of the same. The notification contents are temporarily stored in the memory 17. Subsequently, the CPU 38 generates a security code corresponding to each page of RGB image data according to the notification contents.

For example, assume that the user specifies the layout area L3 in FIG. 28 as the output-prohibit area and specifies the masking-only mode as the output-prohibit area processing mode. Then, the CPU 38 generates an 8-bit security code shown in FIG. 42A corresponding to the first page of RGB image data and an 8-bit security code shown in FIG. 42B corresponding to the second page of RGB image data. In the security codes shown in FIGS. 42A and 42B, the first four bits (bit 7 to bit 4) indicate information (i.e., page and total number of pages in the multipage original) identical to that indicated by the security codes shown in FIGS. 29A and 29B. The subsequent three bits (bit 3 to bit 1) represent a 3-bit binary number that indicates a unique layout area of the user-specified output-prohibit area. The lowest bit (bit 0) represents the user-specified output-prohibit area processing mode. The lowest bit is set to 1 when the user specifies the masking-and-rearranging mode and set to 0 when the user specifies the masking-only mode.

Figure 42A:
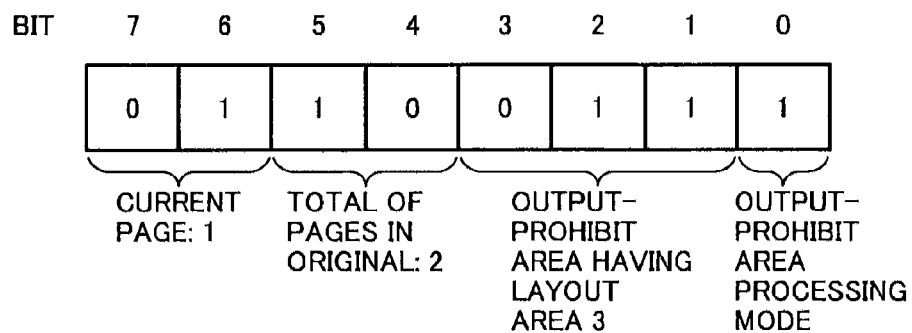
FIG. 42A is a schematic diagram of an exemplary security code generated by a CPU shown in FIG. 41 with respect to the first page of RGB image data shown in FIG. 28.
Figure 42B:
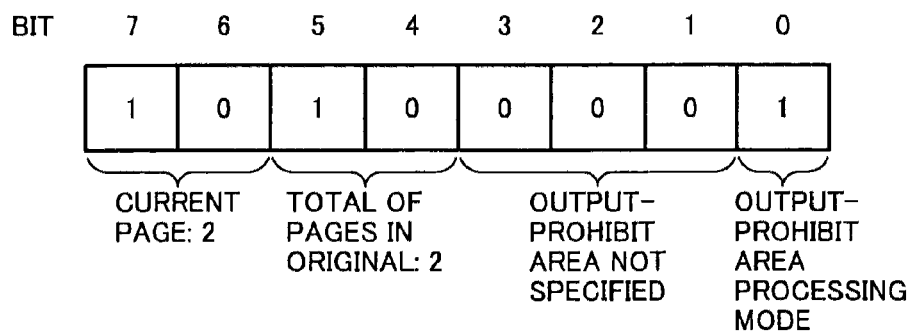
FIG. 42B is a schematic diagram of an exemplary security code generated by the CPU shown in FIG. 41 with respect to the second page of RGB image data shown in FIG. 28.
Figure 43:
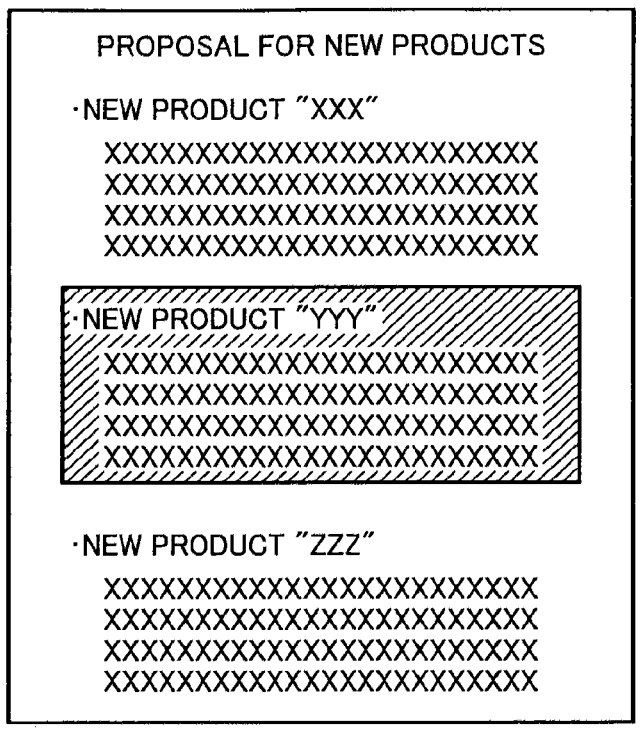
FIG. 43 is a schematic diagram for explaining a problem in conventional technology.
Figure 44:
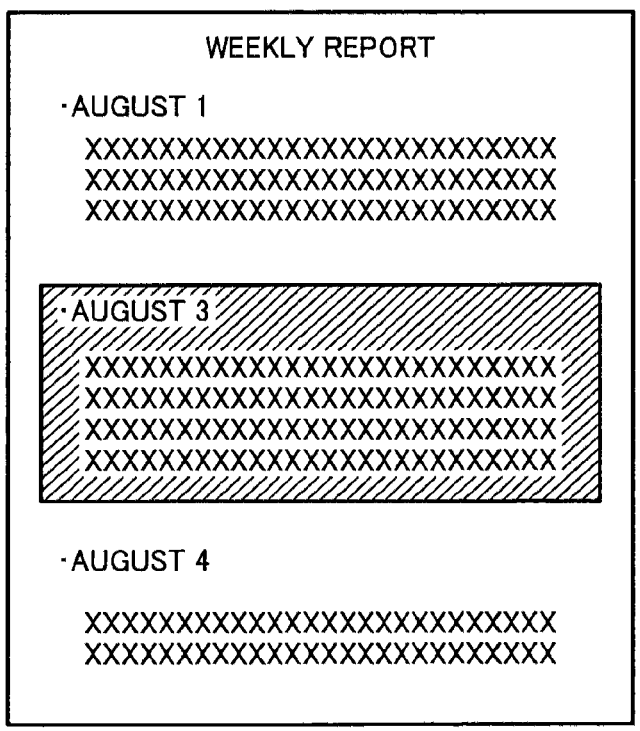
FIG. 44 is a schematic diagram for explaining a problem in conventional technology.

Upon generating the security codes shown in FIG. 42A and 42B, the CPU 38 sends both pages of RGB image data from the memory 17 to the second image-data processing unit 14 via the bus control unit 13. The second image-data processing unit 14 converts each page of RGB image data into a corresponding page of CMYK image data.

The bus control unit 13 receives each page of CMYK image data from the second image-data processing unit 14 and stores it in the memory 17 via the CPU 38. The CPU 38 converts each bit of the security code shown in FIG. 42A into dot patterns and appends those dot patterns as pattern data to a predetermined area in the first page of CMYK image data. Similarly, the CPU 38 converts each bit of the security code shown in FIG. 42B into dot patterns and appends those dot patterns as pattern data to a predetermined area in the second page of CMYK image data.

Subsequently, the CPU 38 sends the first page of CMYK image data with appended pattern data and the second page of CMYK image data with appended pattern data to the plotter unit 19 via the plotter I/F unit 18. The plotter unit 19 prints the two pages of CMYK image data with corresponding appended pattern data on a recording medium to produce a two-page original containing output-prohibit area information. When the two-page original containing output-prohibit area information is produced, the CPU 38 deletes the related instructions/notifications from the memory 17.

The two-page original containing output-prohibit area information contains the security codes shown in FIGS. 42A and 42B. Given below is the description of producing a copy of the two-page original containing output-prohibit area information.

First, the user sets the two-page original containing output-prohibit area information in the reading unit 11 and operates the operation display unit 20 to input a desired copying mode and an instruction to start the copying process. The operation display unit 20 converts the user-specified information into control command data and sends the control command data to the CPU 38. Based on the control command data about starting the copying process, the CPU 38 executes the copying program and performs necessary settings for copying.

The output-prohibit area detecting unit 25 detects dot patterns from the first page of the two-page original containing output-prohibit area information and converts the dot patterns into a multi-bit security code. Then, the output-prohibit area detecting unit 25 stores the security code of the first page in the register and outputs a detection signal to the first image-data processing unit 12. The detection signal indicates that output-prohibit area information has been detected. Upon receiving the detection signal, the first image-data processing unit 12 requests an interrupt to the CPU 38. The interrupt triggers the CPU 38 to refer to the register of the output-prohibit area detecting unit 25 and obtain the security code of the first page.

Subsequently, the CPU 38 calculates all layout areas that make up the first page of RGB image data obtained by the reading unit 11 and stored in the memory 17. In the meantime, the reading unit 11 finishes scanning of the second page and the first image-data processing unit 12 stores the second page of RGB image data in the memory 17. The output-prohibit area detecting unit 25 detects the security code (dot patterns) from the second page and stores the security code of the second page in the register.

The CPU 38 finishes masking of the output-prohibit area mentioned in the security code of the first page and, because the first four bits (having value "0110") in the security code of the first page (see FIG. 42A) indicate that the original is a two-page original, performs layout analysis and masking of the second page of RGB image data with the use of the corresponding security code.

Subsequently, the CPU 38 refers to the user-specified output-prohibit area processing mode mentioned in the security codes and, if the user-specified output-prohibit area processing mode is the masking-and-rearranging mode (lowest bit set to 1), rearranges the remaining layout areas in an identical manner as described in the sixth embodiment and sends the rearranged RGB image data to the second image-data processing unit 14.

On the other hand, if the user-specified output-prohibit area processing mode is the masking-only mode (lowest bit set to 0), the CPU 38 perform masking of the user-specified output-prohibit area to obtain masked RGB image data but does not rearrange the remaining layout areas and sends the masked RGB image data to the second image-data processing unit 14.

The second image-data processing unit converts the received RGB image data into CMYK image data. The plotter unit 19 prints the CMYK image data on a recording medium such as transfer paper to produce a copy of the two-page original containing output-prohibit area information.

In this way, according to the ninth embodiment, the user is allowed to determine whether masked output-prohibit areas should be overwritten by rearranging remaining layout areas. That enables the MFP 900 to output the image data in the format that meets the user requirement thereby enhancing the user-friendliness of the MFP 900. Moreover, because of such a configuration, it becomes possible to set the security level of the MFP 900 as per the intention of the person that creates the original (data). For example, if the person that creates the original reckons that the hidden details of output-prohibit areas cannot be inferred by analogy or reckons that inference by analogy of the hidden details of output-prohibit areas does not pose any problem, then it is sufficient to specify the masking-only mode. On the other hand, if the creator reckons that the hidden details of output-prohibit areas would likely be inferred by analogy or reckons that inference by analogy of the hidden details of output-prohibit areas poses a problem from the security perspective, then it is desirable to specify the masking-and-rearranging mode.

Meanwhile, in addition to allowing the user to specify either one of the masking-and-rearranging mode and the masking-only mode, the MFP 900 can also be configured to allow the user to specify a no-masking-and-rearranging mode in which masking of output-prohibit areas as well as rearranging of remaining areas is not performed. In that case, it is necessary to use three different values (0, 1, and 2) for identifying the output-prohibit area processing modes. That can be taken care of by, e.g., adding one bit in the security codes shown in FIGS. 42A and 42B.

In the ninth embodiment, the security code is configured to include the user-specified output-prohibit area processing mode. Instead, similar to the description in the third, fourth, and fifth embodiments, a security code can be generated corresponding to a layout table stored in the HDD 15. In that layout table, the pages in the multipage original, the layout areas of all layout areas, and the user-specified output-prohibit area processing mode are placed in a corresponding manner.

In that case, the CPU 38 can refer to the layout table corresponding to the security code of the original containing output-prohibit area information and perform masking and/or rearranging operations according to the user-specified output-prohibit area processing mode written in the layout table. For that, the lowest bit in each of the security codes shown in FIGS. 42A and 42B can be used to indicate whether the CPU 38 has referred to the output-prohibit area processing mode for performing perform masking and/or rearranging operations.

The computer programs executed in an MFP according to the embodiment can be stored in a computer connected over a network (e.g., the Internet) and can be downloaded as necessary. Moreover, the computer programs can also be distributed over a network such as the Internet.

Furthermore, the computer programs can be stored in a ROM in advance.

In this way, according to one aspect of the present invention, it is possible to hide details of an output-prohibit area in an original and prevent the hidden details from being inferred by analogy.

Moreover, according to another aspect of the present invention, it is possible to specify output-prohibit area information without having to use, e.g., a special paper thereby enhancing the utility of the original.

Furthermore, according to still another aspect of the present invention, it is possible to enhance efficiency of masking and rearranging operations.

Moreover, according to still another aspect of the present invention, it is possible to enhance user-friendliness.

Furthermore, according to still another aspect of the present invention, it is possible to reduce the number of printed pages and thus save on transfer paper or printing material.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a receiving unit that receives image data;
a detecting unit that detects output-prohibit area information indicating an output-prohibit area from the image data;
an identifying unit that identifies the output-prohibit area in the image data based on the output-prohibit area information detected by the detecting unit;
a masking unit that performs a masking on the output-prohibit area identified by the identifying unit;
a rearranging unit that rearranges an image of an area other than the output-prohibit area over the output-prohibit area on which the masking is performed by the masking unit to ensure that contextual details of the output-prohibit area cannot be inferred based on remaining, non-masked image data; and
an outputting unit that outputs image data obtained by rearranging the image by the rearranging unit.

2. The image processing apparatus according to claim 1, wherein
the output-prohibit area information is embedded in the image data in a form of pattern data including a plurality of dot patterns representing code information,
the detecting unit detects the dot patterns from the image data, and
the identifying unit identifies an output-prohibit area in the image data according to the code information represented by the dot patterns.

3. The image processing apparatus according to claim 1, wherein
the output-prohibit area information is embedded in the image data in a form of one-dimensional or two-dimensional code data,
the detecting unit detects the code data from the image data, and
the identifying unit identifies an output-prohibit area in the image data according to code contents represented by the code data.

4. The image processing apparatus according to claim 1, further comprising a calculating unit that calculates a plurality of layout areas forming the image data, wherein
the output-prohibit area information includes layout area information regarding a particular layout area from among calculated layout areas,
the identifying unit identifies the particular layout area as the output-prohibit area, and
the rearranging unit rearranges an image of a layout area other than the output-prohibit area in units of the layout area.

5. The image processing apparatus according to claim 4, further comprising:
a layout-area specifying unit that specifies an arbitrary area in the image data as the layout area; and
an output-prohibit area selecting unit that selects output-prohibit area from among layout areas specified by the layout-area specifying unit, wherein
the calculating unit takes a layout areas specified by the layout-area specifying unit as the layout area, and
the masking unit performs the masking on the output-prohibit area selected by the output-prohibit area selecting unit.

6. The image processing apparatus according to claim 4, further comprising a rearrangement-position specifying unit that specifies a rearrangement position at which the layout area other than the output-prohibit area is to be rearranged, wherein
the rearranging unit changes a position of arrangement of the layout area other than the output-prohibit area according to the rearrangement position specified by the rearrangement-position specifying unit.

7. The image processing apparatus according to claim 4, wherein
when the image data is configured with a plurality of pages, the detecting unit detects the output-prohibit area information from each of the pages,
the identifying unit identifies the output-prohibit area in each of the pages based on the output-prohibit area information detected by the detecting unit,
the masking unit performs the masking on the output-prohibit area identified in each of the pages by the identifying unit, and
the rearranging unit changes a position of arrangement of the layout area other than the output-prohibit area across pages of the pages of the image data.

8. The image processing apparatus according to claim 7, wherein when a size of the output-prohibit area in one of the pages is equal to or larger than a size of the layout area in other of the pages targeted for a rearrangement, the rearranging unit rearranges the layout area in an other of the pages in the one of the pages.

9. The image processing apparatus according to claim 7, further comprising a priority setting unit that sets an order of priority for a rearrangement, wherein
the rearranging unit changes a position of arrangement of the layout area in the order of priority set by the priority setting unit.

10. The image processing apparatus according to claim 7, wherein when a sum of sizes of layout areas to be rearranged within a single page exceeds a size of the image data, the rearranging unit performs a zoom processing of each of the layout areas within the single page such that the sum of sizes of the layout areas does not exceed the size of the image data.

11. The image processing apparatus according to claim 10, further comprising a minimum-zoom-ratio setting unit that sets a minimum zoom ratio to be applied in the zoom processing, wherein
the rearranging unit performs the zoom processing by using the minimum zoom ratio set by the minimum-zoom-ratio setting unit.

12. The image processing apparatus according to claim 1, further comprising a rearrangement-processing setting unit that selectively sets enable or disable of a process of the rearranging unit, wherein
the rearranging unit performs the process based on a setting by the rearrangement-processing setting unit.

13. The image processing apparatus according to claim 1, wherein,
the rearranging unit is configured to determine a plurality of rearrangement options for rearranging the image,
the rearranging unit rearranges the image based on a user selection of one of the plurality of rearrangement options.

14. An image processing method comprising:
inputting image data;
detecting output-prohibit area information indicating an output-prohibit area from the image data;
identifying the output-prohibit area in the image data based on the output-prohibit area information detected at the detecting;
performing a masking on the output-prohibit area identified at the identifying;
rearranging an image of an area other than the output-prohibit area over the output-prohibit area on which the masking is performed at the performing to ensure that contextual details of the output-prohibit area cannot be inferred based on remaining, non-masked image data; and
outputting image data obtained by rearranging the image at the rearranging.

15. The image processing method according to claim 14, wherein
the output-prohibit area information is embedded in the image data in a form of pattern data including a plurality of dot patterns representing code information,
the detecting includes detecting the dot patterns from the image data, and
the identifying includes identifying an output-prohibit area in the image data according to the code information represented by the dot patterns.

16. The image processing method according to claim 14, wherein
the output-prohibit area information is embedded in the image data in a form of one-dimensional or two-dimensional code data,
the detecting includes detecting the code data from the image data, and
the identifying includes identifying an output-prohibit area in the image data according to code contents represented by the code data.

17. The image processing method according to claim 14, further comprising calculating a plurality of layout areas forming the image data, wherein
the output-prohibit area information includes layout area information regarding a particular layout area from among calculated layout areas,
the identifying includes identifying the particular layout area as the output-prohibit area, and
the rearranging includes rearranging an image of a layout area other than the output-prohibit area in units of the layout area.

18. The image processing method according to claim 17, further comprising:
specifying an arbitrary area in the image data as the layout area; and
selecting output-prohibit area from among layout areas specified at the specifying, wherein
the calculating includes taking a layout areas specified at the specifying as the layout area, and
the performing includes performing the masking on the output-prohibit area selected at the selecting.

19. The image processing method according to claim 17, further comprising specifying a rearrangement position at which the layout area other than the output-prohibit area is to be rearranged, wherein
the rearranging includes changing a position of arrangement of the layout area other than the output-prohibit area according to the rearrangement position specified at the specifying.

20. The image processing method according to claim 17, wherein
when the image data is configured with a plurality of pages,
the detecting includes detecting the output-prohibit area information from each of the pages,
the identifying includes identifying the output-prohibit area in each of the pages based on the output-prohibit area information detected at the detecting,
the performing includes performing the masking on the output-prohibit area identified in each of the pages at the identifying, and
the rearranging includes changing a position of arrangement of the layout area other than the output-prohibit area across pages of the pages of the image data.

21. The image processing method according to claim 20, wherein when a size of the output-prohibit area in one of the pages is equal to or larger than a size of the layout area in other of the pages targeted for a rearrangement, the rearranging includes rearranging the layout area in an other of the pages in the one of the pages.

22. The image processing method of claim 14, further comprising:
determining a plurality of rearrangement options for rearranging the image; and
selecting, by a user, one of the plurality of rearrangement options,
the rearranging of the image being based on the selection of the one rearrangement option.

* * * * *